(12) United States Patent
Yi et al.

(10) Patent No.: US 12,401,890 B2
(45) Date of Patent: Aug. 26, 2025

(54) PHOTOGRAPHING METHOD AND ELECTRONIC DEVICE

(71) Applicant: Honor Device Co., Ltd., Shenzhen (CN)

(72) Inventors: Jie Yi, Shenzhen (CN); Long Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 39 days.

(21) Appl. No.: 18/546,909

(22) PCT Filed: Apr. 27, 2022

(86) PCT No.: PCT/CN2022/089590
§ 371 (c)(1),
(2) Date: Aug. 17, 2023

(87) PCT Pub. No.: WO2023/015959
PCT Pub. Date: Feb. 16, 2023

(65) Prior Publication Data
US 2024/0314423 A1 Sep. 19, 2024

(30) Foreign Application Priority Data

Aug. 12, 2021 (CN) .......................... 202110927487.8

(51) Int. Cl.
H04N 23/63 (2023.01)
H04N 5/262 (2006.01)
(Continued)

(52) U.S. Cl.
CPC ......... *H04N 23/632* (2023.01); *H04N 5/2621* (2013.01); *H04N 5/2628* (2013.01);
(Continued)

(58) Field of Classification Search
CPC .. H04N 23/632; H04N 5/2621; H04N 5/2628; H04N 23/633; H04N 23/667;
(Continued)

(56) References Cited

U.S. PATENT DOCUMENTS

2015/0312487 A1 10/2015 Nomoto
2016/0353018 A1 12/2016 Anderson et al.
(Continued)

FOREIGN PATENT DOCUMENTS

CN 105323456 A 2/2016
CN 109068056 A 12/2018
(Continued)

Primary Examiner — Timothy J Henn
(74) Attorney, Agent, or Firm — Slater Matsil, LLP

(57) ABSTRACT

This application provides a photographing method and an electronic device. The method includes: after a user operation is received to enable a movie shooting mode, identifying a photographing scenario based on a collected preview image, and recommending a target LUT template that matches the photographing scenario; and when a third operation performed by a user on a movie shutter control is received, shooting and generating a target video based on the target LUT template, so that a high-quality movie video is shot.

20 Claims, 53 Drawing Sheets

(51) Int. Cl.
*H04N 23/667* (2023.01)
*H04N 23/741* (2023.01)

(52) U.S. Cl.
CPC ......... *H04N 23/633* (2023.01); *H04N 23/667* (2023.01); *H04N 23/741* (2023.01)

(58) Field of Classification Search
CPC .... H04N 23/741; H04N 23/61; H04N 23/631; H04N 23/64; H04N 23/84
See application file for complete search history.

(56) References Cited

U.S. PATENT DOCUMENTS

| | | | |
|---|---|---|---|
| 2019/0052790 A1* | 2/2019 | Kang | H04N 1/6019 |
| 2020/0111447 A1 | 4/2020 | Yaacob et al. | |
| 2020/0344411 A1 | 10/2020 | Cragg et al. | |
| 2022/0247929 A1 | 8/2022 | Yang et al. | |
| 2022/0417416 A1 | 12/2022 | Li et al. | |
| 2023/0209176 A1* | 6/2023 | Yamasaki | H04N 23/632 348/333.02 |
| 2025/0080862 A1* | 3/2025 | Xiao | H04N 23/632 |

FOREIGN PATENT DOCUMENTS

| | | | |
|---|---|---|---|
| CN | 113645408 A | 11/2021 | |
| CN | 113727017 A | 11/2021 | |
| CN | 113810602 A | 12/2021 | |
| CN | 113965694 A | 1/2022 | |
| WO | 2020134891 A1 | 7/2020 | |
| WO | 2021052232 A1 | 3/2021 | |
| WO | 2021143269 A1 | 7/2021 | |

\* cited by examiner

PHOTOGRAPHING METHOD AND ELECTRONIC DEVICE

CROSS-REFERENCE TO RELATED APPLICATIONS

This application is a national stage of International Application No. PCT/CN2022/089590, filed on Apr. 27, 2022, which claims priority to Chinese Patent Application No. 202110927487.8, filed on Aug. 12, 2021. The disclosures of both of the aforementioned applications are hereby incorporated by reference in their entireties.

TECHNICAL FIELD

This application relates to the field of terminal and communication technologies, and in particular, to a photographing method and an electronic device.

BACKGROUND

With the development of an intelligent terminal, a photographing function of the intelligent terminal has become more and more powerful. A user can implement a plurality of powerful functions of camera photographing by using the intelligent terminal, such as a nigh mode, a portrait mode, and a panorama mode. However, at the same time, a photographing need of the user is increasing, and how to satisfy the photographing need of the user is a problem that needs to be resolved urgently.

SUMMARY

This application provides a photographing method. In this method, a movie shooting function is disposed in a camera of an electronic device. Functions such as a 4K HDR mode and an AI automatic scenario identification are disposed in the movie shooting function. By enabling the 4K HDR mode, resolution of a preview image can be increased and a picture is more refined and natural. By enabling the AI automatic scenario identification function, a scenario corresponding to the preview image can be automatically identified. An LUT template that matches the scenario is recommended to change an image color value for the preview image, so that a display effect of the preview image is similar to or the same as a display effect of a movie, and movie shooting is more interesting and meets a photographing requirement of a user.

According to a first aspect, this application provides an electronic device. The electronic device includes a memory and a processor. The processor is coupled to the memory. The memory stores program instructions, and when executed by the processor, the program instructions cause the electronic device to perform the following steps:
  receiving a first operation performed by a user on a camera application icon;
  displaying a first user interface in response to the first operation, where the first user interface includes: a preview box, a photographing mode list, and a movie shutter control, where the photographing mode list includes: a movie mode option;
  receiving a second operation performed by the user on the movie mode option;
  identifying a photographing scenario based on a collected preview image in response to the second operation;
  searching a plurality of LUT templates preset in a system for a target LUT template that matches the photographing scenario; and
  shooting and generating a target video based on the target LUT template when a third operation performed by the user on the movie shutter control is received.

According to the photographing method provided in this embodiment, after entering a camera application, the electronic device can automatically identify, by using an AI automatic scenario identification function, a photographing scenario corresponding to a preview image, and recommends an LUT template that matches the photographing scenario to change an image color value for the preview image, so that a display effect of the preview image is similar to or the same as a display effect of a movie, and movie shooting is more interesting and meets a photographing requirement of a user.

According to the first aspect, when executed by the processor, the program instructions cause the electronic device to perform the following steps: identifying a photographing object type for the collected preview image in response to the second operation; and identifying the photographing scenario based on at least one of the photographing object type, image brightness, and image saturation. According to the photographing scenario identification method provided in this embodiment, an identification rule is flexible, and identification result accuracy is high.

According to the first aspect, when executed by the processor, the program instructions cause the electronic device to perform the following steps: identifying each photographing object in the collected preview image in response to the second operation; and identifying the photographing scenario based on an image proportion of each photographing object. According to the photographing scenario identification method provided in this embodiment, an identification calculation amount is small, and identification result accuracy is high.

According to the first aspect, when executed by the processor, the program instructions cause the electronic device to perform the following steps:
  outputting first prompt information in response to the second operation to prompt the user to shoot in a landscape orientation; receiving a fourth operation performed by the user on a function option included in a preview interface, for example; tap or long press, where the function option includes: at least one of a slow motion option, a 4K HDR option, a flash option, or an LUT option; and enabling a mode corresponding to a selected function option in response to the fourth operation. This embodiment provides a plurality of movie shooting function options for flexible setting by the user, so as to shoot a movie with high satisfaction and strong personalization.

According to the first aspect, when executed by the processor, the program instructions cause the electronic device to perform the following step: outputting second prompt information to prompt the user to enable the 4K HDR option when it is detected that the electronic device shoots in the landscape orientation. In an actual implementation process, the second prompt information may be output when only the movie mode is enabled for the first time; or the second prompt information may be output each time the movie mode is enabled; or the second prompt information may be periodically output. The second prompt information may be used to instruct the user to enable the 4K HDR option, shoot a 4K HDR10 video, and shoot and obtain a high-quality movie.

According to the first aspect, when executed by the processor, the program instructions cause the electronic device to perform the following steps: receiving a fifth operation performed by the user on a preset region in the preview box, for example, a tap operation or a long press operation; and canceling displaying the second prompt information in response to the fifth operation. In this manner, the user may flexibly control an occasion of canceling displaying of the second prompt information. It should be noted that, displaying of the second prompt information may also be automatically canceled after being displayed for preset duration, for example, 5 seconds.

According to the first aspect, when executed by the processor, the program instructions cause the electronic device to perform the following steps: when the fourth operation performed by the user on the 4K HDR option is received, detecting whether the slow motion option is enabled; and when the slow motion option is enabled, disabling the slow motion option, where the fourth operation includes but is not limited to: tap or long press. In this embodiment, a manner in which the 4K HDR mode is not compatible with the slow motion mode can be set to increase photographing interest.

According to the first aspect, when executed by the processor, the program instructions cause the electronic device to perform the following steps: when the fourth operation performed by the user on the slow motion option is received, detecting whether the 4K HDR option is enabled; and when the 4K HDR option is enabled, disabling the 4K HDR option to display a 4K HDR video picture. In this embodiment, a manner in which the 4K HDR mode is not compatible with the slow motion mode can be set to increase photographing interest.

According to the first aspect, when executed by the processor, the program instructions cause the electronic device to perform the following step: displaying a preset dynamic effect in the preview box in a process of identifying the photographing scenario based on the collected preview image in response to the second operation. The preset dynamic effect may be set by a person skilled in the art based on an actual requirement. In a process of identifying the photographing scenario, the preset dynamic effect is displayed in the preview box, which can improve user perception experience.

According to the first aspect, when executed by the processor, the program instructions cause the electronic device to perform the following steps:
displaying third prompt information, where the third prompt information includes identification information of an identified target LUT template and a close button, and the close button is used to trigger closing of the third prompt information; receiving a fifth operation on the identification information of the target LUT template; and displaying a plurality of LUT templates in response to the fifth operation, where the target LUT template corresponding to the identification information of the target LUT template is highlighted. In this manner, the LUT template is recommended, so that the user can quickly locate a required LUT template.

According to the first aspect, when executed by the processor, the program instructions cause the electronic device to perform the following steps: when an eighth operation performed by the user on the close control is received, detecting a total quantity of times of operating the close control within preset duration; and when the total quantity of times is greater than a preset quantity of times, for example, three times, four times, or five times, disabling an automatic scenario identification function. This adaptive manner of enabling or disabling automatic scenario identification can effectively avoid frequently recommending an LUT template to the user which causes inconvenience to the user.

According to the first aspect, when executed by the processor, the program instructions cause the electronic device to perform the following steps: the target LUT template includes a playback control; receiving a sixth operation on the playback control, for example: tap, double tap, or long press; previewing, in response to the sixth operation, a video picture corresponding to the target LUT template, where the video picture includes a first control and a close control, and the close control is used to close the video picture; receiving a seventh operation performed by the user on the first control; and displaying sample movie introduction information of the target LUT template in response to the seventh operation. In this manner of displaying the video picture of the target LUT template and the sample movie introduction information, the user learns of a rendering effect of the target LUT template.

According to the first aspect, when executed by the processor, the program instructions cause the electronic device to perform the following step: when the fourth operation performed by the user on the slow motion option is received, enabling a slow motion mode and setting the LUT option to a disabled state. When the slow motion mode is enabled, if the LUT template is recommended or it is directly used for the LUT template, viewing experience of the user on a slow motion picture is affected, and even detailed information of a shot slow motion video is affected.

According to a second aspect, this application provides a photographing method, including: receiving a first operation performed by a user on a camera application icon; displaying a first user interface in response to the first operation, where the first user interface includes: a preview box, a photographing mode list, and a movie shutter control, where the photographing mode list includes: a movie mode option; receiving a second operation performed by the user on the movie mode option; identifying a photographing scenario based on a collected preview image in response to the second operation; searching a plurality of LUT templates preset in a system for a target LUT template that matches the photographing scenario; and shooting and generating a target video based on the target LUT template when a third operation performed by the user on the movie shutter control is received.

According to the second aspect or any implementation of the second aspect, the identifying, by an electronic device, a photographing scenario based on a collected preview image in response to the second operation includes: identifying a photographing object type for the collected preview image in response to the second operation; and identifying the photographing scenario based on at least one of the photographing object type, image brightness, and image saturation.

According to the second aspect or any implementation of the second aspect, the identifying a photographing scenario based on a collected preview image in response to the second operation includes: identifying each photographing object in the collected preview image in response to the second operation; and identifying the photographing scenario based on an image proportion of each photographing object.

According to the second aspect or any implementation of the second aspect, after the receiving a second operation performed by the user on the movie mode option, the method further includes: outputting first prompt information in response to the second operation to prompt the user to shoot in a landscape orientation; receiving a fourth operation performed by the user on a function option included in a preview interface, where the function option includes: at least one of a slow motion option, a 4K HDR option, a flash option, or an LUT option; and enabling a mode corresponding to a selected function option in response to the fourth operation.

According to the second aspect or any implementation of the second aspect, after the outputting first prompt information in response to the second operation to prompt the user to shoot in a landscape orientation, the method further includes: outputting second prompt information to prompt the user to enable the 4K HDR option when it is detected that the electronic device shoots in the landscape orientation.

According to the second aspect or any implementation of the second aspect, after the outputting second prompt information when it is detected that the electronic device shoots in the landscape orientation, the method further includes: receiving a fifth operation performed by the user on a preset region in the preview box; and canceling displaying the second prompt information in response to the fifth operation.

According to the second aspect or any implementation of the second aspect, the enabling a mode corresponding to a selected function option in response to the fourth operation includes: when the fourth operation performed by the user on the 4K HDR option is received, detecting whether the slow motion option is enabled; and when the slow motion option is enabled, disabling the slow motion option.

According to the second aspect or any implementation of the second aspect, the enabling a mode corresponding to a selected function option in response to the fourth operation includes: when the fourth operation performed by the user on the slow motion option is received, detecting whether the 4K HDR option is enabled; and when the 4K HDR option is enabled, disabling the 4K HDR option to display a 4K HDR video picture.

According to the second aspect or any implementation of the second aspect, the identifying a photographing scenario based on a collected preview image in response to the second operation includes: displaying a preset dynamic effect in the preview box in a process of identifying the photographing scenario based on the collected preview image in response to the second operation.

According to the second aspect or any implementation of the second aspect, when executed by the processor, the program instructions cause the electronic device to perform the following steps: displaying third prompt information, where the third prompt information includes identification information of an identified target LUT template and a close button, and the close button is used to trigger closing of the third prompt information; receiving a fifth operation on the identification information of the target LUT template; and displaying a plurality of LUT templates in response to the fifth operation, where the target LUT template corresponding to the identification information of the target LUT template is highlighted.

According to the second aspect or any implementation of the second aspect, after the displaying third prompt information, the method further includes: when an eighth operation performed by the user on the close control is received, detecting a total quantity of times of operating the close control within preset duration; and when the total quantity of times is greater than a preset quantity of times, disabling an automatic scenario identification function.

According to the second aspect or any implementation of the second aspect, the target LUT template includes a playback control; and after the displaying a plurality of LUT templates in response to the fifth operation, the method further includes: receiving a sixth operation on the playback control; previewing, in response to the sixth operation, a video picture corresponding to the target LUT template, where the video picture includes a first control and a close control, and the close control is used to close the video picture; receiving a seventh operation performed by the user on the first control; and displaying sample movie introduction information of the target LUT template in response to the seventh operation.

According to the second aspect or any implementation of the second aspect, the enabling a mode corresponding to a selected function option in response to the fourth operation includes: when the fourth operation performed by the user on the slow motion option is received, enabling a slow motion mode and setting the LUT option to a disabled state.

The second aspect and any implementation of the second aspect are respectively corresponding to the first aspect and any implementation of the first aspect. For technical effects corresponding to any one of the second aspect or the implementations of the second aspect, refer to technical effects corresponding to any one of the first aspect or the implementations of the first aspect. Details are not described herein again.

According to a third aspect, this application provides a computer-readable medium, configured to store a computer program. The computer program includes instructions used to perform the method in the second aspect or any possible implementation of the second aspect.

According to a fourth aspect, this application provides a computer program. The computer program includes instructions used to perform the method in the second aspect or any possible implementation of the second aspect.

According to a fifth aspect, this application provides a chip. The chip includes a processing circuit and a transceiver pin. The transceiver pin and the processing circuit communicate with each other through an internal connection path, and the processing circuit performs the method according to the second aspect or any possible implementation of the second aspect, so as to control a receiving pin to receive a signal and control a sending pin to send a signal.

DETAILED DESCRIPTION OF ILLUSTRATIVE EMBODIMENTS

Figure 1:
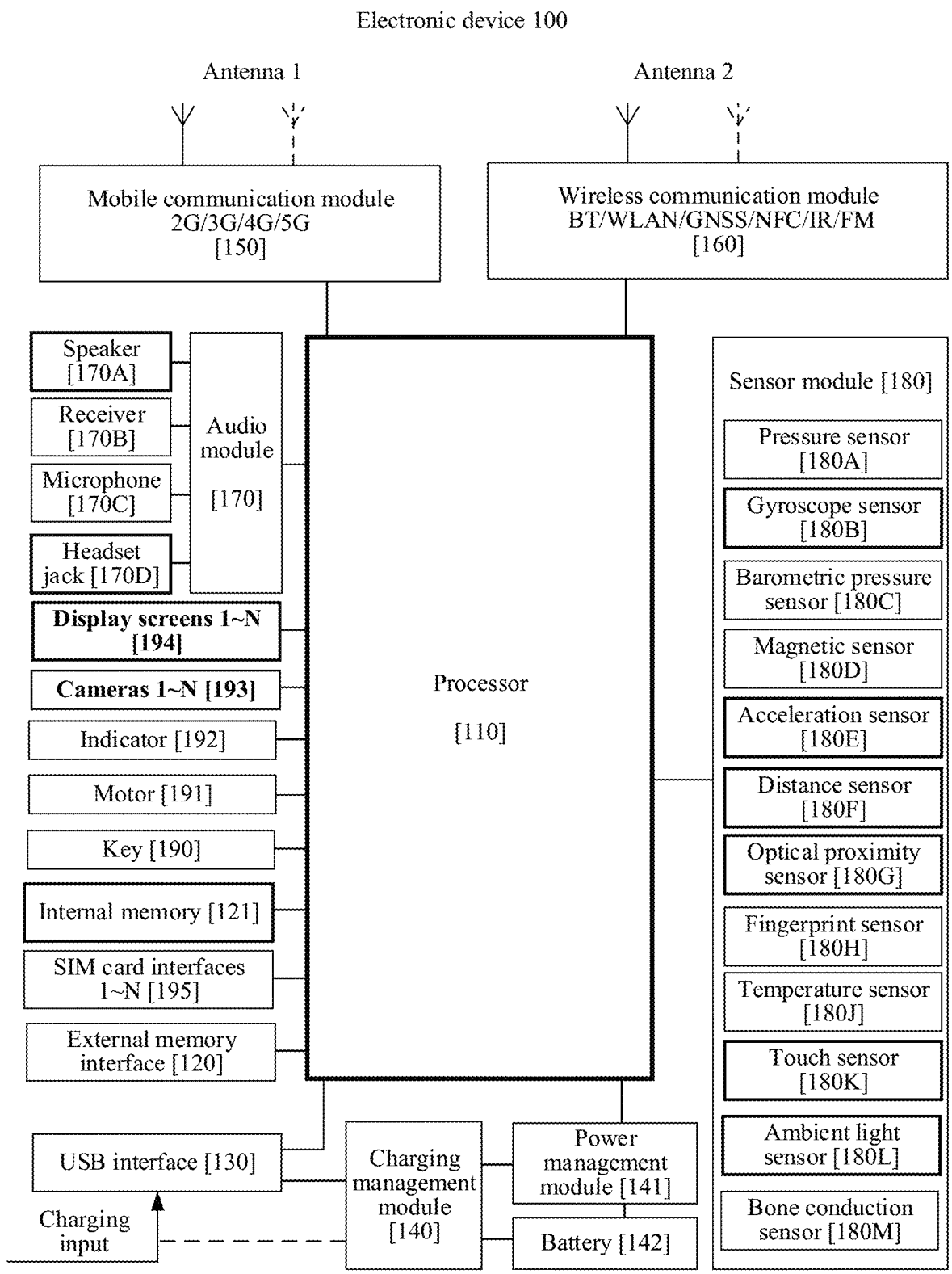
FIG. 1 is a schematic diagram of a hardware structure of an electronic device 100 according to an embodiment of this application.

The following clearly and thoroughly describes technical solutions in embodiments of this application with reference to the accompanying drawings. In the descriptions of the embodiments of this application, "/" means "or" unless otherwise specified. For example, A/B may represent A or B. The term "and/or" describes only an association relationship for describing associated objects and represents that three relationships may exist. For example, A and/or B may represent the following three cases: Only A exists, both A and B exist, and only B exists. In addition, in the description of the embodiments of this application, "a plurality of" means two or more.

The terms "first" and "second" mentioned below are merely intended for a purpose of description, and shall not be understood as an indication or implication of relative importance or implicit indication of the quantity of indicated technical features. Therefore, features defined with "first" and "second" may explicitly or implicitly include one or more features. In the descriptions of the embodiments of this application, unless otherwise specified, "a plurality of" means two or more.

The term "user interface (user interface, UI)" in the following embodiments of this application is a medium interface for interaction and information exchange between an application or an operating system and a user, and implements conversion between an internal form of information and a form that can be accepted by the user. The user interface is source code written in a specific computer language such as java or an extensible markup language (extensible markup language, XML). Interface source code is parsed and rendered on an electronic device, and is finally presented as content that can be identified by the user. A common presentation form of the user interface is a graphic user interface (graphic user interface, GUI), which refers to a user interface that is displayed in a graphical manner and that is related to a computer operation. The user interface may be a visual interface element such as a text, an icon, a button, a menu, a tab, a text box, a dialog box, a status bar, a navigation bar, or a Widget displayed on a display screen of the electronic device.

An embodiment of this application provides a photographing method. The electronic device may display a preview interface, and the preview interface is used to display a preview image captured by a camera in real time. The electronic device may include a plurality of LUT, that is, Look Up Table, templates, and these LUT templates may be used to change a color value of the preview image, so that a display effect of the preview image is similar to or the same as a display effect of a movie, where the display effect may refer to hue, brightness, saturation, and the like. In a first aspect, the electronic device may select an LUT template suitable for the preview image from the plurality of LUT templates based on one or more frames of the preview image captured by the camera, and adjust the display effect of the preview image by using the LUT template, or the electronic device may receive an operation performed by the user, and adjust the display effect of the preview image based on the LUT template selected by the user, to make the preview image displayed on the preview interface more cinematic. In a second aspect, the LUT template may be displayed to the user in a form of a video clip, to make a preview image adjustment process more interesting, so that the user has a more intuitive understanding of a color effect of the LUT template. In a third aspect, the electronic device may further enable a 4K HDR mode to increase resolution of the preview image, so that the preview image is more refined and natural. In a fourth aspect, the electronic device may further enable an AI automatic scenario identification function to automatically identify a scenario corresponding to the preview image, and recommend an LUT template that matches the scenario. Furthermore, the electronic device may cut a size of the preview image and add a black edge on the preview interface, so that an aspect ratio of the preview image is an aspect ratio of a movie picture (such as 21:9). In this way, an effect of watching the movie is provided to the user from a visual sense, and a movie atmosphere during photographing is enhanced. In a sixth aspect, the electronic device may further perform slow motion photographing in a movie shooting process, so as to increase interest in photographing.

In the movie mode, the electronic device 100 may enable the LUT function in combination with AI intelligent scenario identification by default, display one or more LUT templates, and recommend, for the user, an LUT template that matches the scenario in the preview image. The LUT template can provide a color conversion model for converting an image color value, and the color conversion model can specify an output color value based on an input color value. After the LUT template is selected, the electronic device adjusts the color value of the preview image based on the color conversion model in the LUT template, so as to change the display effect of the preview image. An unadjusted image may be an original image captured by the camera, and an adjusted image may be the preview image displayed on the preview interface after the LUT template is added. A color value of the original image is an input color value, and finally on the preview interface, an adjusted color value of the preview image is an output color value.

It may be understood that names related to the LUT function and the 4K HDR mode are not limited in embodiments of this application. In another embodiment of this application, the LUT may further be represented as an LUT filter, a tone, a palette, or the like, and the 4K HDR mode may also be represented as a first mode, a high dynamic light rendering mode, a high resolution mode, or the like. This is not limited in embodiments of this application.

In general, a photographing mode related to the movie is provided in the photographing method. In the mode, the user can experience a fun of shooting the movie, and a tone style of an image shot by the electronic device is similar to a tone style of the movie, to make movie shooting more interesting and satisfy a photographing need of the user.

FIG. 1 is a schematic diagram of a hardware structure of an electronic device 100.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specifically limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

In some embodiments, the processor 110 may be configured to select an LUT template suitable for a preview image from a plurality of LUT templates based on a frame of the preview image captured by a camera, and use the LUT template to change a display effect of the preview image captured by the camera in real time on the preview interface, so that the preview image displayed on the preview interface is more cinematic.

In some embodiments, the processor 110 may be configured to shoot a slow motion movie according to a slow motion setting instruction of a user.

In some embodiments, the processor 110 may be configured to perform countdown movie shooting based on a time-lapse photographing setting of the user.

The controller may generate an operation control signal based on an instruction operation code and a time sequence signal, so as to complete control over instruction fetching and instruction execution.

The processor 110 may further be configured with a memory configured to store an instruction and data. In some embodiments, the memory in the processor 110 is a cache memory. The memory may store instructions or data that is recently used or cyclically used by the processor 110. If the processor 110 needs to use the instruction or the data again, the instruction or the data may be directly invoked from the memory. Repeated access is avoided, and waiting time of the processor 110 is reduced, thereby improving system efficiency.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover a single communication frequency band or a plurality of communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 can provide a solution for wireless communication including 2G/3G/4G/5G and the like to be applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some of functional modules of the mobile communication module 150 may be disposed in the processor 110. In some embodiments, at least some of the functional modules of the mobile communication module 150 may be disposed in a same device as at least some of modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A or the receiver 170B), or displays an image or a video by using the display screen 194. In some embodiments, the modem processor may be a separate device. In some other embodiments, the modem processor may be independent of the processor 110, and the modem processor and the mobile communication module 150 or another functional module are disposed in a same device.

The wireless communication module 160 can provide a solution for wireless communication including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), an infrared technology (infrared, IR) and the like to be applied to the electronic device 100. The wireless communication module 160 may be one or more devices that integrate at least one communication processing module. The wireless communication module 160 receives electromagnetic waves by using the antenna 2, performs frequency demodulation and filtering on an electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the mobile communication template 150 and the wireless communication module 160 may be used to receive an LUT template sent by a server.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculation, and is configured to render graphics. The processor 110 may include one or more GPUs, and the GPU executes a program instruction to generate or change display information.

The display screen 194 is configured to display an image, a video, and the like, The display screen 194 includes a display panel. The display panel may use a liquid crystal display screen (liquid crystal display, LCD), an organic light-emitting diode (organic light-emitting diode, OLED), a passive matrix/organic light emitting diode or an active matrix/organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N display screens 194, where N is a positive integer greater than 1.

In some embodiments, the display screen 194 may be configured to display a preview interface of the electronic device 100 during photographing, and a preview image captured by the camera 193 in real time are displayed on the preview interface.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, and light is transmitted to a camera photosensitive element by using a lens. An optical signal is converted into an electrical signal. The camera photosensitive element transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scenario. In some embodiments, the ISP may be arranged in the camera 193.

The camera 193 is configured to capture a still image or a video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it to a digital image signal. The ISP outputs the digital image signal to the DSP for processing. The DSP converts the digital image signal into a standard image signal in a format such as RGB or YUV. In some embodiments, the electronic device 100 may include one or N cameras 193. N is a positive integer greater than 1.

The digital signal processor is configured to process a digital signal. In addition to processing a digital image signal, the digital signal processor can further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG4.

The NPU is a neural-network (neural-network, NN) computing processor that quickly processes input information by referring to a biological neural network structure, for example, by referring to a transmission mode between human brain neurons, and may further perform self-learning continuously. The NPU may be used to implement an application such as intelligent cognition of the electronic device 100, for example, image recognition, facial recognition, speech recognition, and text understanding.

The internal memory 121 may include one or more random access memories (random access memories, RAMs) and one or more non-volatile memories (non-volatile memories, NVMs).

In some embodiments, the internal memory 121 may be used to store one or more LUT templates in the electronic device 100.

The random access memories may include a static-random access memory (static-random access memory, SRAM), a dynamic random access memory (dynamic random access memory, DRAM), a synchronous dynamic random access memory (synchronous dynamic random access memory, SDRAM), double data rate synchronous dynamic random access memory (double data rate synchronous dynamic random access memory, DDR SDRAM, for example, a fifth generation DDR SDRAM is generally referred to as DDR5 SDRAM), and the like. The non-volatile memories may include a magnetic disk storage device and a flash memory.

According to operation principles, the flash memory may include NOR FLASH, NAND FLASH, 3D NAND FLASH, and the like. According to quantities of potential levels of storage units, the flash memory may include a single-level cell (single-level cell, SLC), a multi-level cell (multi-level cell, MLC), a triple-level cell (triple-level cell, TLC), a quad-level cell (quad-level cell, QLC), and the like. According to storage specifications, the flash memory may include a universal flash storage (English: universal flash storage, UFS), an embedded multimedia card (embedded multimedia Card, eMMC), and the like.

The random access memory may be directly read and written by the processor 110, may be configured to store executable programs (for example, machine instructions) of an operating system or other running programs, or may be configured to store data of users and applications.

The non-volatile memory may also store the executable programs, the data of the users and the applications, and the like, and may be loaded into the random access memory in advance for the processor 110 to perform direct reading and writing.

The external memory interface 120 may be configured to connect to an external non-volatile memory, to expand a storage capability of the electronic device 100. The external nonvolatile memory card communicates with the processor 110 by using the external memory interface 120, to implement a data storage function. For example, music, video, and other files are stored in the external nonvolatile memory.

The electronic device 100 may implement an audio function by using the audio module 170, the speaker 170A, the receiver 170B, the microphone 170C, the headset jack 170D, the application processor, for example, music playing and audio recording.

The gyroscope sensor 180B may be configured to determine a motion posture of the electronic device 100. In some embodiments, an angular velocity of the electronic device 100 around three axes (i.e., x, y, and z axes) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion sensing game scenario.

The acceleration sensor 180E may detect magnitudes of acceleration in various directions (usually on three axes) of the electronic device 100, and The acceleration sensor can detect a value and a direction of gravity when the electronic device 100 is still. The acceleration sensor 170C may be further configured to identify a posture of the electronic device, and is applied to applications such as landscape and portrait orientation switching and a pedometer.

The distance sensor 180F is configured to measure a distance. The electronic device 100 may measure the distance by using infrared or laser. In some embodiments, in a photographing scenario, the electronic device 100 may measure a distance by using the distance sensor 180F, to implement fast focusing.

The ambient light sensor 180L is configured to sense brightness of ambient light. The electronic device 100 may adaptively adjust brightness of the display screen 194 based on the sensed brightness of the ambient light. The ambient light sensor 180L may also be configured to automatically adjust white balance during photographing. The ambient light sensor 180L may further cooperate with an optical proximity sensor 180G to detect whether the electronic device 100 is in a pocket to prevent accidental touch.

The touch sensor 180K is also referred to as a "touch device". The touch sensor 180K may be disposed in the display screen 194, and the touch sensor 180K and the display screen 194 constitute a "touchscreen". The touch sensor 180K is configured to detect a touch operation performed on or near the touch sensor 180K. The touch sensor may transmit the detected touch operation to the application processor, to determine a touch event type. Visual output related to the touch operation may be provided by using the display screen 194. In some other embodiments, the touch sensor 180K may alternatively be disposed on a surface of the electronic device 100, and is at a position different from that of the display screen 194.

The electronic device may be a portable terminal device equipped with IOS, Android, Microsoft, or another operating system such as a mobile phone, a tablet computer, or a wearable device, or may be a non-portable terminal device such as a laptop (Laptop) with a touch-sensitive surface or a touch panel, or a desktop with a touch-sensitive surface or a touch panel. A software system of the electronic device 100 may use a layered architecture, an event-driven architecture, a microkernel architecture, a microservice architecture, or a cloud architecture. In this embodiment of the present invention, an Android system with a layered architecture is used as an example to describe a software structure of the electronic device 100.

Figure 2:
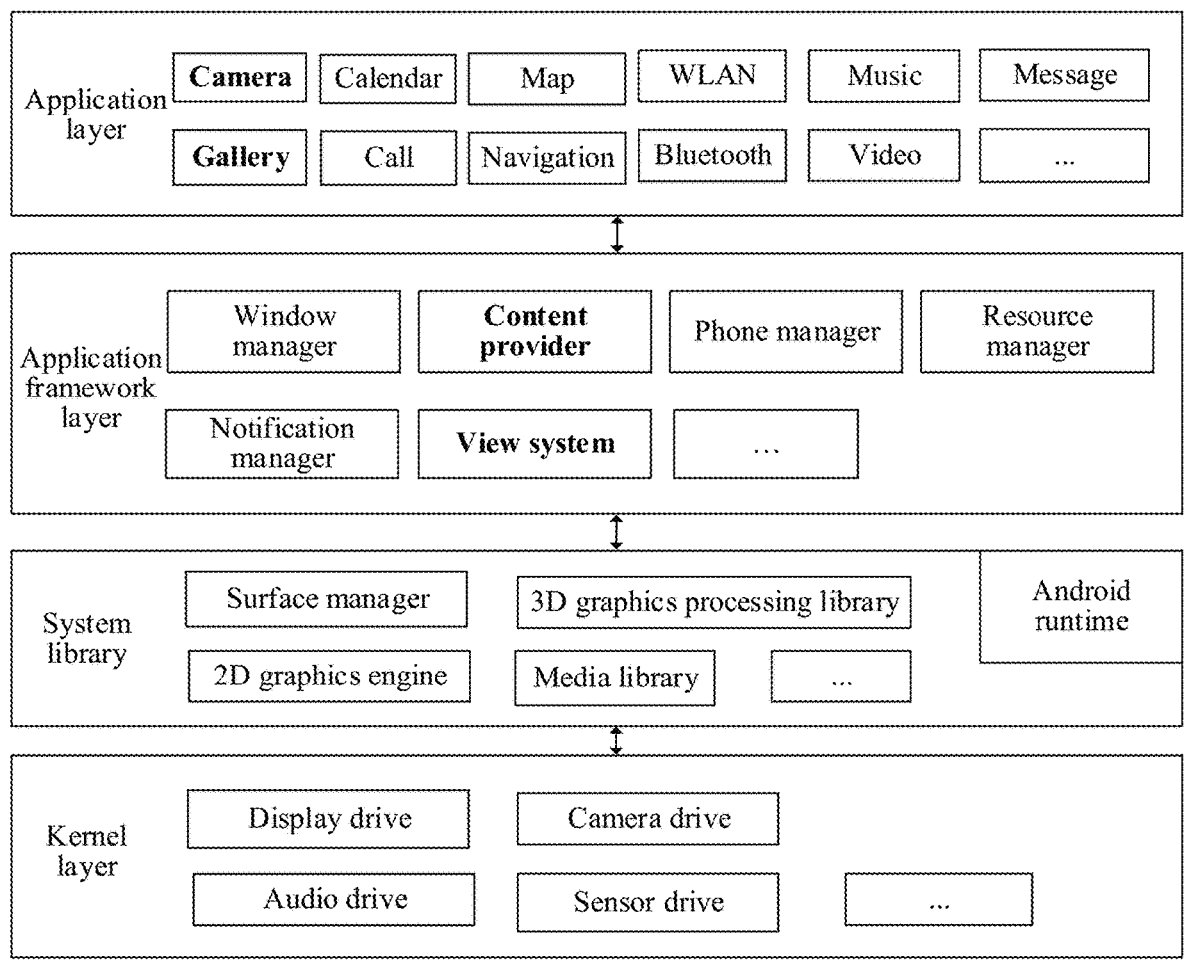
FIG. 2 is a schematic diagram of a software architecture of an electronic device 100 according to an embodiment of this application.

FIG. 2 is a block diagram of a software structure of an electronic device 100 according to an embodiment of this application.

In the layered architecture, software is divided into several layers, and each layer has a clear role and task. The layers communicate with each other by using a software interface. In some embodiments, the Android system is divided into four layers, namely, an application layer, an application framework layer, an Android runtime (Android runtime) and a system library, and a kernel layer from top to bottom.

The application layer may include a series of application packages.

As shown in FIG. 2, the application packages may include applications such as Camera, Gallery, Calendar, Calls, Map, Navigation, WLAN, Bluetooth, Music, Video, and Messages.

The camera may include a plurality of photographing modes, for example, a professional mode, and a movie mode. The professional mode can provide the user with a plurality of adjustable photographing parameters (such as exposure, brightness), and the user can adjust the preview image by adjusting the photographing parameters. The movie mode may provide the user with photographing modes of a plurality of adjustable photographing mode themes. For specific description of the professional mode and the movie mode, refer to the following embodiment.

The gallery may be is used to store a picture or a video taken by the electronic device 100 through a camera application, and the electronic device 100 may also adjust a display effect of the picture or video in the gallery by using the LUT template.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window application. The window manager may obtain a size of the display screen, determine whether there is a status bar, lock the screen, take a screenshot, and the like.

The content provider is used to store and obtain data and make the data accessible to an application. The data may include a video, an image, an audio, calls that are made and received, a browsing history and bookmarks, an address book, and the like.

The view system includes visual controls, for example, a control for displaying text and a control for displaying a picture. The view system may be configured to construct an application. A display interface may include one or more views. For example, a display interface including an SMS notification icon may include a view for displaying text and a view for displaying a picture. The view system can be is used to build a camera application and a gallery application.

The phone manager is configured to provide a communication function for the electronic device 100, for example, call status management (including connected and hang-up).

The resource manager provides various resources such as a localized character string, an icon, an image, a layout file, and a video file for an application.

The notification manager enables an application to display notification information in the status bar that may be used to convey a message of a notification type, where the message may disappear automatically after a short stay without user interaction. For example, the notification manager is configured to notify a user of download completion or remind a user of a message. The notification manager may alternatively display a notification in a form of a chart or a scroll bar text in a status bar at the top of the system, for example, a notification of an application run in the background, or may display a notification in a form of a dialog window on the screen. For example, text information is prompted for in the status bar, an announcement is produced, the electronic device vibrates, or the indicator light blinks.

The Android runtime includes a core library and a virtual machine. The Android runtime is responsible for scheduling and managing the Android system.

The kernel library includes two parts: one part is a functional function that needs to be invoked by a java language, and the other part is the kernel library of Android.

The application layer and the application framework layer are run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, For example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D graphics.

The kernel layer is a layer between hardware and software. The kernel layer includes at least a display driver, a camera driver, an audio driver, and a sensor driver.

The following describes example working procedures of software and hardware of the electronic device 100 with reference to a capturing and photographing scenario.

When the touch sensor 180K receives a touch operation, a corresponding hardware interrupt is sent to the kernel layer. The kernel layer processes the touch operation into an original input event (including touch coordinates, a timestamp of the touch operation, and other information). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 193.

The photographing method provided in this embodiment of this application may be represented as a plurality of functions in two photographing modes, where the two photographing modes may be a movie mode and a professional mode.

The movie mode is a photographing mode related to a movie theme, in the mode, an image displayed by the electronic device 100 can provide a user with a sensory effect of watching a movie, and the electronic device 100 also provides a plurality of LUT templates related to the movie theme. The user can obtain tone-adjusted images or videos by using the LUT templates, and tones of the images or videos are similar to or the same as a tone of the movie. In the following embodiment of this application, the movie mode may provide at least an interface for the user to trigger an LUT function, a 4K HDR function, a slow motion photographing function, and a time-lapse photographing function. For specific descriptions of the LUT function, the 4K HDR function, the time-lapse photographing function, and the slow motion photographing function, refer to the following UI embodiments.

The professional mode is a photographing mode in which the user can adjust photographing parameters. In this mode, the electronic device 100 can provide a plurality of photographing parameters that can be adjusted by the user, including photometry, exposure, brightness, shutter speed, focusing mode, white balance parameters, and the like. The user can adjust these photographing parameters to obtain a desired image display effect. In addition, in this embodiment of this application, the professional mode may further include a plurality of LUT templates similar to the LUT templates in the movie mode, and the user can also obtain a tone-adjusted image or video by using these LUT templates, and tones of the images or videos are similar to or the same as a tone of the movie. In addition, a LOG video may be shot in the professional mode, and an LUT template can be added to the LOG video. In this way, the user can obtain a cinematic image or video, picture content of the image or video can retain more details, and the picture content is more refined and richer. In the following embodiment of this application, the professional mode may at least provide at least an interface for the user to trigger the LUT function and the LOG function. For specific description of the LUT function, and the LOG function, refer to the following UI embodiment.

The following describes user interfaces related to embodiments of this application with reference to FIG. 3A to FIG. 3M, FIG. 4A to FIG. 4D, FIG. 5A and FIG. 5B, FIG. 6A to FIG. 6M, FIG. 7A to FIG. 7D, FIG. 8A and FIG. 8B, FIG. 9A to FIG. 9L, FIG. 10A to FIG. 10D, FIG. 11A to FIG. 11J, and FIG. 12.

FIG. 3A to FIG. 3M, FIG. 4A to FIG. 4D, and FIG. 5A and FIG. 5B illustrate some user interfaces involved in the 4KHDR and AI film tone functions in a movie shooting process.

Figure 3A:
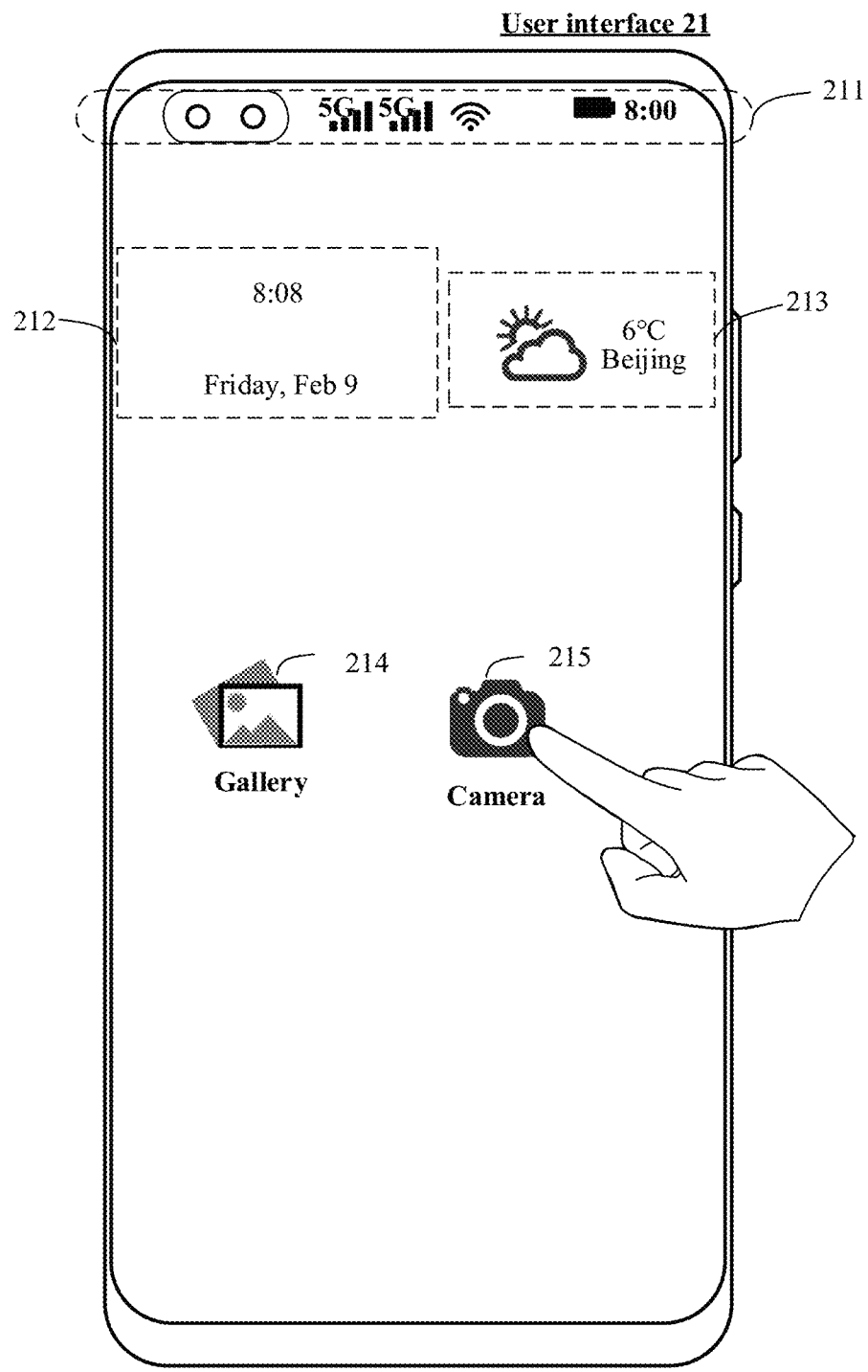
FIG. 3A to FIG. 3M are schematic diagrams of user interfaces of a first movie shooting scenario according to an embodiment of this application.

FIG. 3A shows an example user interface 21 that is on the electronic device 100 and that is used for an application menu. The user interface 21 includes: a status bar 211, a calendar indicator 212, a weather indicator 213, a gallery application 214, and a camera application 215.

The status bar 211 may include one or more signal strength indicators of a mobile communication signal, one or more signal strength indicators of a wireless fidelity (wireless fidelity, WiFi) signal, a battery status indicator, and a time indicator. The calendar indicator 212 may be used to indicate a current time. The weather indicator 213 may be used to indicate a weather type. The gallery application 214 may be used to store a picture shot by the electronic device 100, and the camera application 215 may be used to turn on a camera of the electronic device and provide a user interface to display the image captured by the camera.

In some embodiments, for example, the user interface 21 shown in FIG. 3A may be a home screen (Gome screen).

It may be understood that FIG. 3A merely shows an example of a user interface on the electronic device 100, and should not constitute a limitation on this embodiment of the application.

Figure 3B:
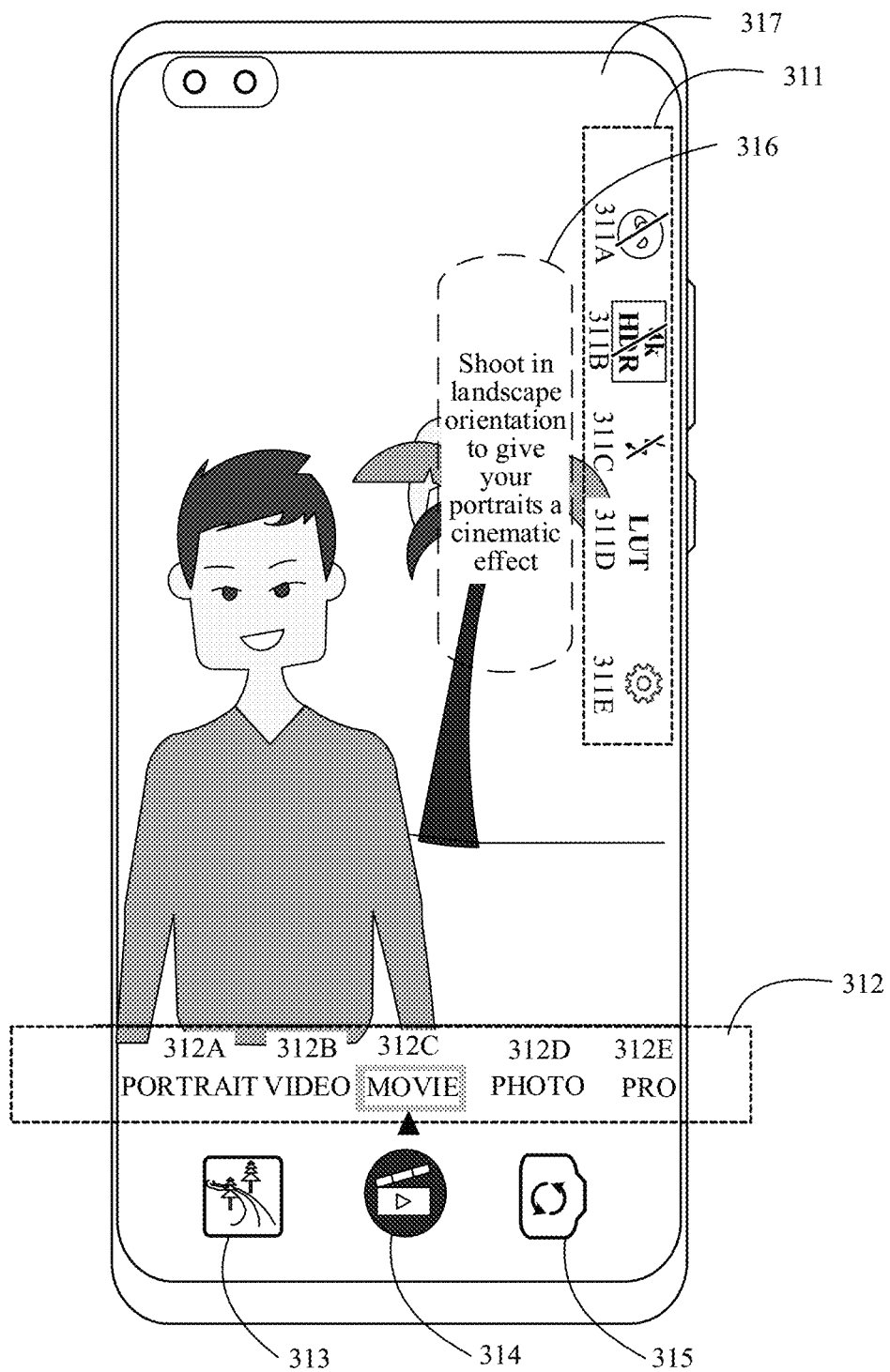

As shown in FIG. 3A, the electronic device 100 may detect a touch operation performed by the user on the camera application 215, and in response to the operation, the electronic device 100 displays a user interface 31 as shown in FIG. 3B. The user interface 31 may be a default photographing interface provided by the application when the electronic device 100 enables the camera application.

As shown in FIG. 3B, the user interface 31 may include: a preview box 311, a photographing mode list 312, a gallery shortcut key 313, a movie shutter control 314, and a camera flip control 315.

The preview box 311 may be used to display an image captured by the camera 193 in real time. The electronic device 100 may refresh display context therein in real time, so that the user can easily preview the image captured by the camera 193 in real time.

One or more movie shooting mode options may be displayed in the photographing mode list 312. The one or more photographing mode options may include: a portrait mode option 312A, a video mode option 312B, a photographing mode option 312D, a movie mode option 312C, and a professional option 312E. The one or more photographing mode options may be presented on the interface as text information, for example, "portrait", "video", "photo", "movie", and "professional". In addition, the one or more photographing mode options may also be represented as an icon or another form of interactive element (interactive element, IE) on the interface.

The gallery shortcut key 313 may be used to enable the gallery application. In response to an operation performed by the user on the gallery shortcut key 313, such as a tap operation, the electronic device 100 may enable the gallery application. In this way, the user can easily view photos and videos taken, and there is no need to exit the camera application before enabling the gallery application. A gallery application is an application for picture management on an electronic device such as a smart phone or a tablet computer, and may also be referred to as an "album". A name of the application is not limited in this embodiment. The gallery application may support the user to perform various operations on a picture stored in the electronic device 100, for example, operations such as browsing, editing, deletion, and selection.

The movie shutter control 314 may be configured to monitor a user operation for triggering video recording. The electronic device 100 may detect an operation performed again by the user on the movie shutter control 314, and in response to the operation, the electronic device 100 starts video recording. When the electronic device 100 detects performed by the user on the movie shutter control 314, the electronic device 100 stops video recording, and saves an image displayed between a last operation performed by the user on the movie shutter control 314 and a current operation performed by the user on the movie shutter control 314, on the preview interface 317 as a video. The electronic device 100 may generate a movie based on the preview image in the preview box 317 and store the movie in the gallery application. In addition, the electronic device 100 may also display a thumbnail of a cover of the saved movie in the gallery shortcut key 313. In other words, the user may tap the movie shutter control 314 to trigger movie shooting. The movie shutter control 314 may be a button or another form of control.

The camera flip control 315 may be used to monitor an operation performed by the user to trigger flipping of a camera. The electronic device 100 may detect an operation performed by the user on the camera flip control 315, such as a tap operation, and in response to the operation, the electronic device 100 may flip the camera, for example, switch from a rear camera to a front camera.

As shown in FIG. 3B, when the movie mode is enabled, the electronic device 100 displays first prompt information 316 shown in FIG. 3B "Shoot in landscape orientation to give your portraits a cinematic effect".

In some embodiments, the electronic device 100 may enable the movie mode by default after enabling the camera application. In addition, the electronic device 100 may also enable the movie mode in another way, for example, the electronic device 100 may also enable the movie mode based on a voice instruction of the user. Alternatively, the electronic device 100 may enable the photographing mode by default after the camera application is enabled, and the user may manually tap the movie mode option 312C to enable the movie mode. In addition, the electronic device 100 may further enable the photographing mode by default after the camera application is enabled. The user triggers an undisplayed photographing mode menu by tapping the more option, and manually tap the movie mode option to enable the movie mode in the undisplayed photographing mode menu. This is not limited in this embodiment of this application.

As shown in FIG. 3B, the preview interface 317 includes a function option 311, and the function option 311 includes a slow motion option 311A, a 4KHDR option 311B, a flash option 311C, an LUT option 311D, and a settings option 311E. Each of the function options may be used to detect a touch operation of the user, and in response to the operation, a corresponding photographing function is enabled or disabled, for example, a slow motion function, a 4KHDR function, a flash function, an LUT function, and a settings function. The flash function may be used to monitor an operation performed by the user to trigger a flash, and the settings function may be used to open a photographing setting interface. For specific descriptions of the slow motion function, the 4KHDR function, and the LUT function, refer to the following embodiment, and details are not described herein. In addition, when the electronic device 100 performs displaying in a portrait orientation, icons displayed on user interfaces, for example, the gallery shortcut key 313, the camera flip control 315, the movie shutter control 314, the function option 311, and the first prompt information 316 are displayed in a landscape orientation. The plurality of icons displayed in the landscape orientation may guide the user to hold the electronic device 100 in a landscape orientation for photographing. In addition, when the electronic device 100 is displayed in a portrait orientation, the gallery shortcut key 313, the camera flip control 315, and the movie shutter control 314 may be displayed in a landscape orientation, so as to instruct the user to horizontally hold the electronic device 100 for photographing. When it is detected that the user rotates the electronic device 100 in the landscape orientation, the electronic device 100 displays the user interface 31 as shown in FIG. 3C.

In some embodiments, the electronic device 100 may alternatively enable display in the landscape orientation by default after enabling the camera application. Alternatively, in the case of the screen interface in the portrait orientation shown in FIG. 3B, an operation of rotating the electronic device 100 by the user is detected by using a sensor, and the interface is switched to the user interface 31 in the landscape orientation shown in FIG. 3C based on the user operation.

Figure 3C:
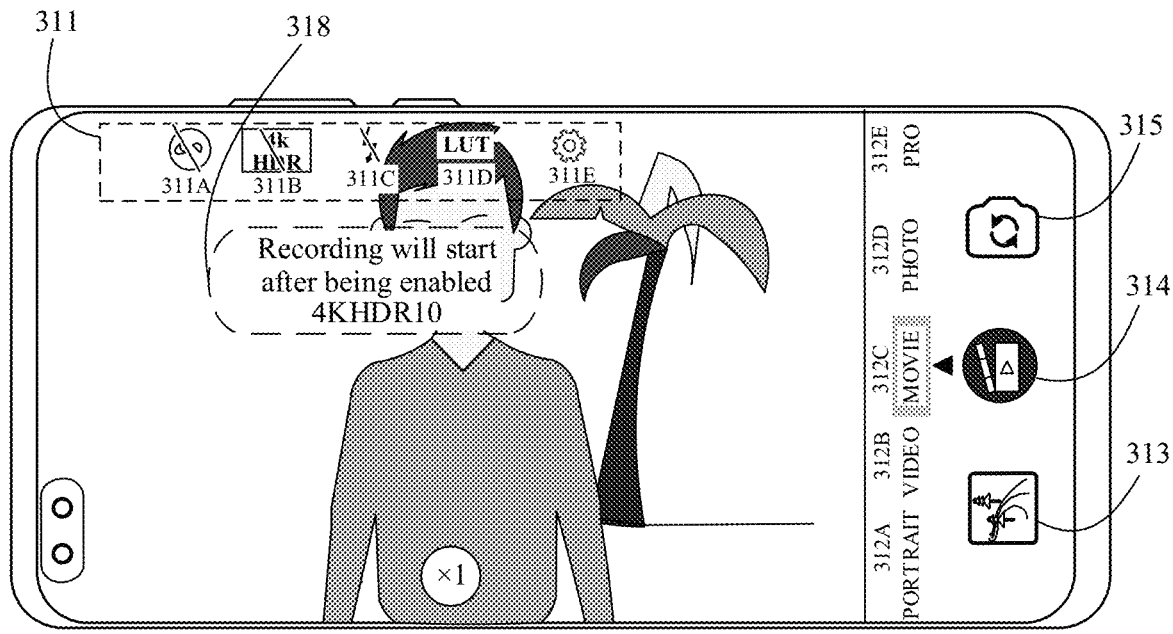
Figure 3D:
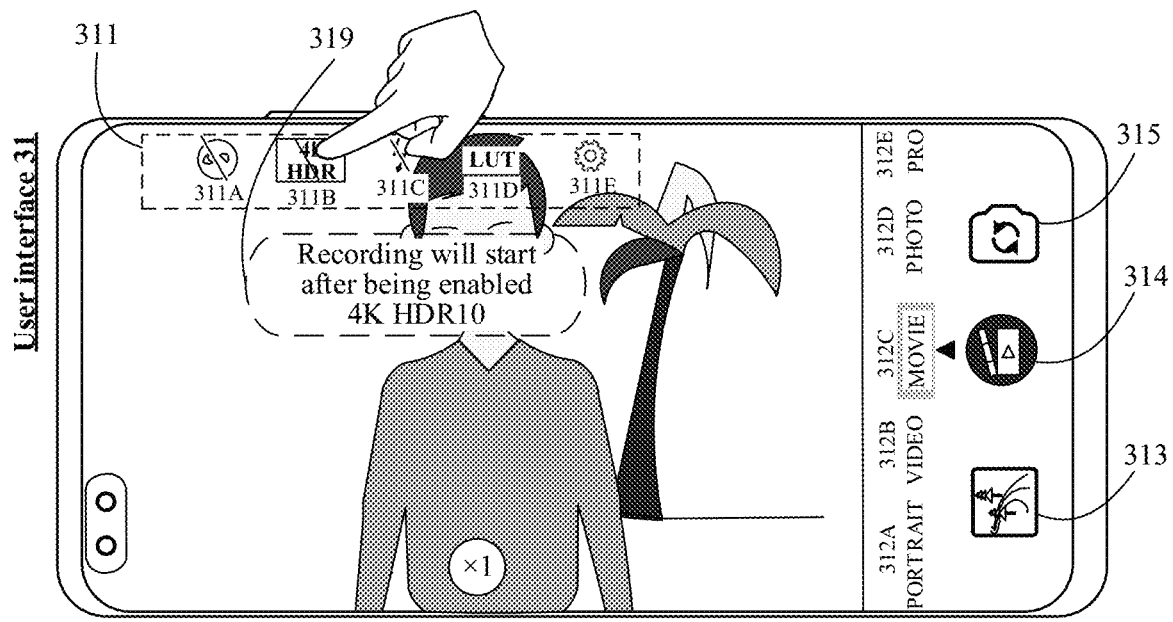
Figure 3E:
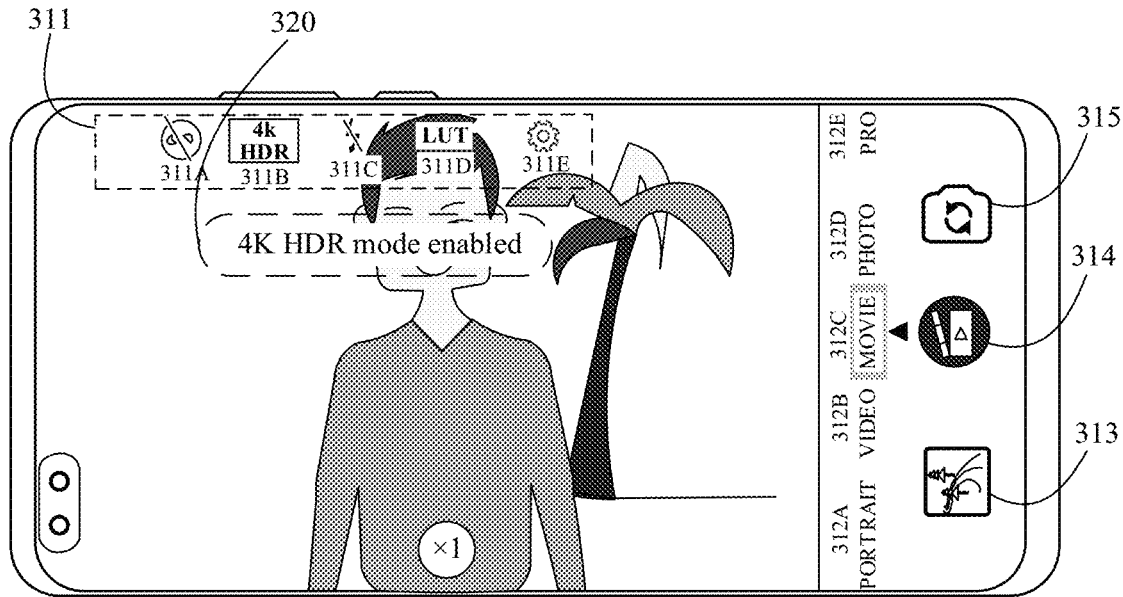

As shown in FIG. 3C, a direction in which icons such as the gallery shortcut key 313, the camera flip control 315, the movie shutter control 316, and the function option 311 are displayed is the same as a direction in which the icons are displayed when the electronic device 100 is placed in the landscape orientation. In FIG. 3C, ×1 refers to a single focal length.

When the movie mode is enabled, second prompt information 318 may be output when shooting in the landscape orientation is performed for the first time, for example, "a 4K HDR10 video will be recorded after enabled". In this case, as shown in a user interface 31 shown in FIG. 3D, the user may manually tap a 4K HDR option 311B to enable the 4K HDR function, and the electronic device 100 detects that the user performs a touch operation for the 4K HDR option 311B. In response to this operation, the electronic device 100 enables the 4K HDR function, and displays a user interface 31 shown in FIG. 3E, and the preview screen switches to 4K HDR10 picture quality. Third prompt information 319 such as "4K HDR mode enabled" is displayed on the user interface 31 shown in FIG. 3E. In an optional embodiment, when the movie function of the camera application is used for the first time, the second prompt information is output, and the second prompt information may be displayed in any appropriate form, for example, in a form of a bubble. When the second prompt information is provided for the first time, the second prompt information does not disappear automatically. The user needs to manually tap any space in the user interface or trigger the electronic device to cancel displaying the second prompt information after performing a preset operation. The preset operation may include but is not limited to: a slide operation in the user interface, an operation of shaking the electronic device, and the like. If the user does not use 4K HDR when shooting a movie, a prompt is provided again at a preset period, for example, after a week, until the user touches the second prompt information when shooting a movie and no prompt will be provided. Certainly, this is not limiting, and the second prompt information may be output each time the movie mode is enabled.

4k refers to the resolution of the screen. The resolution of 4k is 4096×2160. HDR (High-Dynamic Range, high-dynamic range) is a rendering technology of the screen. In comparison with a common image, 4K HDR10 may provide more dynamic ranges and image details, and can better reflect a visual effect in the real environment. 10 in 4K HDR10 indicates 10 bits. In 4K HDR10, a video can be recorded in a 10-bit high dynamic range, and this mode enables a video recorded by the electronic device 100 to have a resolution of 4K, 30 fps. By default, the 4k HDR mode is initially in the off state. In this case, a slash indicating that the switch is off is set on the 4K HDR option 311B. When the electronic device 100 detects that the user performs the touch operation used for the 4K HDR option 311B, in response to the operation, the electronic device 100 enables the 4k HDR mode, and a slash that is set on the 4K HDR option 311B and that is used to indicate that the switch is off disappears.

It should be noted that, the electronic device 100 may also display the second prompt information 318 each time the movie shooting function is enabled, or display the second prompt information at an interval of a preset period, where the preset period may be set to 1 week, 10 days, 15 days, or the like. This is not specifically limited in this embodiment of this application.

In an optional embodiment, after the electronic device enables the 4K HDR mode, if the user places the camera application in the background, for example, return to the desktop or enter the gallery from the lower left corner, the 4K HDR mode is automatically disabled by default. When the user switches the mode in the camera, the 4K HDR mode remains enabled.

In an optional embodiment, when the movie mode is enabled, the electronic device 100 enables an AI film tone function by default, where the AI film tone function takes into consideration AI intelligent identification and an LUT function. Certainly, this is not limiting, and the user may alternatively manually touch an LUT option 311D to enable the AI intelligent identification and the LUT function. When the electronic device 100 detects a touch operation performed by the user on the LUT option 311D, in response to this operation, the electronic device enables the AI intelligent identification and the LUT function.

Figure 3F:
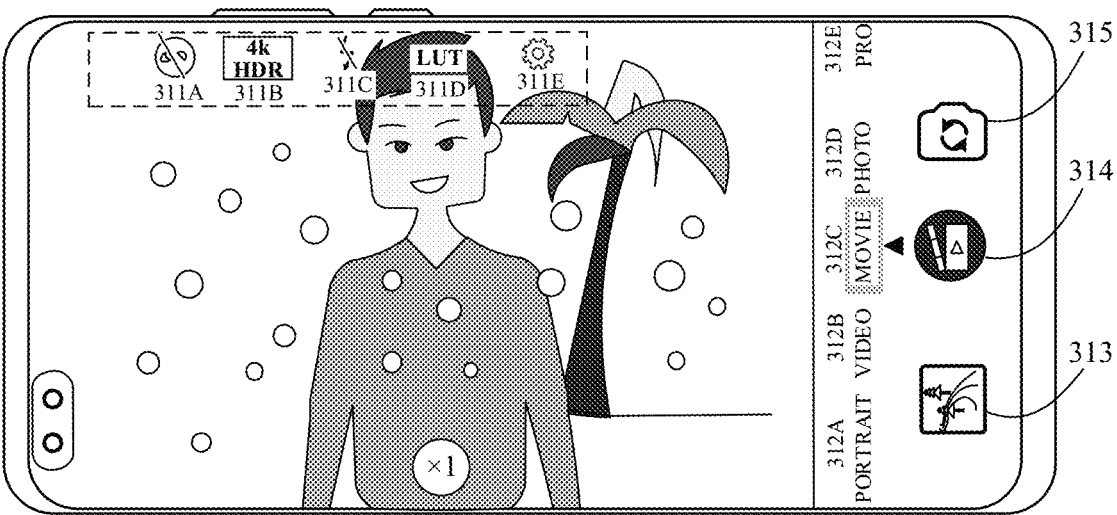

After the AI intelligent identification is enabled, the electronic device 100 displays a user interface 31 shown in FIG. 3F. The AI intelligent identification function can identify a photographing scenario. In a scenario identification process, the electronic device 100 displays a dynamic effect as shown in FIG. 3F, so that preview experience of the user can be improved. It should be noted that, FIG. 3F is only an example in which a wave point dynamic effect is displayed on the preview interface. This shows an example of the dynamic effect in the scenario identification process. In an actual implementation process, the dynamic effect displayed in the scenario identification process may be flexibly set by a person skilled in the art or the user. This is not specifically limited in this embodiment of this application.

After enabling the AI intelligent identification function, the electronic device 100 identifies the photographing scenario based on one or more frames of images displayed in the preview interface, and recommends an LUT template based on the determined photographing scenario. The LUT template may be used to adjust the color value of the image. Different LUT templates can bring different display effects to the preview image displayed on the preview interface. For specific description of the LUT template, refer to the related description in FIG. 3I.

In some embodiments, the electronic device 100 may identify the photographing scenario based on an image parameter (for example, brightness or saturation) of the preview image and picture content of the image, and then recommend an LUT template based on the photographing scenario. In other words, the electronic device 100 may intelligently recommends a suitable LUT template based on the image displayed on the preview interface.

Specifically, manners in which the electronic device 100 intelligently identifies the photographing scenario may include but is not limited to:

Manner 1: The electronic device 100 determines the photographing scenario based on the picture content of the image.

The picture content of the image may include characters, animals, food, scenery, buildings, indoor, outdoor, and the like. For example, when the electronic device 100 identifies that the image includes a character, the electronic device 100 determines that the photographing scenario of the image is a portrait scenario. In an optional manner, the electronic device determines the photographing scenario based on a proportion of an identified subject object in the image; and determine the photographing scenario based on a subject object with a largest proportion. For example, when the electronic device 100 identifies that the image includes a person and an animal, the electronic device 100 separately determines a proportion of each of the identified person and animal in the entire image picture. For example, if the proportion of the person is greater than the proportion of the animal, it is determined that the photographing scenario is a human image scenario. On the contrary, if the proportion of the person is less than the proportion of the animal, it is determined that the photographing scenario is an animal scenario. Specifically, the electronic device 100 may identify the picture content in the image by using an AI identification algorithm.

Manner 2: The electronic device 100 determines a brightness level and a saturation level of an image, and determines the photographing scenario based on a combination of the brightness level, the saturation level, and picture content of the image.

The brightness of the image is a brightness degree of the image, and a numerical value thereof ranges from 0 to 255. A smaller value indicates lower brightness, and a larger value indicates higher brightness. The electronic device 100 may divide a brightness value into a plurality of brightness levels. For example, the electronic device 100 may classify five levels based on the brightness value of the image: highlight, bright, midtone, shadow, and black. A brightness value corresponding to the highlights may be from 225 to 255, a brightness value corresponding to the brights may be from 169 to 225, a brightness value corresponding to the midtone may be from 94 to 169, a brightness value corresponding to the shadows may be from 33 to 94, and a brightness value corresponding to the black may be from 0 to 33. Specifically, the electronic device 100 may determine the brightness level of the image based on the brightness value of the image.

The saturation of the image refers to vividness of a color of the image. A larger quantity of colors of the image indicates a higher saturation. The electronic device 100 may divide the saturation of the image into a plurality of saturation levels, for example, the saturation may be divided into three levels: high saturation, medium saturation, and low saturation. A saturation value corresponding to the high saturation is from 67 to 100, a saturation value corresponding to the medium saturation is from 34 to 66, and a saturation value corresponding to the low saturation is from 0 to 33. Specifically, the electronic device 100 may determine the saturation level of the image based on the saturation of the image.

After determining the brightness level, the saturation level, and parameters of three dimensions of the photographing scenario identified by using the picture content, the electronic device 100 determines the LUT template based on a template comparison table. The LUT template may include but is not limited to: sprightly (movie A), fresh (movie B), elegant (movie C), black and white (movie E), rich (movie F), mystical (movie G), "DAZZLING", "CLASSIC", "NOSTALGIA" and "PURE".

The following uses a specific example to describe a template recommendation principle. If the electronic device 100 identifies that an element such as a sun or a sun halo or a sky exists in the picture based on the image, the electronic device 100 determines that the photographing scenario is a landscape scenario; and then if the electronic device 100 determines that the brightness level of the image is midtone and the saturation is high based on the brightness and saturation of the image, the electronic device 100 determines that the LUT template corresponding to the image is "Gorgeous", and the movie corresponding to the template is "Movie C". When the electronic device 100 adjusts the display effect of the image by using the LUT template, the LUT template can make an overall tone of the image light orange, to highlight an atmosphere of a scenario in daylight.

It may be understood that the process in which the electronic device 100 intelligently recommends the template is merely an example for description, and there may be another recommending process in the embodiment of this application. For example, after identifying the picture content of the image, the electronic device 100 may further determine a proportion of the picture content in the image, and determine the LUT template based on an influence factor of the proportion of the picture content in the image, that is, different proportions of the picture content. In other words, when the proportion of the picture content in the image is different, the LUT template finally determined by the electronic device 100 may be different.

Figure 3G:
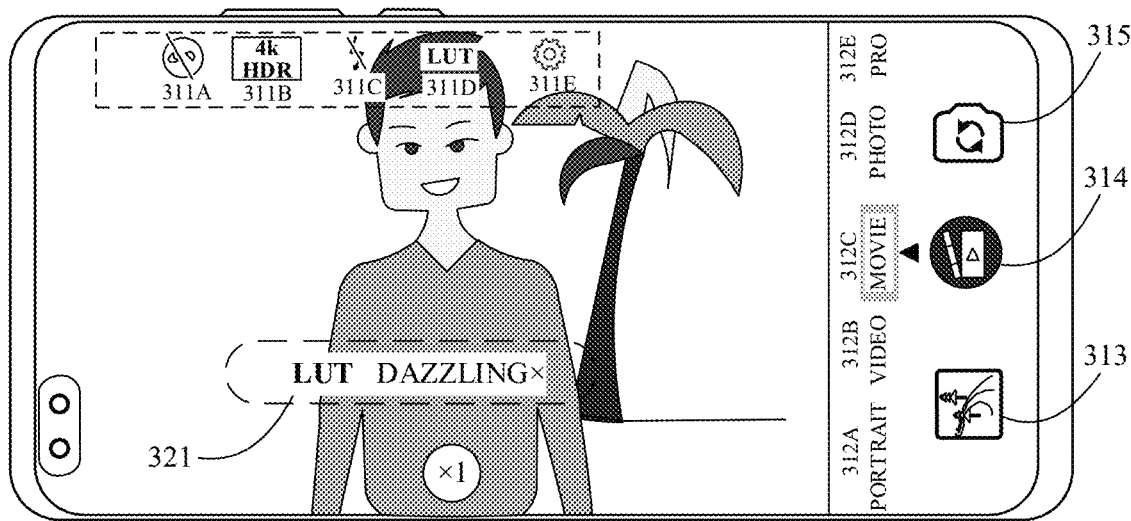
Figure 5A:
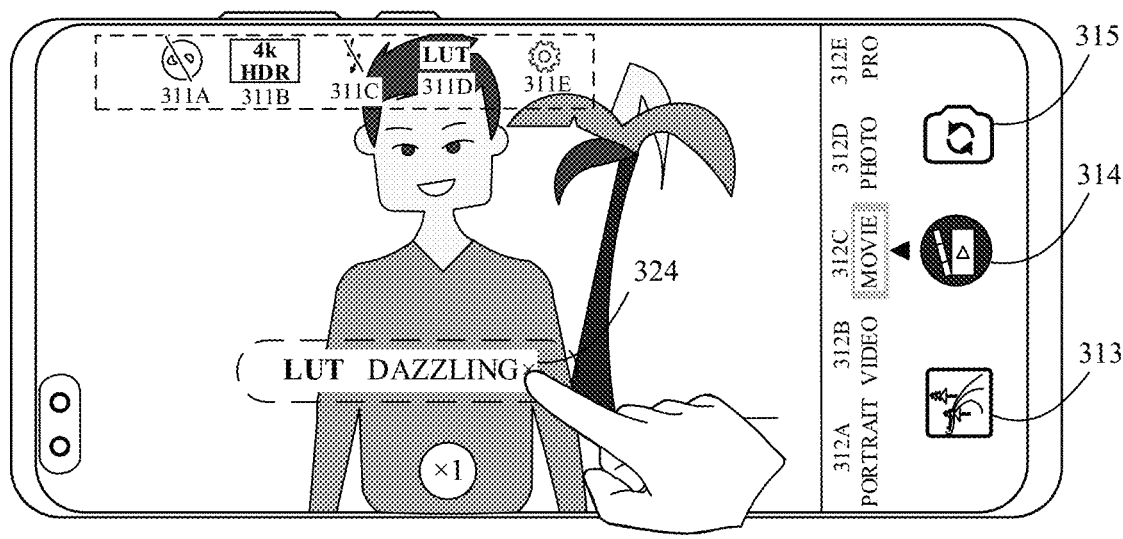
FIG. 5A and FIG. 5B are schematic diagrams of user interfaces of disabling AI scenario identification according to an embodiment of this application.
Figure 5B:
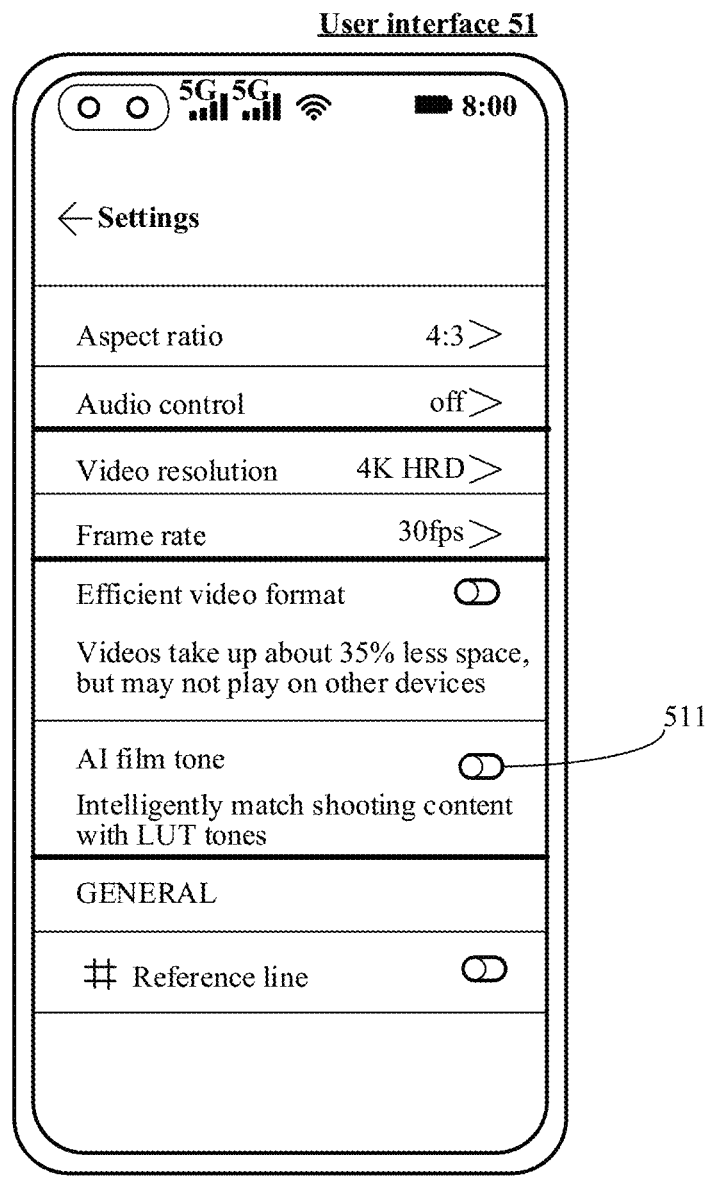

After the electronic device completes AI intelligent scenario identification, the electronic device 100 displays a user interface 31 shown in FIG. 3G, and displays a scenario bubble button 312 "LUT DAZZLING" in the preview image, which indicates that the photographing scenario matches the DAZZLING LUT template. The displayed scenario bubble button 312 further includes a "x" switch, so that the user can turn off the scenario bubble button 312. As shown in FIG. 5A, when it is detected that the user taps the "x" switch, the electronic device 100 turns off an AI film tone switch 511 in a user interface 51 shown in FIG. 5B. After the electronic device 100 recommends the scenario bubble button 312 corresponding to the LUT template that matches the photographing scenario, it may reflect that the user does not want the electronic device 100 to recommend an LUT template. Therefore, to avoid repeatedly performing AI intelligent scenario identification, the electronic device automatically turns off the AI film tone switch 511. It should be noted that, in an actual implementation process, an upper limit of a quantity of times that the user taps the "x" switch may be set, and when it is detected that the quantity of times that the user taps the "x" switch exceeds the upper limit in a single photographing process, an operation of turning off the AI film tone switch 511 is performed.

It should be noted that, when the AI film tone switch 511 is in an on state, if view finding is switched to another scenario, the electronic device 100 may re-identify the photographing scenario, and recommend a matching LUT template.

Figure 3H:
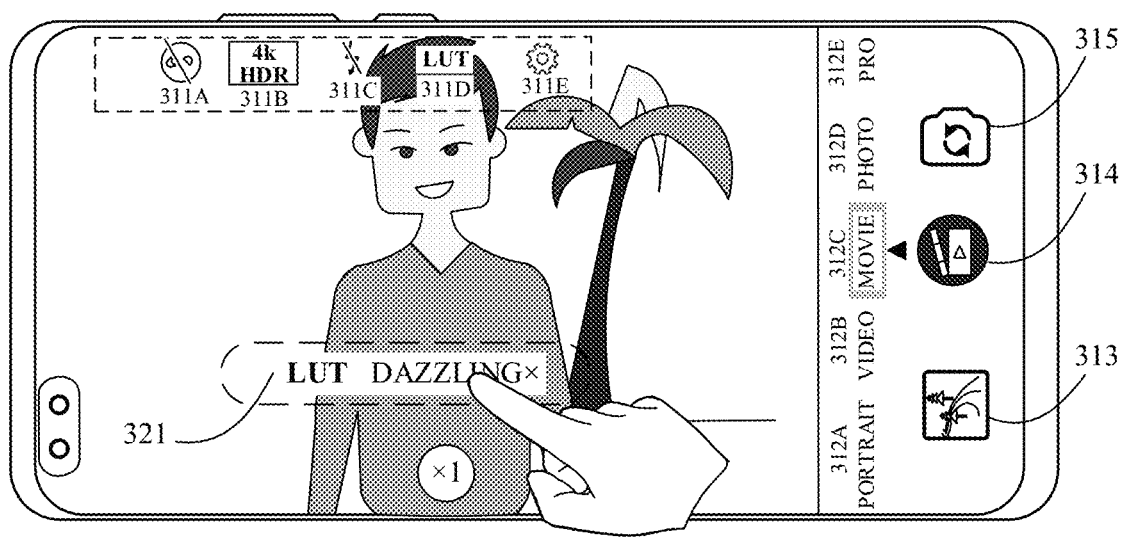
Figure 3I:
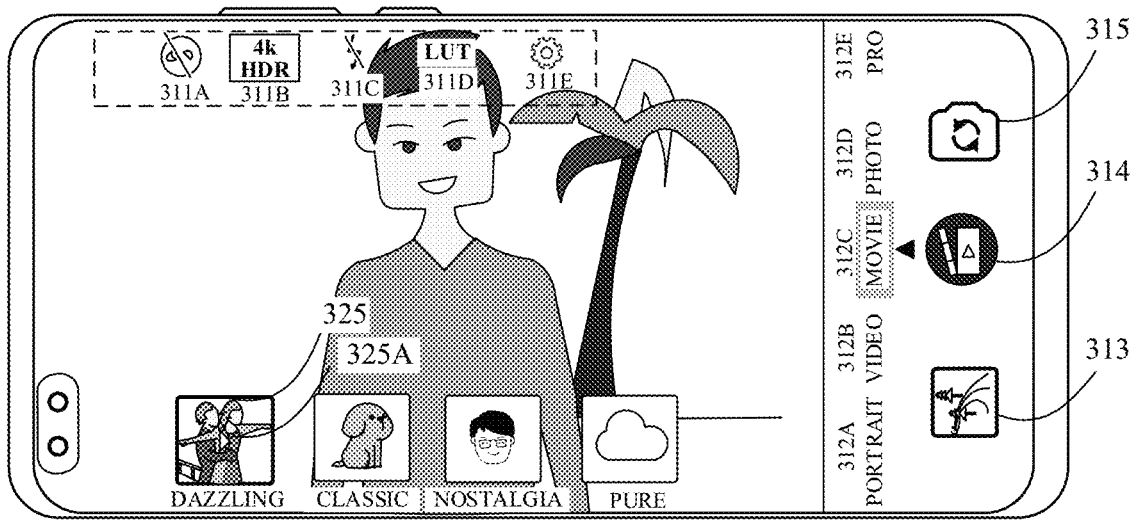
Figure 3J:
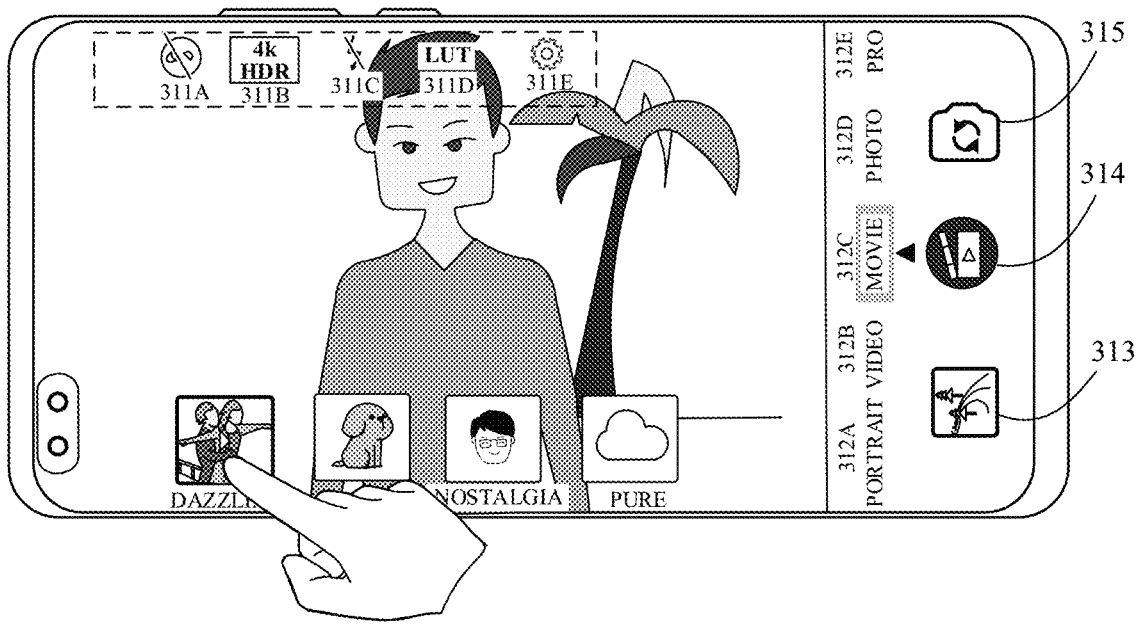
Figure 3K:
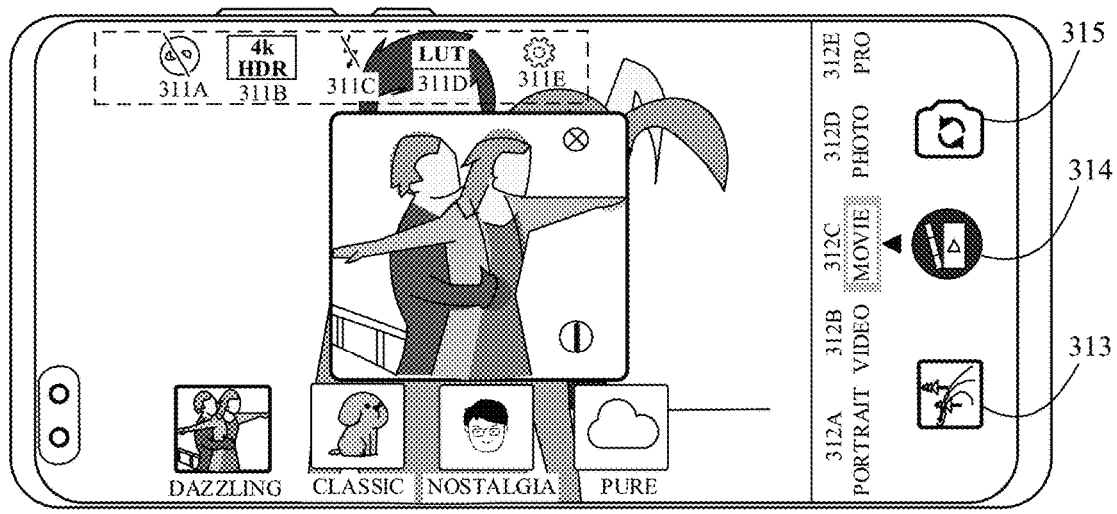

As shown in FIG. 3H, the user may trigger the electronic device to display a user interface 31 shown in FIG. 3I by tapping another region of the scenario bubble button 312 other than the "x" switch. The user interface 31 shown in FIG. 3I includes one or more LUT templates that are internally preset or online loaded by the electronic device 100, and each template displays a movie screen corresponding to a movie subject of the electronic device 100, and a name of the LUT template. For example, the name may be a name of the movie corresponding to the LUT template, or a name related to the movie, for example, "DAZZLING", "CLASSIC", "NOSTALGIA" and "PURE" shown in FIG. 3I. The identified LUT template 325 that matches the user photographing scenario may be highlighted to indicate that the LUT template 325 has been automatically selected. For example, the LUT template 325 has a bold border. Certainly, this is not limiting. When the LUT template 325 is highlighted, the template may be further enlarged or suspended. In addition, the LUT template 325 further includes a playback control 325A, and the playback control 325A is used to prompt the user that the template may be displayed as a playable video. As shown in FIG. 3J, the user may touch the playback control 325A to trigger the electronic device 100 to display a video picture corresponding to the LUT template 325. The playback control 325A detects a touch operation of the user. In response to the operation, the electronic device 100 may display a user interface 31 shown in FIG. 3K, and play the video picture corresponding to the LUT template 325. It should be noted that, each LUT template in the user interface 31 is merely an example for description, and the LUT template may be flexibly set by a person skilled in the art.

Figure 3L:
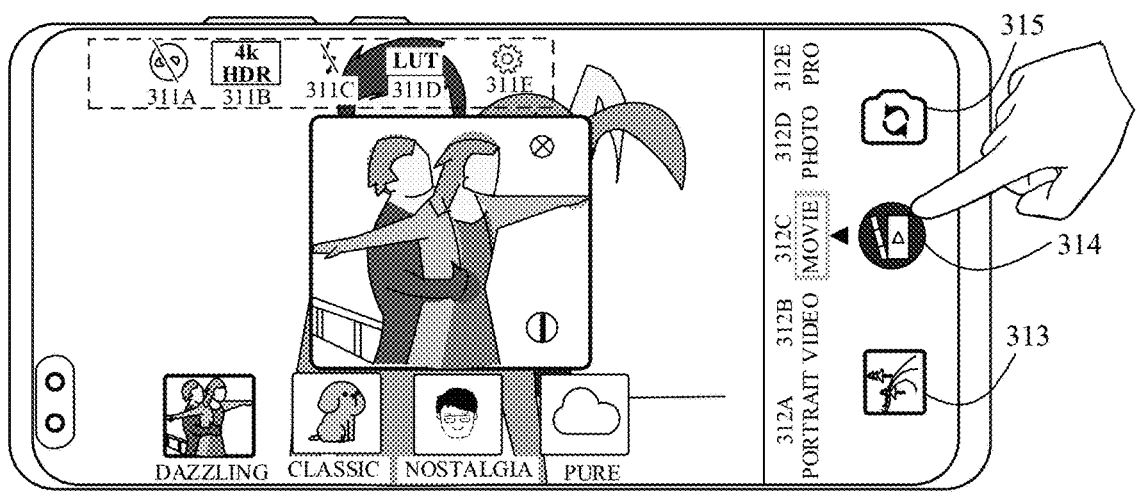
Figure 3M:
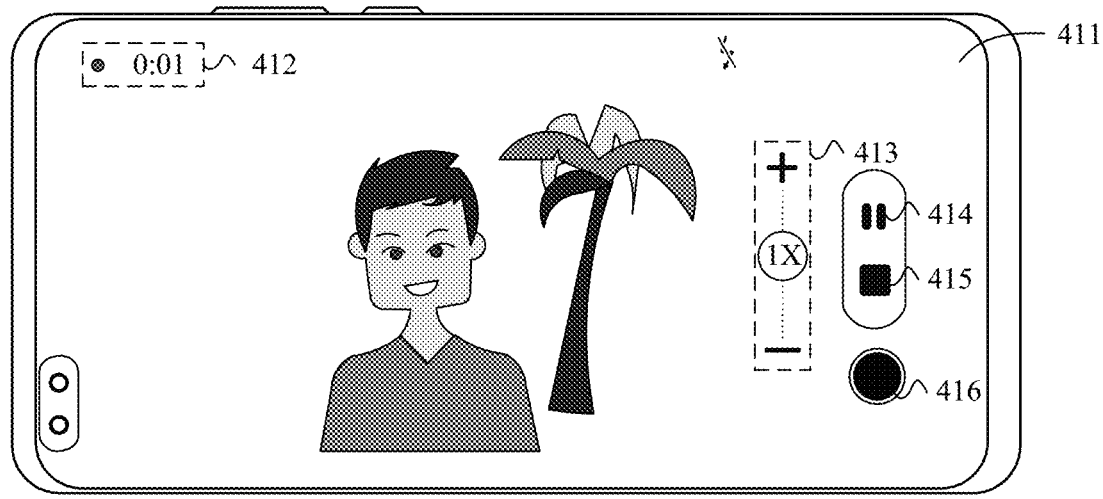

After the user previews the video picture corresponding to the LUT template 325, if an effect on the video picture is satisfactory, as shown in a user interface in FIG. 3L, the user triggers the electronic device 100 to use the previewed LUT template to perform movie shooting by touching a movie shutter control 314. The user's touch on the movie shutter control 314 may be a tap operation. After the user's touch operation on the movie shutter control 314 is received, a control transition dynamic effect is displayed. As shown in FIG. 3M, after detecting the tap operation on the movie shutter control 314, the electronic device 100 renders the photographed movie picture by using the LUT template. In some embodiments, in the movie shooting process, the electronic device 100 may automatically enable the LOG function to obtain a gray movie. The gray movie may be stored in the gallery application, and the tone of the gray movie is changed by using the LUT template selected by the user, so that the gray tone of the video is restored to a bright tone. This processing manner of the picture in movie shooting different from that the electronic device 100 uses the LUT template before video recording or photographing, the electronic device 100 uses the LUT template to adjust the display effect of the image after obtaining the gray movie, so that flexibility and freedom of the user in adjusting the image display effect are enhanced.

As shown in FIG. 3M, the user interface 41 is a user interface provided when the electronic device 100 records a movie. The user interface 41 includes a recording box 411, a recording time 412, a zoom control 413, a pause recording control 414, an end recording control 415, and a photographing control 416. The recording box 411 displays the image collected by the camera, or further, displays an image adjusted by the electronic device 100 based on a movie shooting parameter, for example, an image adjusted by the electronic device 100 after enabling the 4KHDR function, the LUT function, and the AI scenario identification function. In addition, the electronic device 100 may record content in the recording box 411 as a movie. The recording time 412 is used to display a time interval from a time at which the electronic device 100 starts recording the movie to a current time. For example, when the recording time 412 is displayed as "00:01", it indicates that the electronic device 10 has recorded a video of 1 second. The zoom control 413 may be used to adjust and display zoom magnification of the electronic device 100. The pause recording control 414 may be used to pause recording of a video, the end recording control 415 may be used to end recording of a video, and save the movie recorded by the electronic device 100 in a gallery, and the photographing control 416 may be used to monitor an operation performed by the user to trigger photographing during video recording.

After the electronic device 100 displays a plurality of LUT templates on the user interface, as shown in FIG. 4A to FIG. 4D which are schematic diagrams of user interfaces of previewing an LUT template by a user, the user may also manually switch the LUT template, and preview video pictures corresponding to different LUT templates.

Figure 4A:
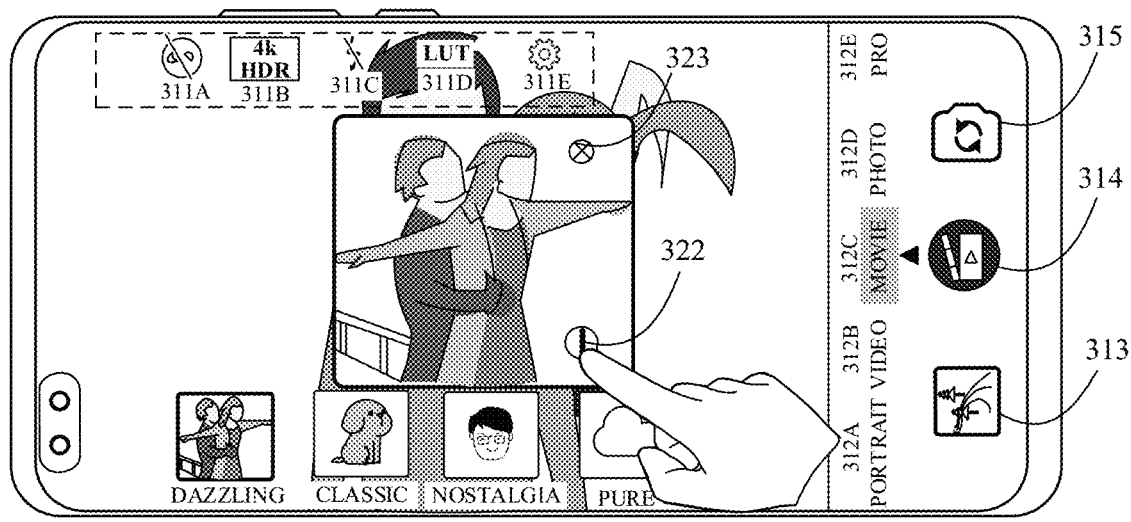
FIG. 4A to FIG. 4D are schematic diagrams of user interfaces of previewing an LUT template according to an embodiment of this application.
Figure 4B:
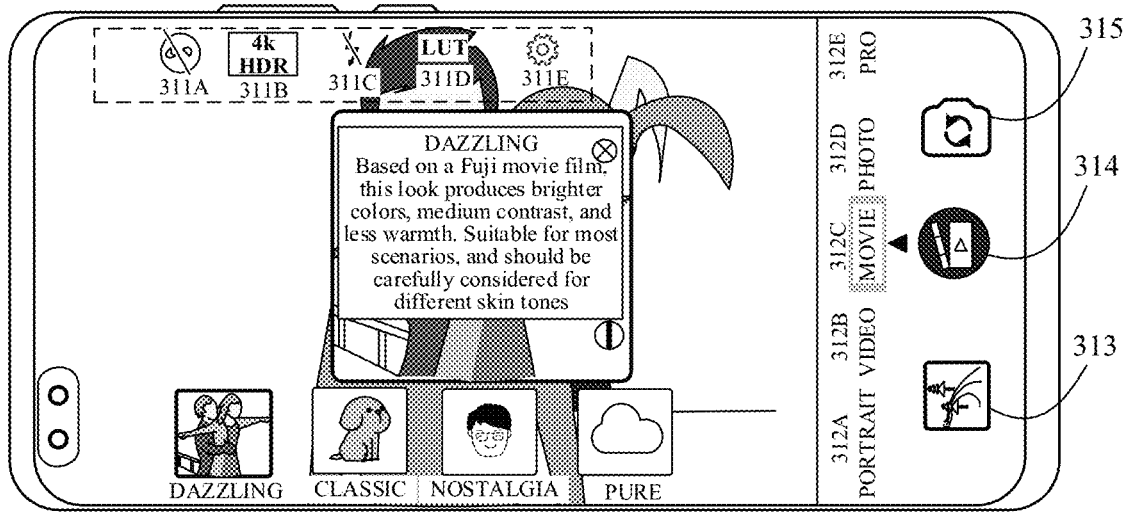

As shown in FIG. 4A, in a playback window of the video picture corresponding to the LUT template, in addition to the played video picture, the playback window further includes a first control 322 and a close control 323. The user may close the played video picture by touching the close control 323, or the user may trigger, by touching the first control 322, the electronic device to display a user interface 31 shown in FIG. 4B. In the playback window in FIG. 4B, a sample movie introduction of an LUT template corresponding to a currently previewed video picture is displayed, which facilitates the user to understand an effect of the LUT template. For example, as shown in FIG. 4B, in the case of a "DAZZLING" LUT template, after a tap operation on the first control 322 is received, a sample movie about "DAZZLING" is displayed, which describes "Based on a Fuji movie film, this look produces brighter colors, medium contrast, and less warmth. Suitable for most scenarios, and should be carefully considered for different skin tones".

Figure 4C:
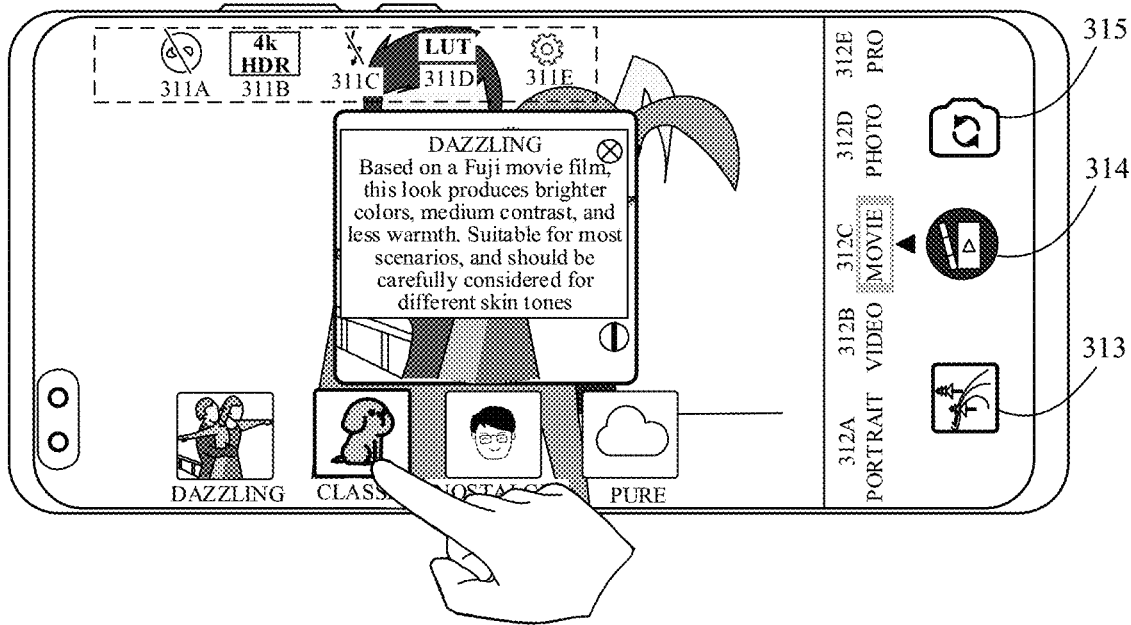
Figure 4D:
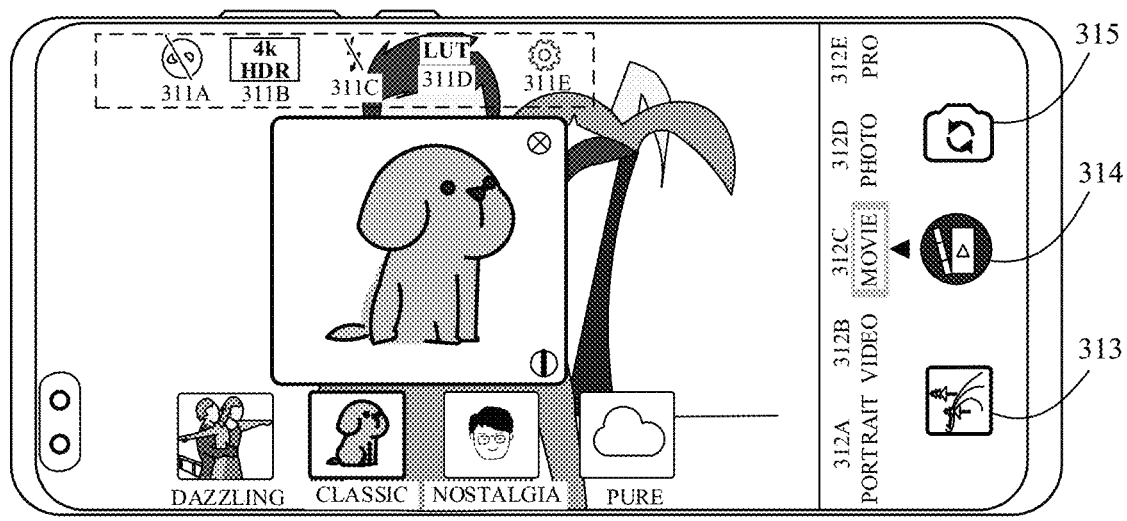

As shown in FIG. 4C and FIG. 4D, in addition to viewing the video picture corresponding to the LUT template recommended by the electronic device and related descriptions of the LUT template, the user may further switch to preview another LUT template provided by the electronic device. For example, the user may manually tap a pre-switch LUT template. After detecting that the user performs the touch operation of switching the LUT template, the electronic device 100 plays a video picture corresponding to the switched LUT template in the playback window.

In some embodiments, the electronic device 100 may also select the LUT template based on a slide operation of the user. The user moves a position of each LUT template in the user interface 31 by using a left-right slide operation. When the electronic device 100 no longer detects the slide operation of the user, the electronic device 100 uses the first displayed LUT template as the LUT template selected by the electronic device 100.

The foregoing is an example of a scenario in which both the 4KHDR and AI scenario identification functions are enabled in the movie shooting process, which may also be referred to as a scenario in which both the 4KHDR and AI film tone functions are enabled. By default, the LUT function is enabled in the movie mode.

FIG. 6A to FIG. 6M, FIG. 7A to FIG. 7D, and FIG. 8A and FIG. 8B show some user interfaces at a time of starting movie shooting when 4KHDR is not enabled and the AI film tone function is enabled.

Figure 6A:
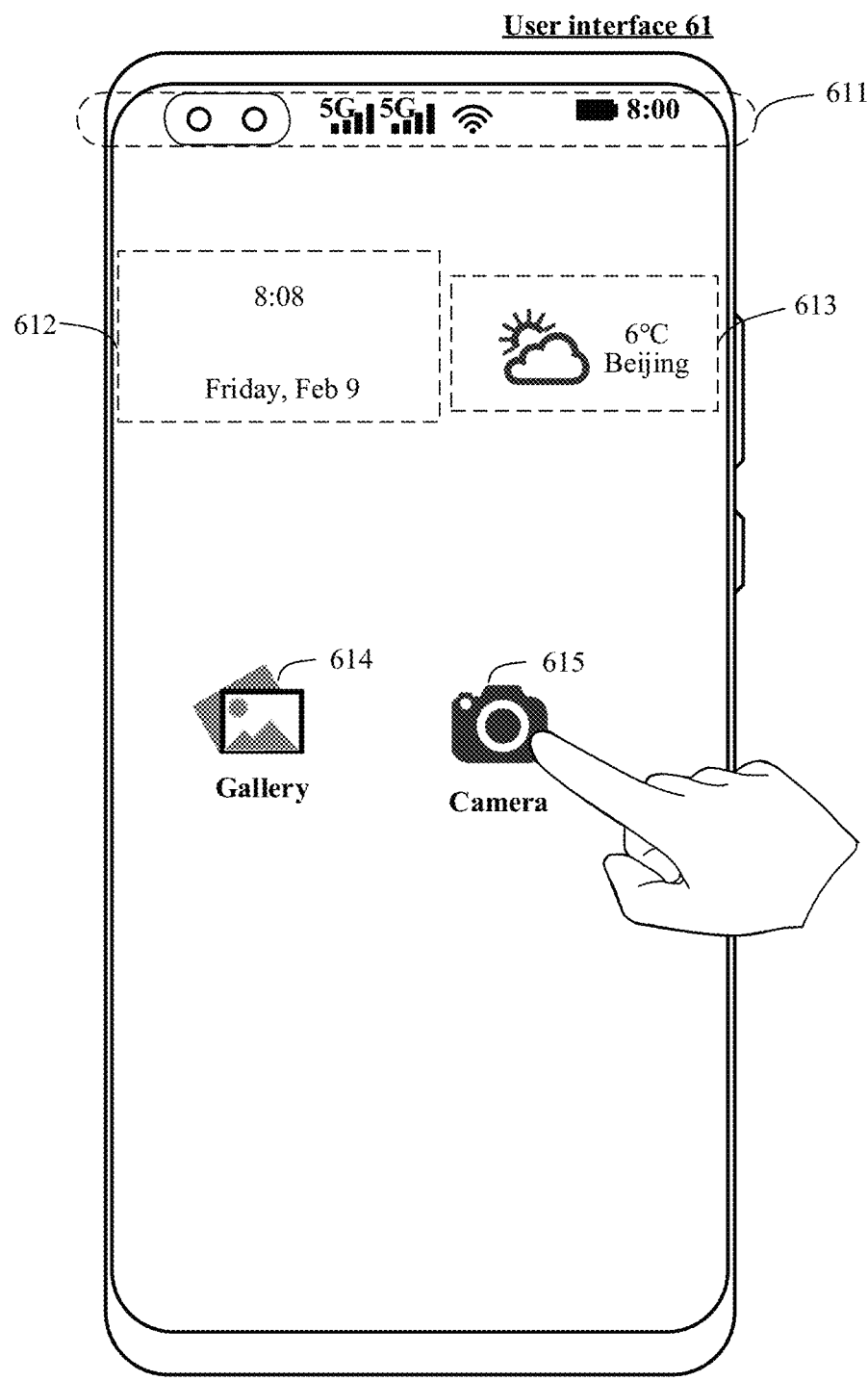
FIG. 6A to FIG. 6M are schematic diagrams of user interfaces of a second movie shooting scenario according to an embodiment of this application.

FIG. 6A shows an example user interface 61 that is on the electronic device 100 and that is used for an application menu. The user interface 61 may include: a status bar 611, a calendar indicator 612, a weather indicator 613, a gallery application 614, and a camera application 615. For specific description of each interface element included in the user interface 61, refer to related description of FIG. 3A. Details are not described in this embodiment of this application.

In some embodiments, for example, the user interface 61 shown in FIG. 6A may be a home screen (Gome screen).

It may be understood that FIG. 6A merely shows an example of a user interface on the electronic device 100, and should not constitute a limitation on this embodiment of the application.

Figure 6B:
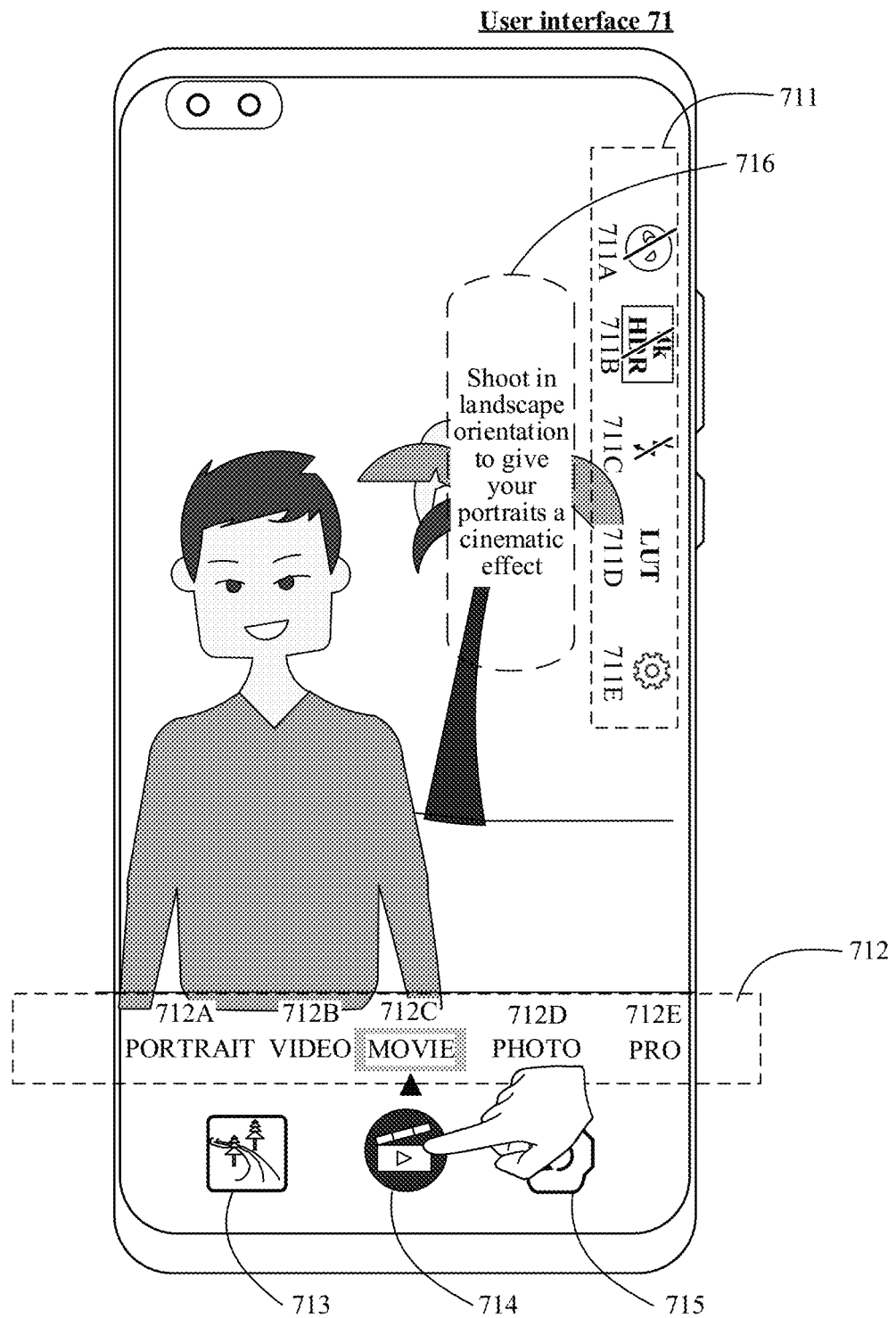

As shown in FIG. 6A, the electronic device 100 may detect a touch operation performed by the user on the camera application 615, and in response to the operation, the electronic device 100 displays a user interface 71 as shown in FIG. 6B. The user interface 71 may be a default photographing interface provided by the application when the electronic device 100 enables the camera application. It should be noted that, the application may also display the movie shooting interface by default after being enabled.

As shown in FIG. 6B, the user interface 71 may include: a preview box 711, a photographing mode list 712, a gallery shortcut key 713, a movie shutter control 714, and a camera flip control 715.

One or more movie shooting mode options may be displayed in the photographing mode list 712. The one or more photographing mode options may include: a portrait mode option 712A, a video mode option 712B, a photographing mode option 712D, a movie mode option 712C, and a professional option 712E. The one or more photographing mode options may be presented on the interface as text information, for example, "portrait", "video", "photo", "movie", and "professional". In addition, the one or more photographing mode options may also be represented as an icon or another form of interactive element (interactive element, IE) on the interface. For specific descriptions of the controls in the user interface 71 shown in FIG. 6B, refer to related descriptions in the user interface 31. Details are not described in this embodiment of this application.

As shown in FIG. 6B, when the movie mode is enabled, the electronic device 100 displays first prompt information 716 shown in FIG. 6B "Shoot in landscape orientation to give your portraits a cinematic effect". As shown in FIG. 6B, the preview interface includes a function option 711, and the function option 711 includes a slow motion option 711A, a 4K HDR option 711B, a flash option 711C, an LUT option 711D, and a settings option 711E. Each of the function options may be used to detect a touch operation of the user, and in response to the operation, a corresponding photographing function is enabled or disabled.

Figure 6C:
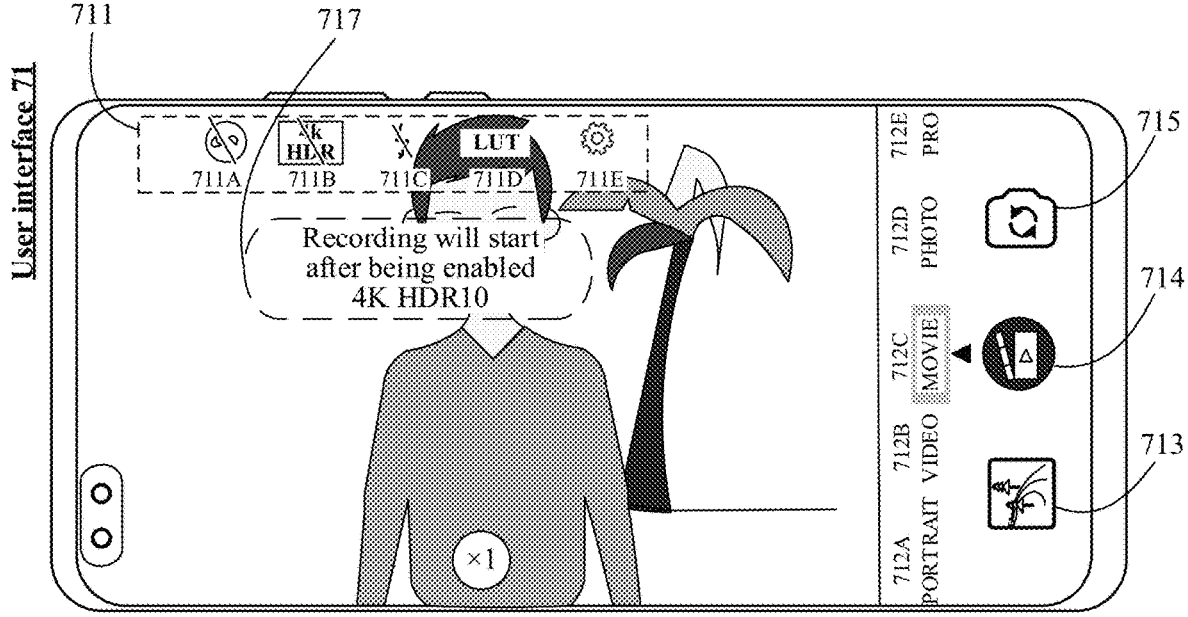
Figure 6D:
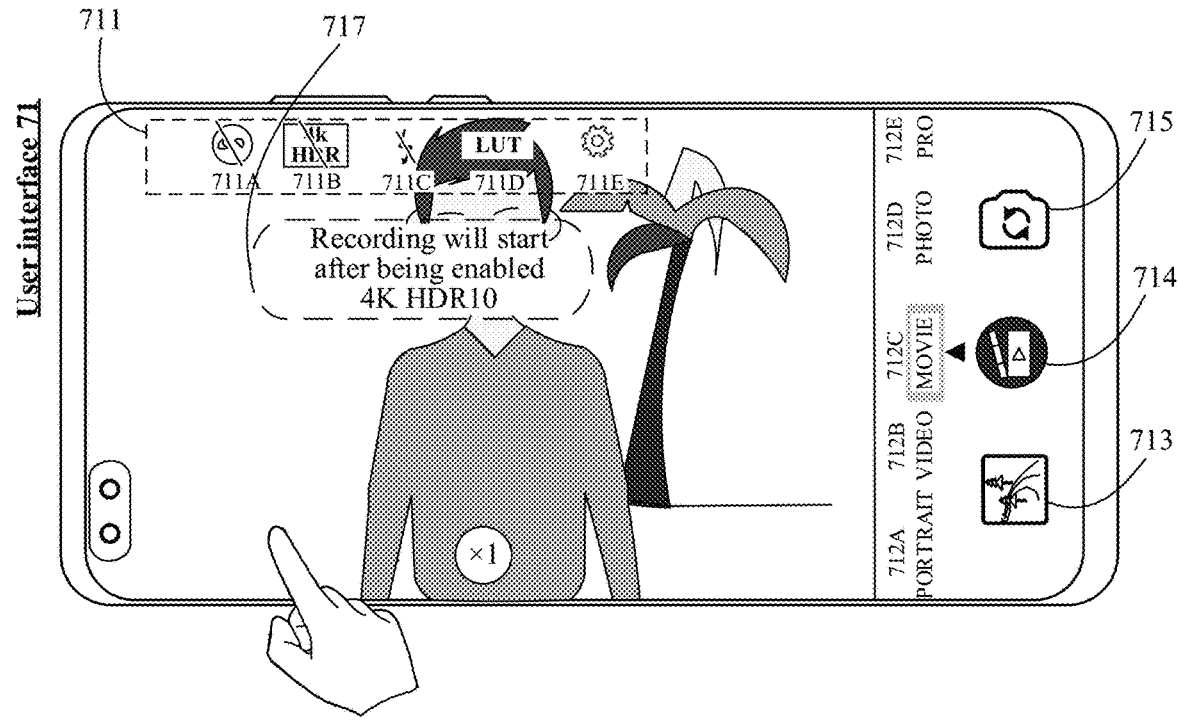
Figure 6E:
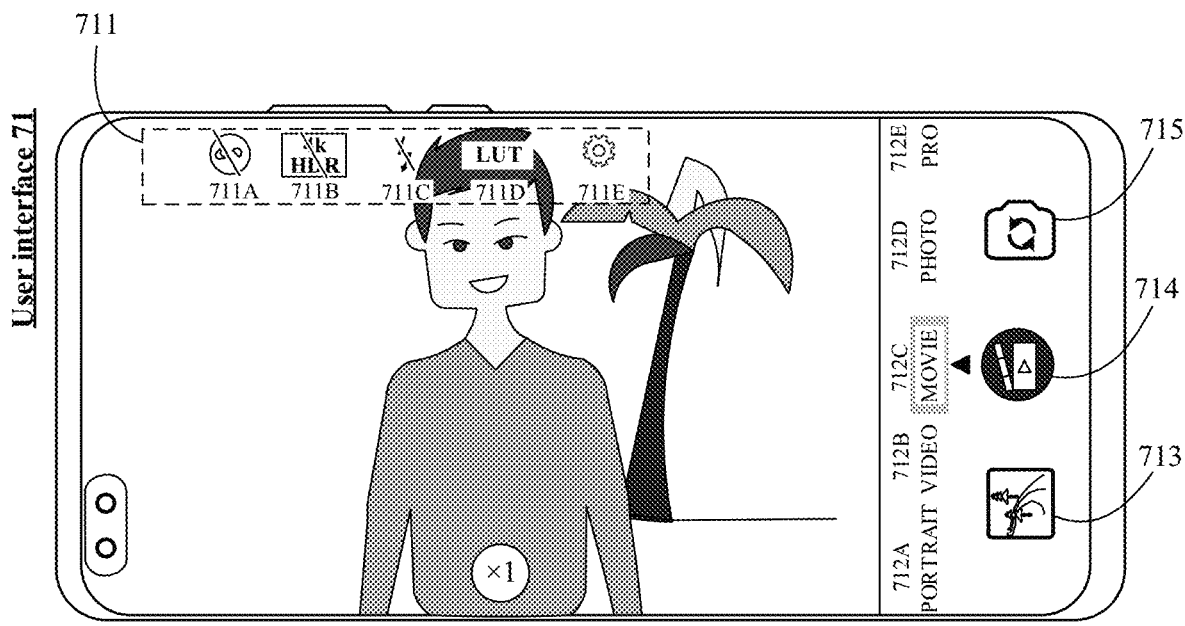

As shown in FIG. 6C, when the movie mode is enabled, second prompt information 717 may be output when shooting in the landscape orientation is performed for the first time, for example, "a 4K HDR10 video will be recorded after enabled", and the prompt instructs the user to enable the 4K HDR mode. In this case, as shown in a user interface 71 shown in FIG. 6D, the user may manually tap a blank space of the user interface to trigger the system to cancel displaying of the second prompt information, so as to keep the 4K HDR option 711B in a disabled state.

In an optional embodiment, when the movie function of the camera application is used for the first time, the second prompt information is output, and the second prompt information may be displayed in any appropriate form, for example, in a form of a bubble. When the second prompt information is provided for the first time, the second prompt information does not disappear automatically. The user needs to manually tap any space in the user interface or trigger the electronic device to cancel displaying the second prompt information after performing a preset operation. The preset operation may include but is not limited to: a slide operation in the user interface, an operation of shaking the electronic device, and the like. If the user does not use 4K HDR when shooting a movie, a prompt is provided again at a preset period, for example, after a week, until the user touches the second prompt information when shooting a movie and no prompt will be provided. Certainly, this is not limiting, and the second prompt information may be output each time the movie mode is enabled.

When the 4K HDR function is not enabled, resolution of the preview picture is lower than resolution of the preview picture when the 4K HDR function is enabled. For related description of the 4K HDR, refer to related content in the foregoing embodiment. When the electronic device 100 detects that the user taps the blank region of the user interface, the electronic device 100 displays a user interface 71 shown in FIG. 6E. The 4K HDR option 711B in the user interface 71 is in a disabled state. In the movie mode, the AI film tone function, that is, the AI intelligent identification function, is enabled by default in the electronic device 100, and the LUT function is enabled by default in the system. Certainly, this is not limiting, and the user may alternatively manually touch an LUT option 711D to enable the AI intelligent identification and the LUT function. When the electronic device 100 detects a touch operation performed by the user on the LUT option 711D, in response to this operation, the electronic device enables the AI intelligent identification and the LUT function.

Figure 6F:
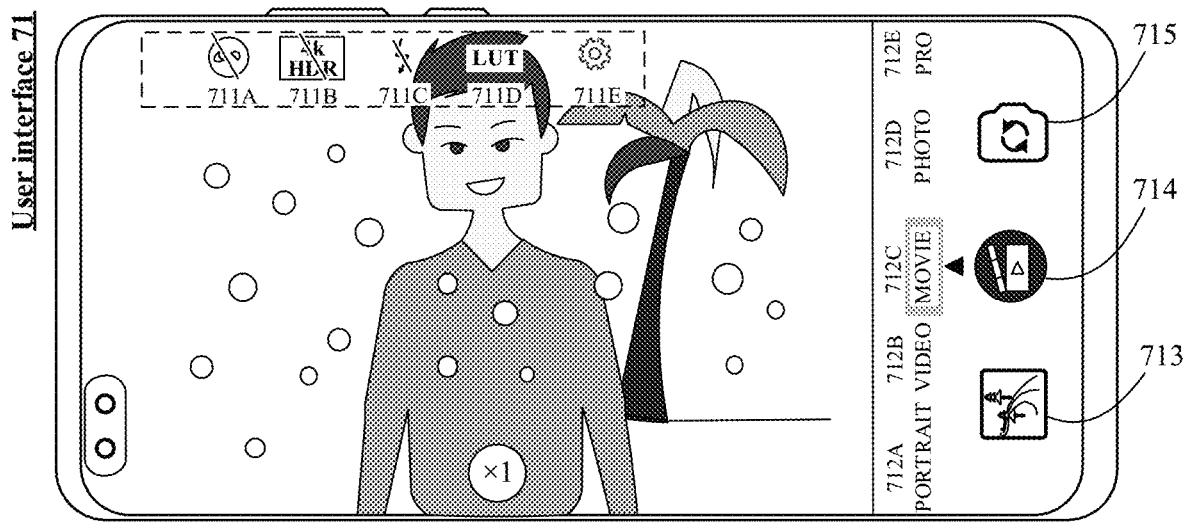

After the AI intelligent identification is enabled, the electronic device 100 displays a user interface 71 shown in FIG. 6F. The AI intelligent identification function can identify a photographing scenario. In a scenario identification process, the electronic device 100 displays a dynamic effect as shown in FIG. 6F, so that preview experience of the user can be improved. It should be noted that, FIG. 6F is only an example in which a wave point dynamic effect is displayed on the preview interface. This shows an example of the dynamic effect in the scenario identification process. In an actual implementation process, the dynamic effect displayed in the scenario identification process may be flexibly set by a person skilled in the art or the user. This is not specifically limited in this embodiment of this application.

After enabling the AI intelligent identification function, the electronic device 100 identifies the photographing scenario based on one or more frames of images displayed in the preview interface, and recommends an LUT template based on the determined photographing scenario. For related description of the LUT template function and the AI intelligent identification manner of the photographing scenario, refer to the related description in the foregoing embodiment.

Figure 6G:
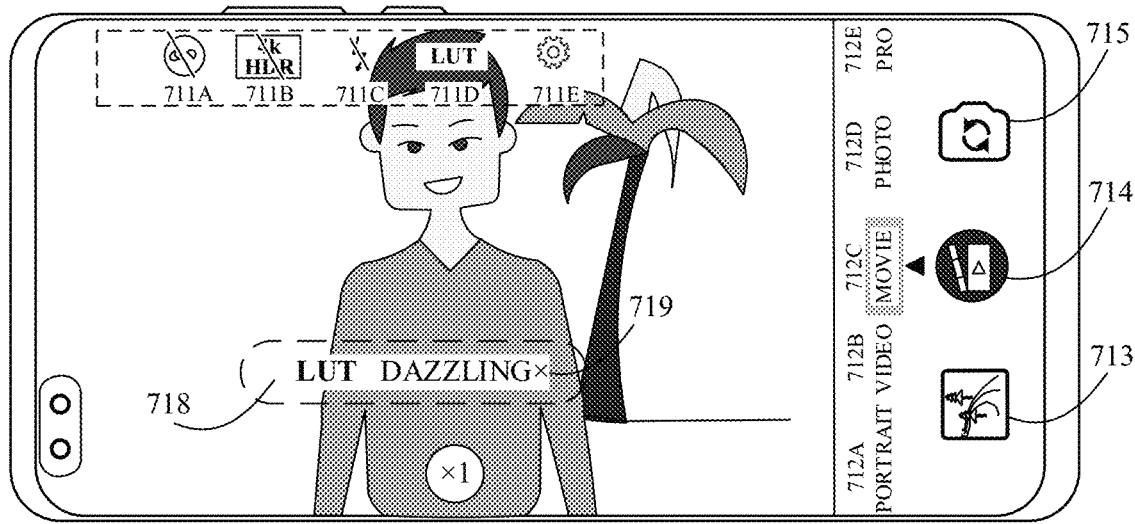
Figure 7A:
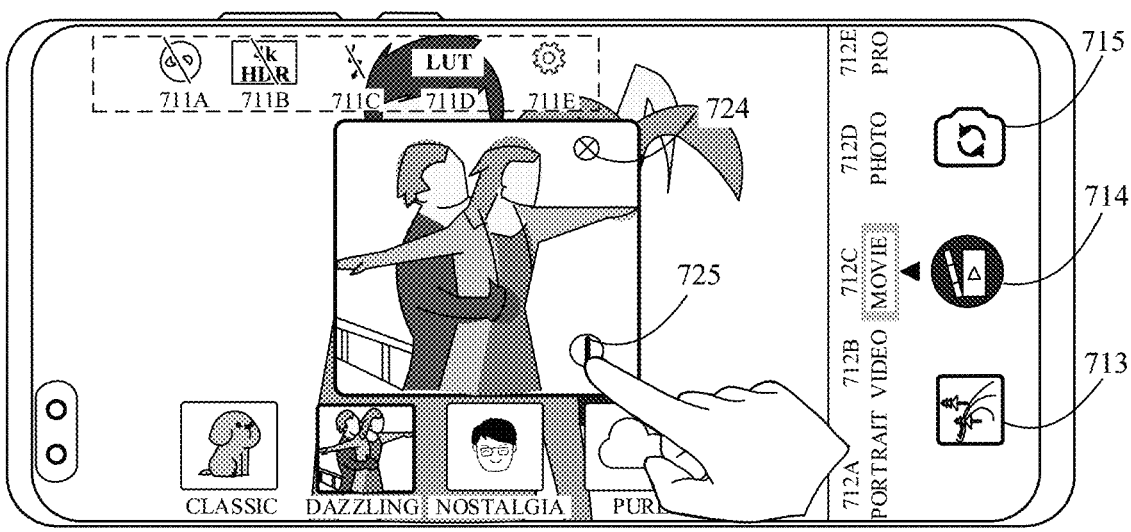
FIG. 7A to FIG. 7D are schematic diagrams of user interfaces of previewing an LUT template according to an embodiment of this application.

After the electronic device completes AI intelligent scenario identification, the electronic device 100 displays a user interface 71 shown in FIG. 6G, and displays a scenario bubble button 718 "LUT DAZZLING" in the preview image, which indicates that the photographing scenario matches the DAZZLING LUT template. The displayed scenario bubble button 718 further includes a "x" switch 719, so that the user can turn off the scenario bubble button 718. As shown in FIG. 7A, when it is detected that the user taps the "x" switch 719, the electronic device 100 turns off an AI film tone switch 901 in a user interface 91 shown in FIG. 7B. It should be noted that, in an actual implementation process, an upper limit of a quantity of times that the user taps the "x" switch may be set, and when it is detected that the quantity of times that the user taps the "x" switch exceeds the upper limit in a single photographing process, an operation of turning off the AI film tone switch 901 is performed. The upper limit value of the quantity of times of tapping the "x" switch may be set by a person skilled in the art based on an actual requirement, for example: set to 3, 2, or 5 times.

It should be noted that, when the AI film tone switch 911 is in an on state, if view finding is switched to another scenario, the electronic device 100 may re-identify the photographing scenario, and recommend a matching LUT template.

Figure 6H:
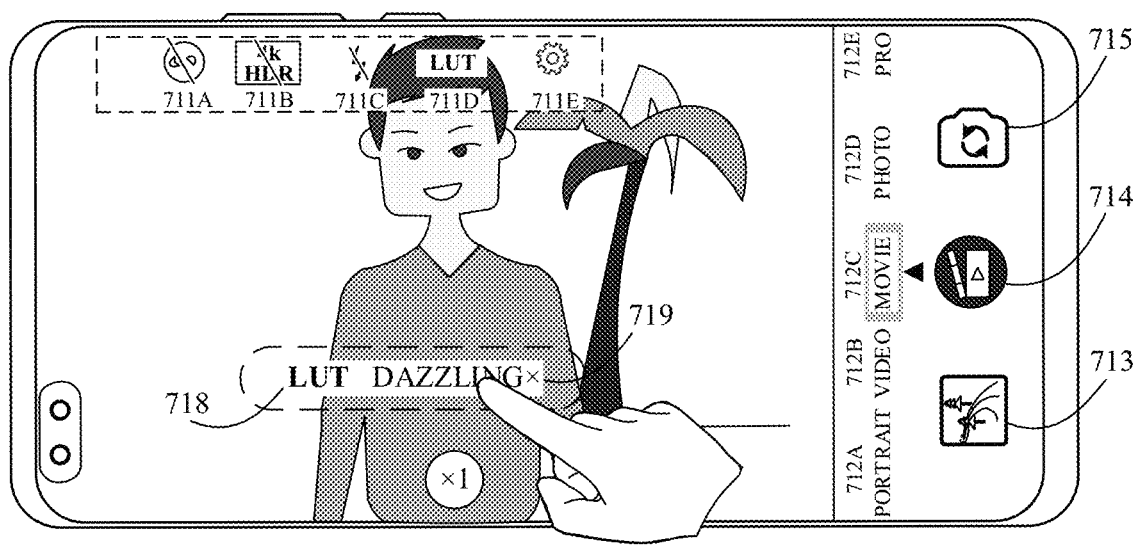
Figure 6I:
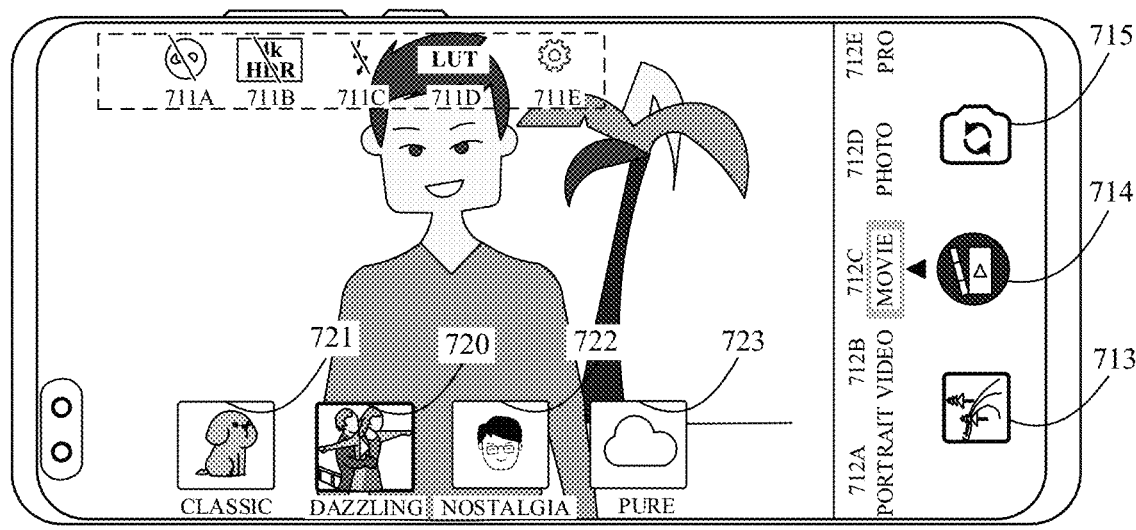
Figure 6J:
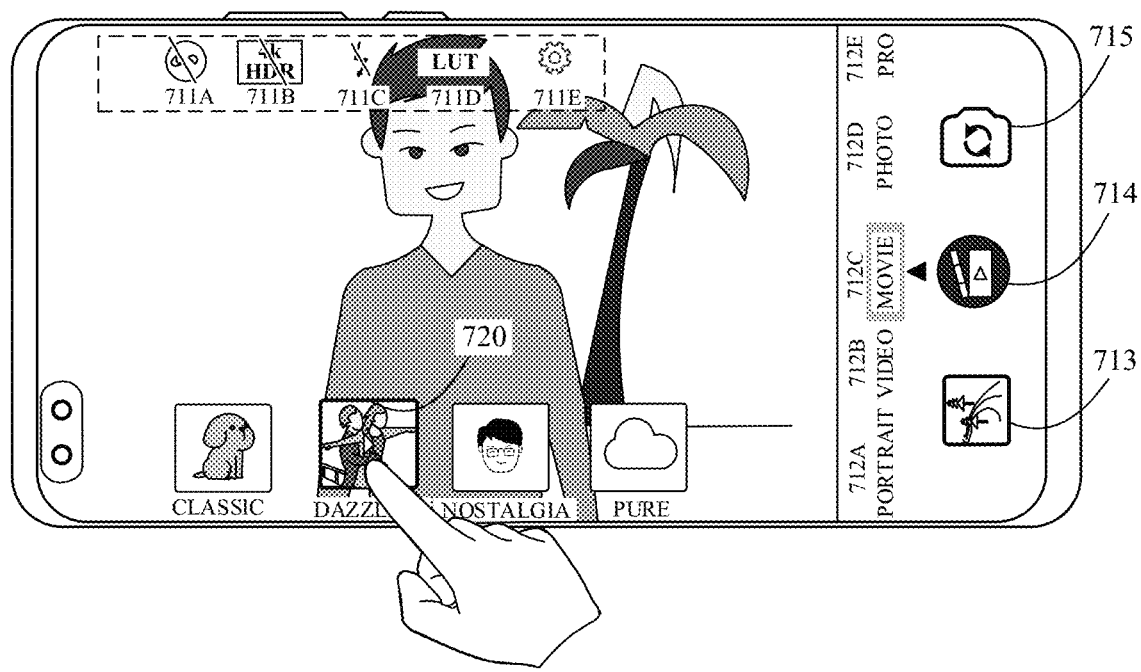
Figure 6K:
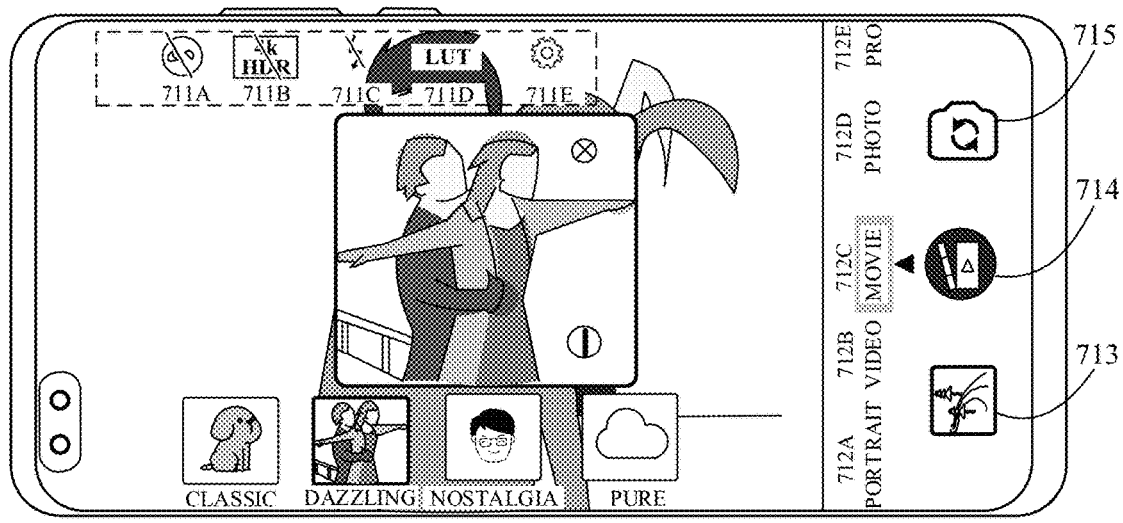

As shown in FIG. 6H, the user may trigger the electronic device to display a user interface 71 shown in FIG. 6I by tapping another region of the scenario bubble button 718 other than the "x" switch 719. The user interface 71 shown in FIG. 6I includes one or more LUT templates that are internally preset or online loaded by the electronic device 100, and each template displays a movie screen corresponding to a movie subject of the electronic device 100, and a name of the LUT template. For example, the name may be a name of the movie corresponding to the LUT template, or a name related to the movie, for example, "DAZZLING", "CLASSIC", "NOSTALGIA" and "PURE" shown in FIG. 6I. The identified LUT template 720 that matches the user photographing scenario is highlighted to indicate that the LUT template 720 has been automatically selected. For example, the LUT template 720 has a bold border. Certainly, this is not limiting. When the LUT template 720 is highlighted, the template may be further enlarged or suspended. In addition, the LUT template 720 further includes a playback control such as a triangle control in the figure, and the playback control is used to prompt the user that the LUT template may be displayed as a playable video. As shown in FIG. 6J, the user may touch the playback control to trigger the electronic device 100 to display a video picture corresponding to the LUT template 720. The playback control detects a touch operation of the user. In response to the operation, the electronic device 100 may display a user interface 71 shown in FIG. 6K, and play the video picture corresponding to the LUT template 720. It should be noted that, each LUT template in the user interface 71 is merely an example for description, and the LUT template may be flexibly set by a person skilled in the art.

Figure 6L:
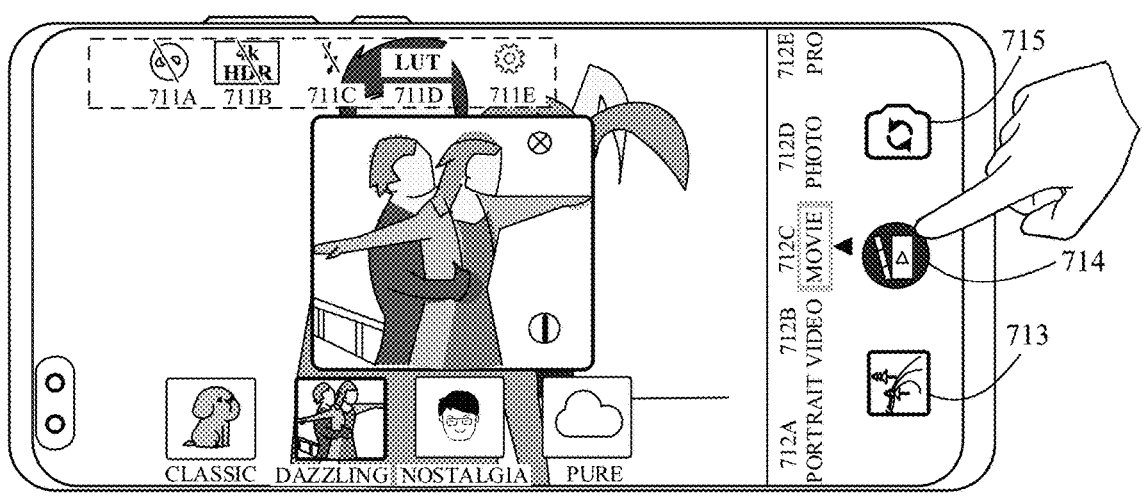
Figure 6M:
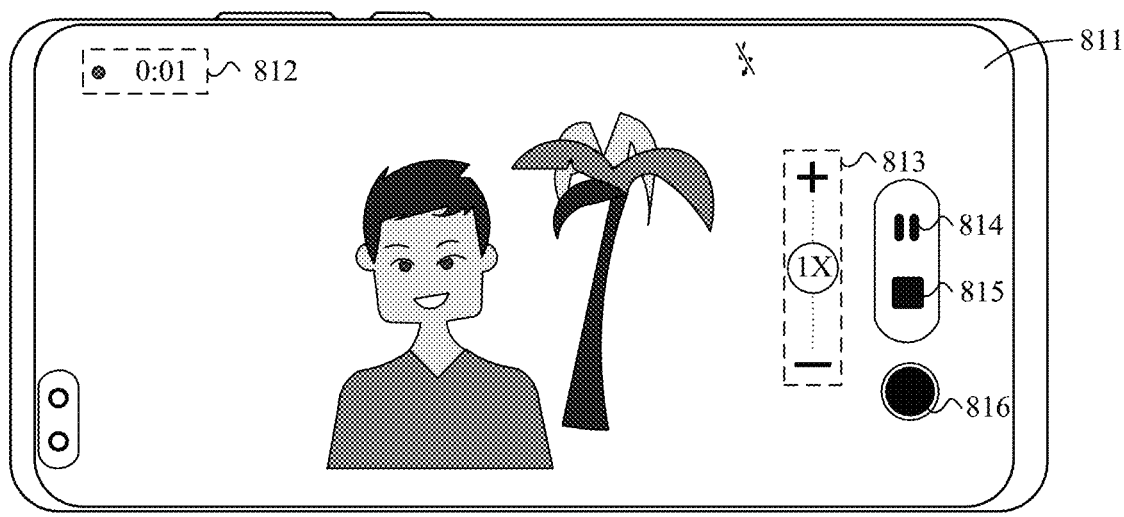

After the user previews the video picture corresponding to the LUT template 720, if an effect on the video picture is satisfactory, as shown in a user interface in FIG. 6L, the user triggers the electronic device 100 to use the previewed LUT template to perform movie shooting by touching a movie shutter control 714. The user's touch on the movie shutter control 714 may be a tap operation. After the user's touch operation on the movie shutter control 714 is received, a control transition dynamic effect is displayed. As shown in FIG. 6M, after detecting the tap operation on the movie shutter control 614, the electronic device 100 renders the photographed movie picture by using the LUT template. In some embodiments, in the movie shooting process, the electronic device 100 may automatically enable the LOG function to obtain a gray movie. The gray movie may be stored in the gallery application, and the tone of the gray movie is changed by using the LUT template selected by the user, so that the gray tone of the video is restored to a bright tone. This processing manner of the picture in movie shooting different from that the electronic device 100 uses the LUT template before video recording or photographing, the electronic device 100 uses the LUT template to adjust the display effect of the image after obtaining the gray movie, so that flexibility and freedom of the user in adjusting the image display effect are enhanced.

For example, FIG. 6M is a user interface provided when the electronic device 100 records a movie. The user interface 81 includes a recording box 811, a recording time 812, a zoom control 813, a pause recording control 814, an end recording control 815, and a photographing control 816. For a function of each control in the user interface 81, refer to related description of FIG. 3M.

After the electronic device 100 displays a plurality of LUT templates on the user interface, as shown in FIG. 7A to FIG. 7D which are schematic diagrams of user interfaces of previewing an LUT template by a user, the user may also manually switch the LUT template, and preview video pictures corresponding to different LUT templates.

As shown in FIG. 7A, in a playback window of the video picture corresponding to the LUT template, in addition to the played video picture, the playback window further includes a first control 725 and a close control 724. The user may close the played video picture by touching the close control

Figure 7B:
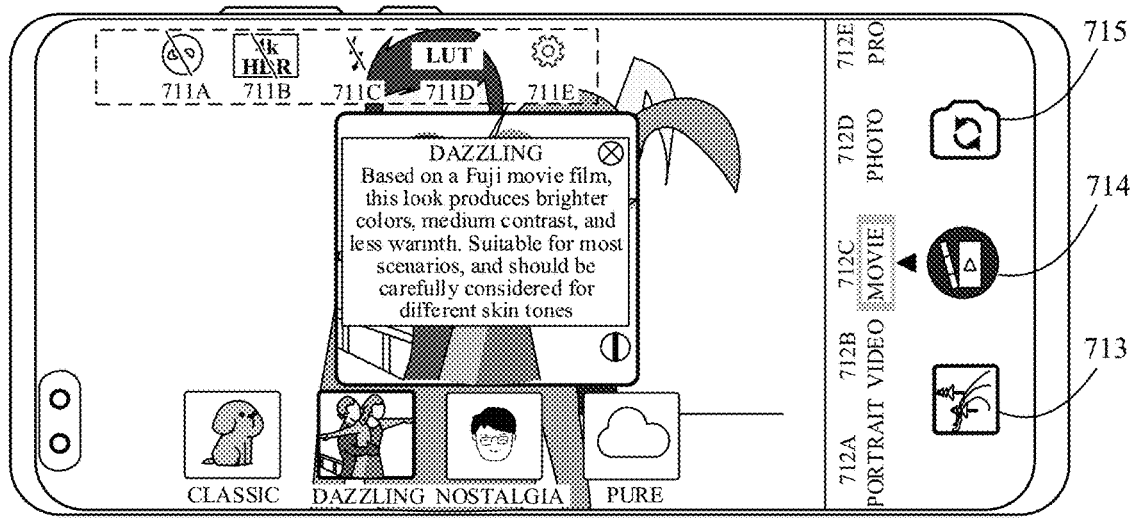

724, or the user may trigger, by touching the first control 725, the electronic device to display a user interface 71 shown in FIG. 7B. In the playback window in FIG. 7B, a sample movie introduction of an LUT template corresponding to a currently previewed video picture is displayed, which facilitates the user to understand an effect of the LUT template. For example, as shown in FIG. 7B, in the case of a "DAZZLING" LUT template, after a tap operation on the first control 725 is received, a sample movie about "DAZZLING" is displayed, which describes "Based on a Fuji movie film, this look produces brighter colors, medium contrast, and less warmth. Suitable for most scenarios, and should be carefully considered for different skin tones".

Figure 7C:
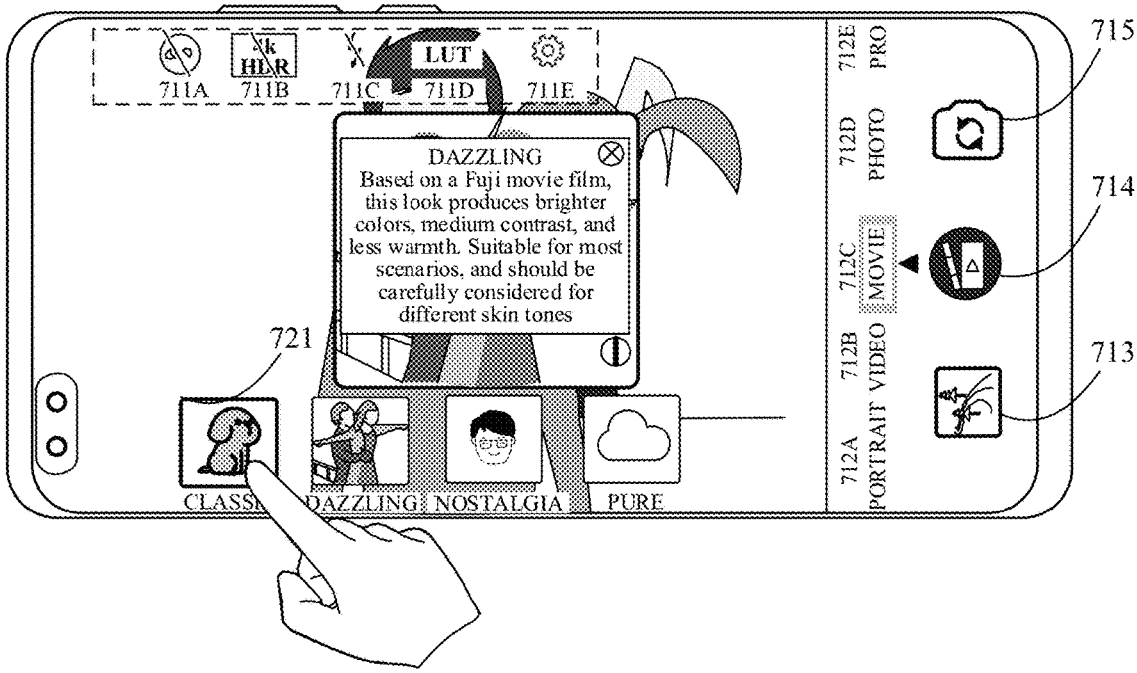
Figure 7D:
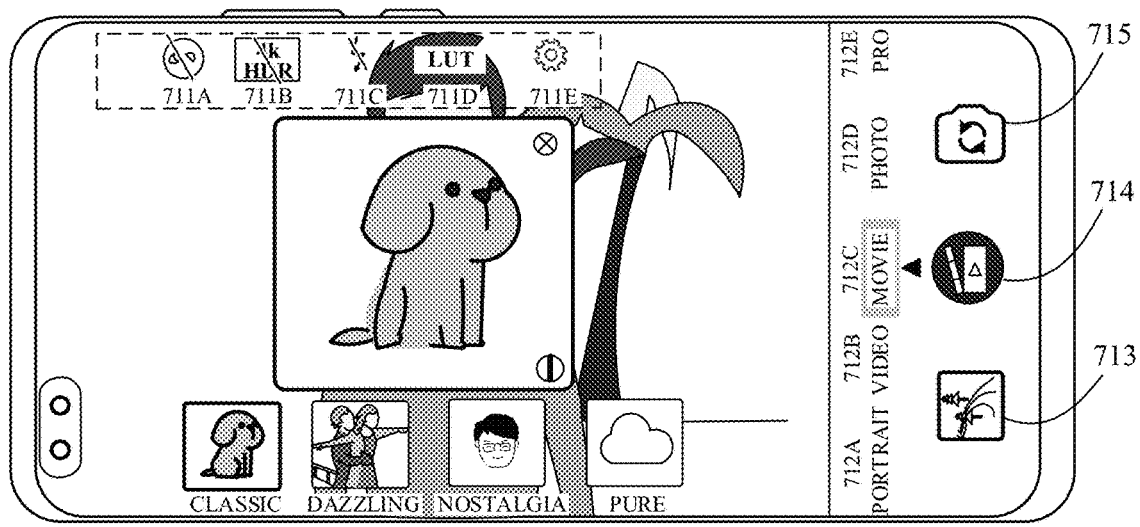
Figure 8A:
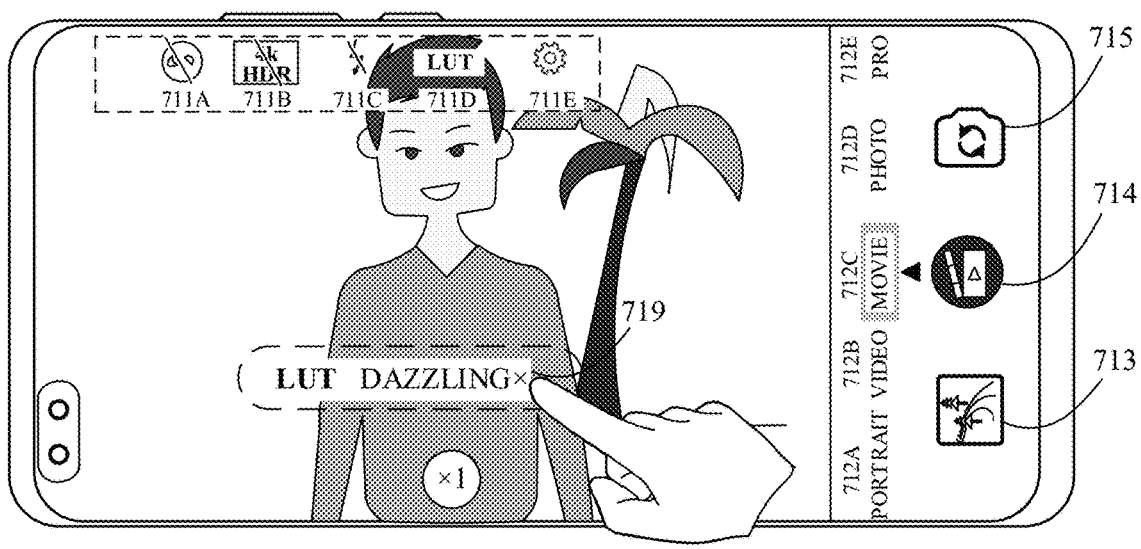
FIG. 8A and FIG. 8B are schematic diagrams of user interfaces of disabling AI scenario identification according to an embodiment of this application.
Figure 8B:
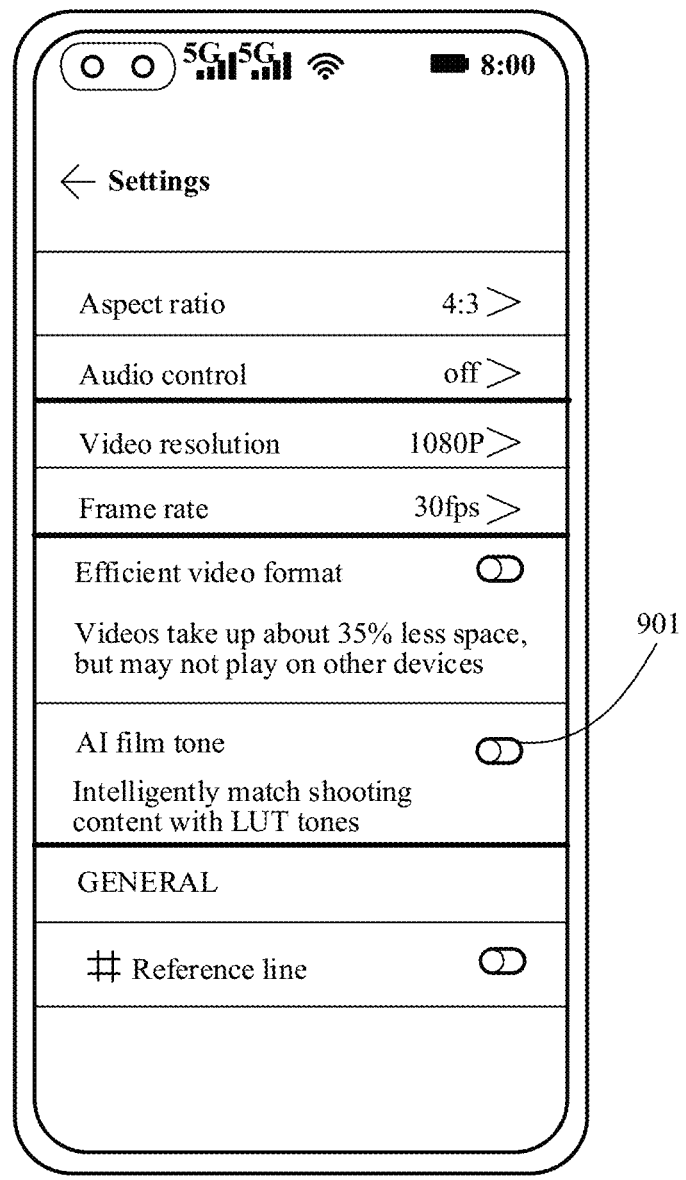

As shown in FIG. 7C and FIG. 7D, in addition to viewing the video picture corresponding to the LUT template recommended by the electronic device and the sample movie description of the LUT template, the user may further switch to preview another LUT template provided by the electronic device. For example, the user may manually tap a pre-switch LUT template. After detecting that the user performs the touch operation of switching the LUT template, the electronic device 100 plays a video picture corresponding to the switched LUT template in the playback window.

In some embodiments, the electronic device 100 may also select the LUT template based on a slide operation of the user. The user moves a position of each LUT template in the user interface 71 by using a left-right slide operation. When the electronic device 100 no longer detects the slide operation of the user, the electronic device 100 uses the first displayed LUT template as the LUT template selected by the electronic device 100.

The foregoing is an example of the scenario in which 4K HDR is not enabled but the AI film tone function is enabled in the movie shooting process, and the LUT function is enabled by default in the system.

FIG. 9A to FIG. 9L and FIG. 10A to FIG. 10D show examples of some user interfaces involved in the LUT function in a scenario in which 4K HDR and AI film tone functions are not enabled during movie shooting preview.

Figure 9A:
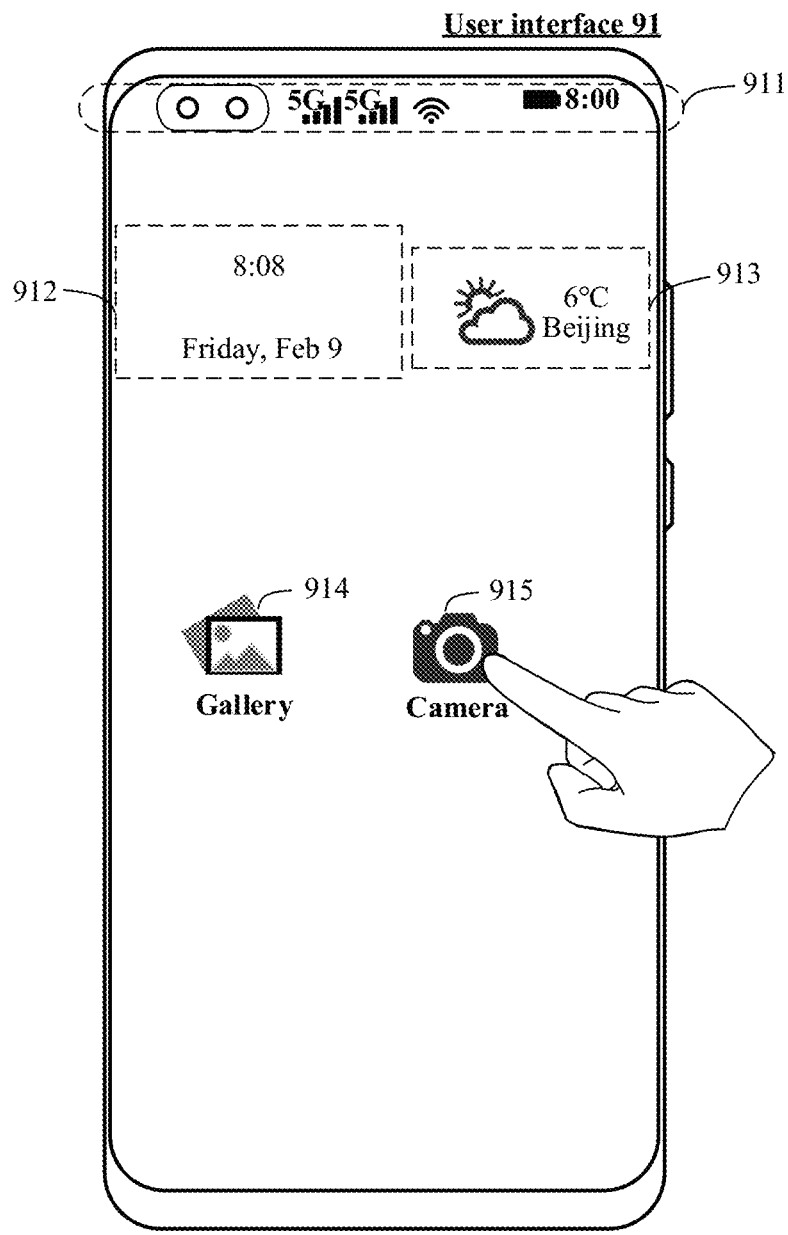
FIG. 9A to FIG. 9L are schematic diagrams of user interfaces of a third movie shooting scenario according to an embodiment of this application.

FIG. 9A shows an example user interface 901 that is on the electronic device 100 and that is used for an application menu. The user interface 901 includes: a status bar 911, a calendar indicator 912, a weather indicator 913, a gallery application 914, and a camera application 915. For specific description of each interface element included in the user interface 101, refer to related description of FIG. 3A. Details are not described in this embodiment of this application.

In some embodiments, for example, the user interface 901 shown in FIG. 9A may be a home screen (Gome screen).

It may be understood that FIG. 9A merely shows an example of a user interface on the electronic device 100, and should not constitute a limitation on this embodiment of the application.

Figure 9B:
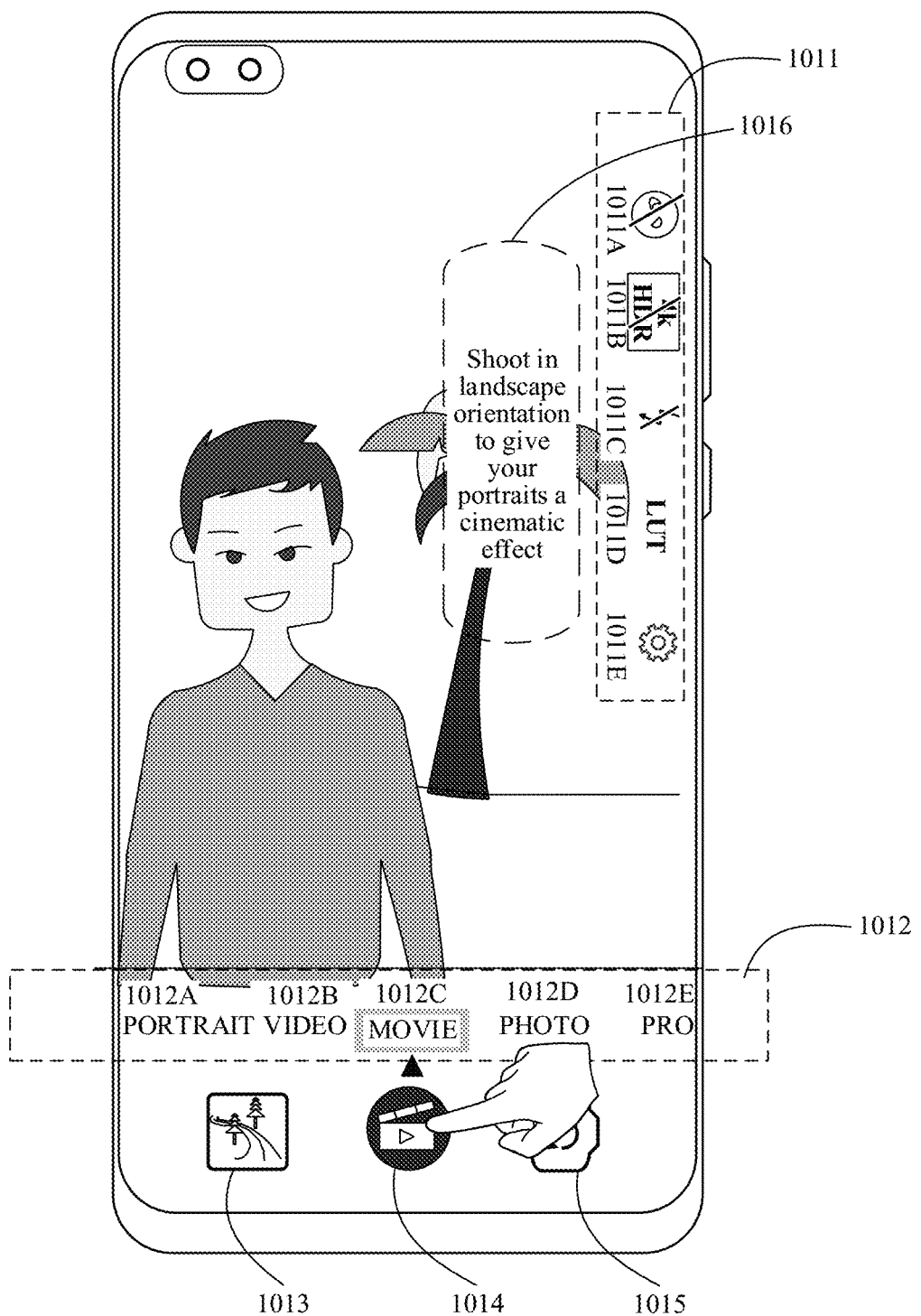

As shown in FIG. 9A, the electronic device 100 may detect a touch operation performed by the user on the camera application 915, and in response to the operation, the electronic device 100 displays a user interface 101 as shown in FIG. 9B. The user interface 101 may be a default photographing interface provided by the application when the electronic device 100 enables the camera application. It should be noted that, the application may also display the movie shooting interface by default after being enabled.

As shown in FIG. 9B, the user interface 101 may include: a preview box 1011, a photographing mode list 1012, a gallery shortcut key 1013, a movie shutter control 1014, and a camera flip control 1015.

One or more movie shooting mode options may be displayed in the photographing mode list 1012. The one or more photographing mode options may include: a portrait mode option 1012A, a video mode option 1012B, a photographing mode option 1012D, a movie mode option 1012C, and a professional option 1012E. The one or more photographing mode options may be presented on the interface as text information, for example, "portrait", "video", "photo", "movie", and "professional". In addition, the one or more photographing mode options may also be represented as an icon or another form of interactive element (interactive element, IE) on the interface. For specific descriptions of the controls in the user interface 101 shown in FIG. 9B, refer to related descriptions in the user interface 31. Details are not described in this embodiment of this application.

As shown in FIG. 9B, when the movie mode is enabled, the electronic device 100 displays first prompt information 1016 shown in FIG. 9B "Shoot in landscape orientation to give your portraits a cinematic effect". As shown in FIG. 9B, the preview interface includes a function option 1011, and the function option 1011 includes a slow motion option 1011A, a 4K HDR option 1011B, a flash option 1011C, an LUT option 1011D, and a settings option 1011E. Each of the function options may be used to detect a touch operation of the user, and in response to the operation, a corresponding photographing function is enabled or disabled.

Figure 9C:
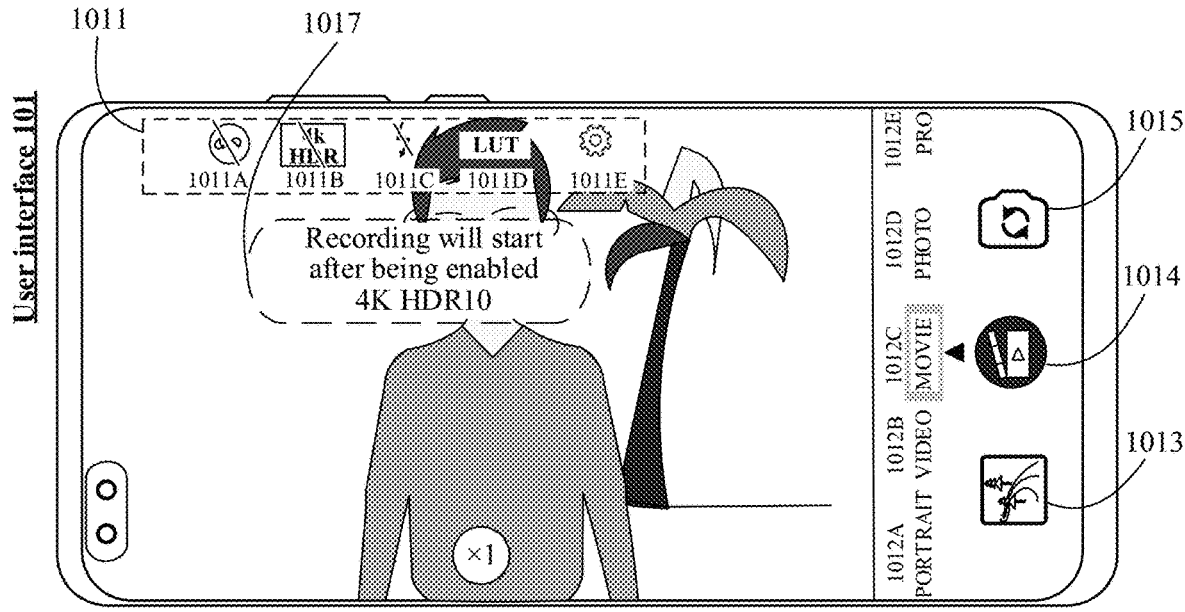
Figure 9D:
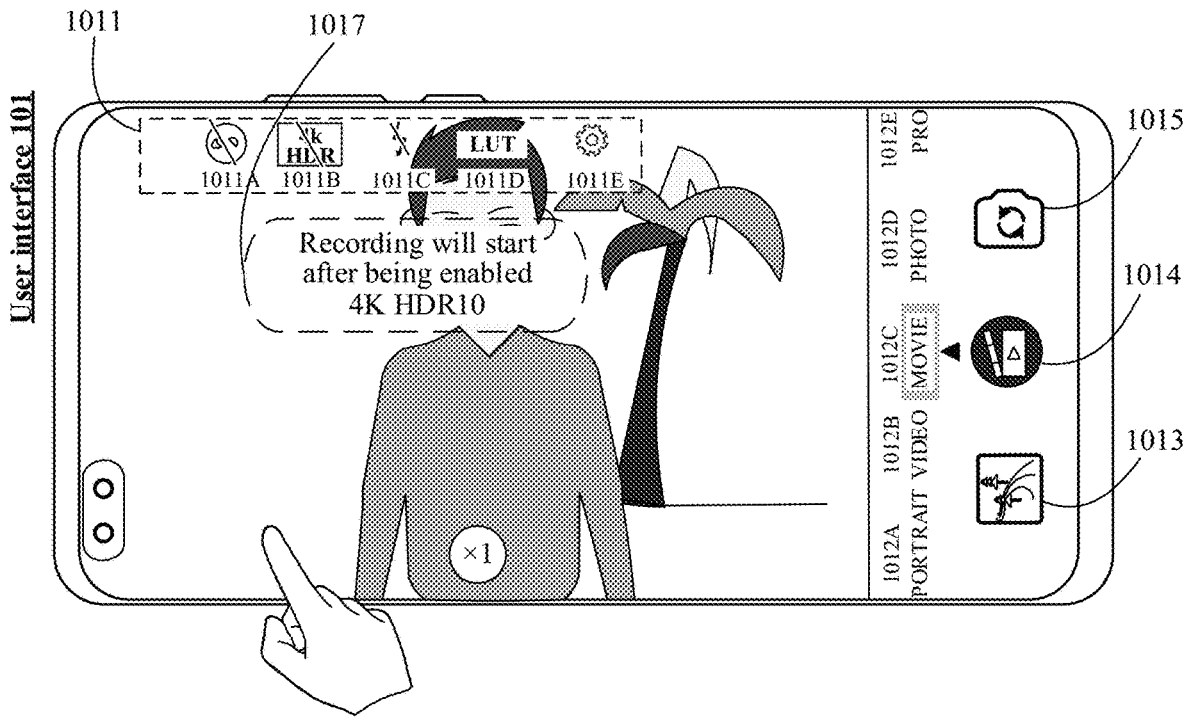
Figure 9E:
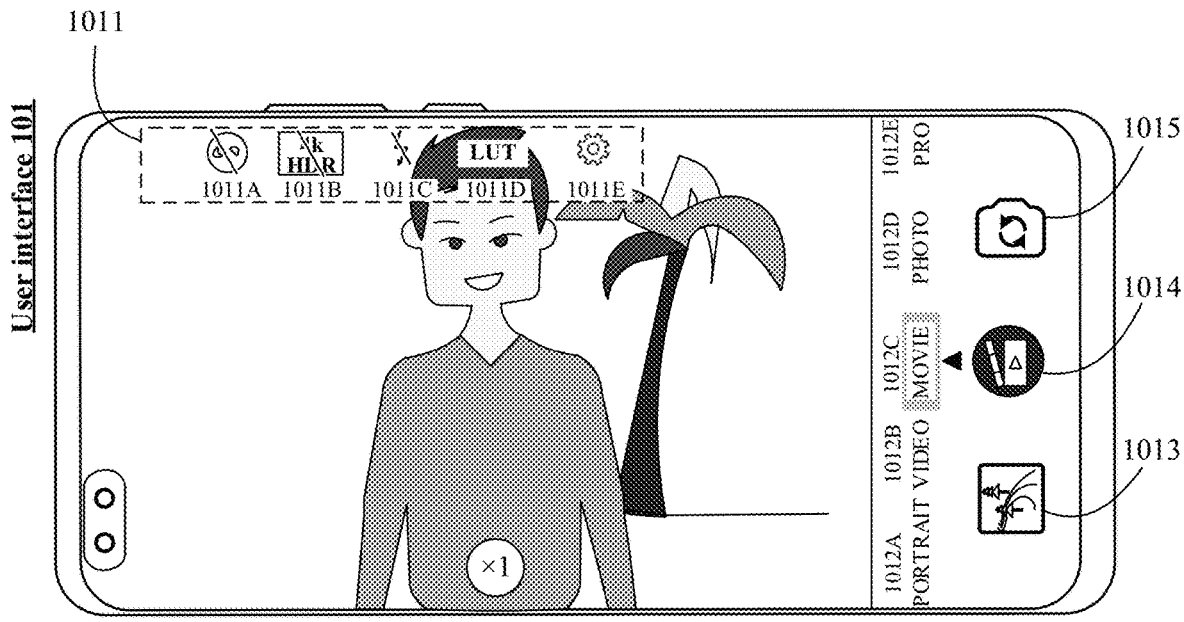

As shown in FIG. 9C, when the movie mode is enabled, second prompt information 1017 may be output when shooting in the landscape orientation is performed for the first time, for example, "a 4K HDR10 video will be recorded after enabled", and the prompt instructs the user to enable the 4K HDR mode. In this case, as shown in a user interface 101 shown in FIG. 9D, the user may manually tap a blank space of the user interface to trigger the system to cancel displaying of the second prompt information, so as to keep the 4K HDR option 1011B in a disabled state.

In an optional embodiment, when the movie function of the camera application is used for the first time, the second prompt information is output, and the second prompt information may be displayed in any appropriate form, for example, in a form of a bubble. When the second prompt information is provided for the first time, the second prompt information does not disappear automatically. The user needs to manually tap any space in the user interface or trigger the electronic device to cancel displaying the second prompt information after performing a preset operation. The preset operation may include but is not limited to: a slide operation in the user interface, an operation of shaking the electronic device, and the like. If the user does not use 4K HDR when shooting a movie, a prompt is provided again at a preset period, for example, after a week, until the user touches the second prompt information when shooting a movie and no prompt will be provided. Certainly, this is not limiting, and the second prompt information may be output each time the movie mode is enabled.

Figure 9F:
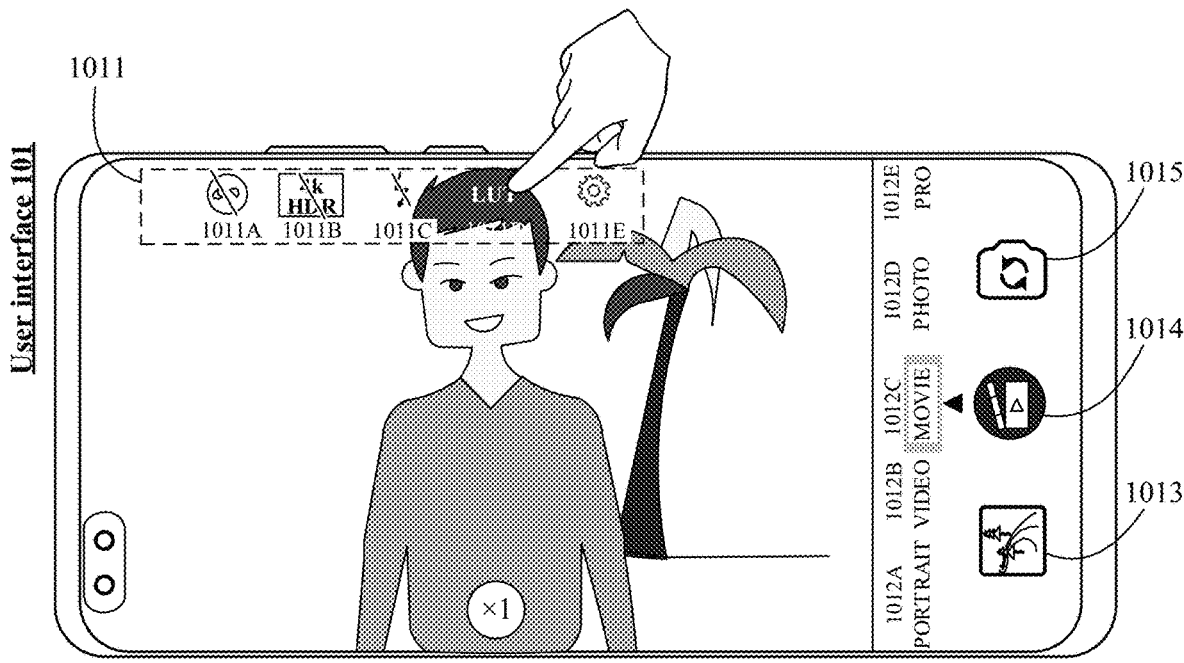

When the 4K HDR function is not enabled, resolution of the preview picture is lower than resolution of the preview picture when the 4K HDR function is enabled. For related description of the 4K HDR, refer to related content in the foregoing embodiment. When the electronic device 100 detects that the user taps the blank region of the user interface, the electronic device 100 displays a user interface 101 shown in FIG. 9E. The 4K HDR option 1011B in the user interface 101 is in a disabled state. In this optional embodiment, in the movie mode, the AI film tone function and the LUT function are enabled by default in the electronic device 100. As shown in FIG. 9F, the user can manually touch an LUT option 1011D to invoke a filter template, which is a standard mode by default. In this case, AI intelligent identification is not enabled, and only the LUT function is enabled. The electronic device 100 detects a touch operation performed by the user on the LUT option 1011D. In response to the operation, the electronic device enables the LUT standard mode. In the standard mode, only the LUT is displayed but AI scenario identification is not performed.

Figure 9G:
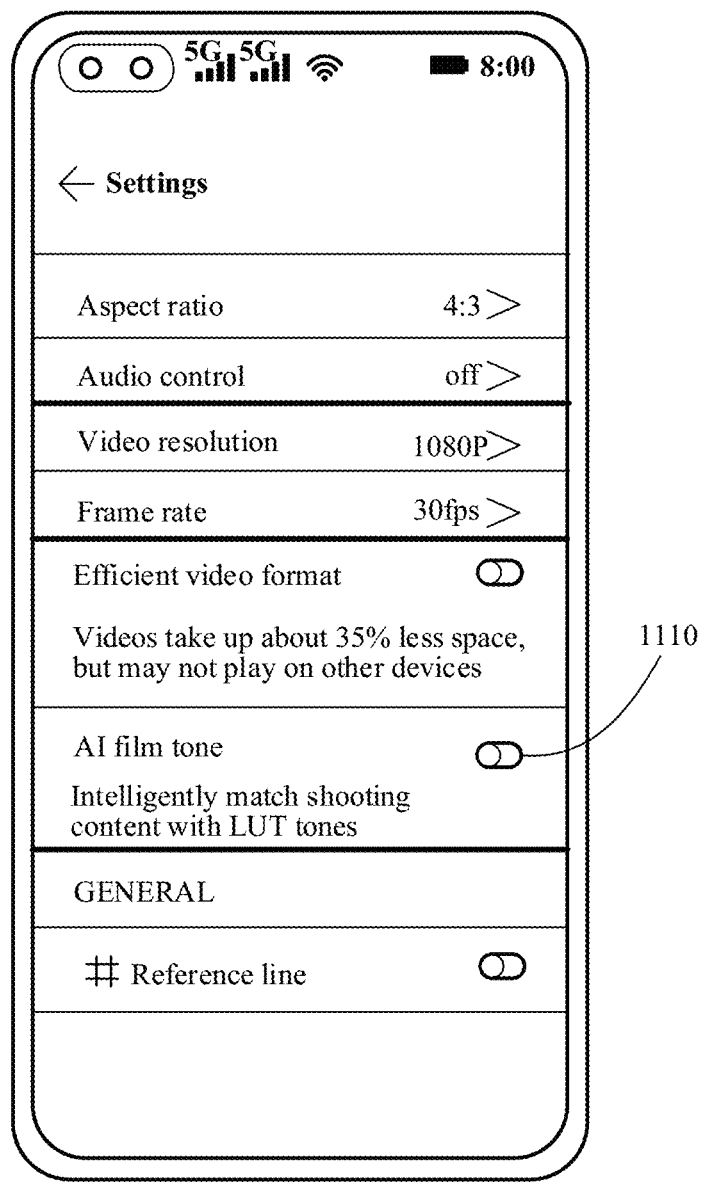
Figure 9H:
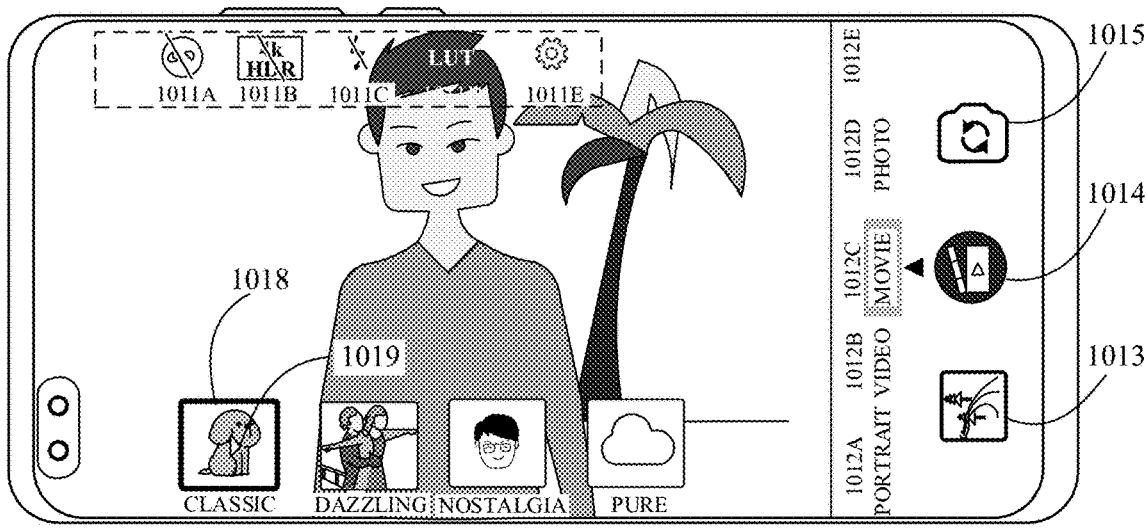
Figure 9I:
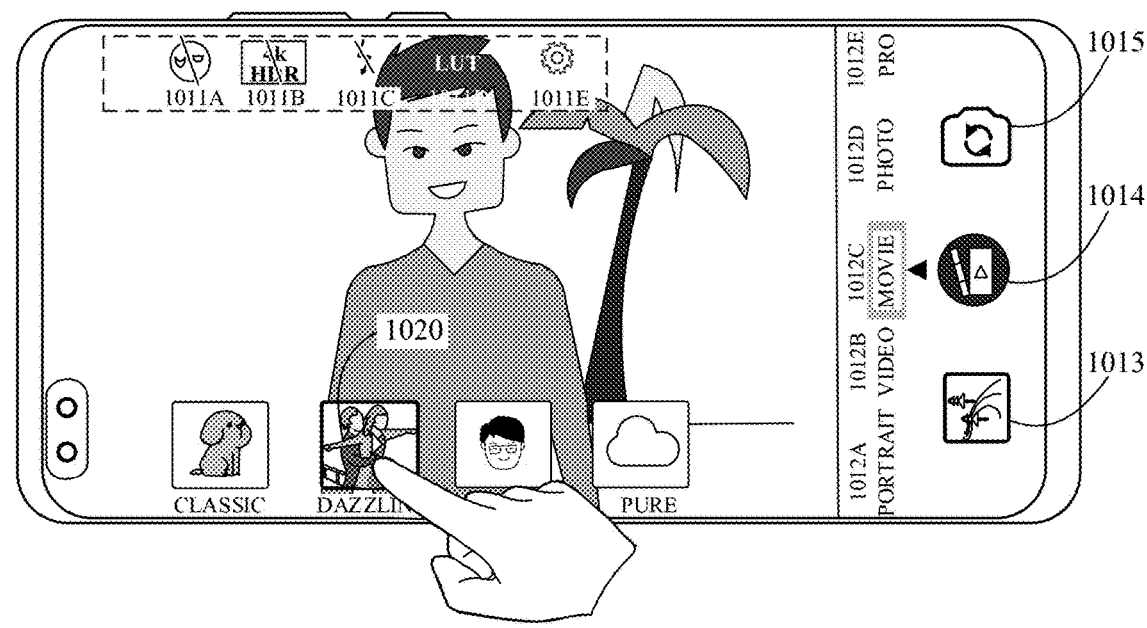
Figure 9J:
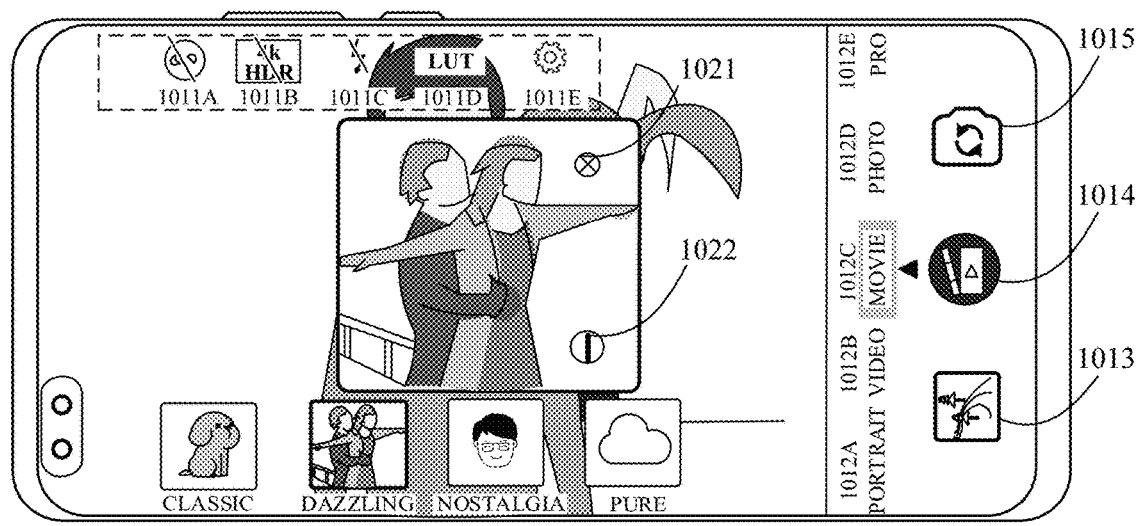

As shown in FIG. 9G, when the user's operation of tapping the LUT option 1011D is detected, the electronic device 100 turns off the AI film tone switch 1110 in a user interface shown in FIG. 9G. The electronic device enables the LUT function, and displays, in a photographing preview interface, one or more LUT templates that are internally preset or online loaded by the electronic device 100. Each template displays a movie picture corresponding to a movie theme of the electronic device 100, and a name of the LUT template. It should be noted that, after the LUT template is displayed, if no operation is performed on the electronic device by the user within preset duration such as 5 seconds, 8 seconds, or 10 seconds, the LUT template displayed on the user interface disappears. In addition, the user may further trigger the electronic device to cancel displaying of the LUT template by tapping the blank space of the user interface. In this embodiment, an LUT template 1019 sorted in the first position is selected by default when the LUT template is displayed, and the LUT template 1019 is highlighted to indicate that the LUT template 1019 has been automatically selected. For example, a border of the LUT template 1019 is bold, which is not limiting. When the LUT template 1019 is highlighted, the LUT template 1019 may be further enlarged or suspended. In addition, the LUT template 1019 further includes a playback control 1018, and the playback control 1018 is used to prompt the user that the LUT template 1019 may be displayed as a playable video. As shown in FIG. 9I, the user may manually choose to switch to another LUT template, such as an LUT template 1020, and after the LUT template 1020 is switched to, the playback control 1018 is switched to the LUT template 1020 for display. As shown in FIG. 9I, the user may touch the playback control to trigger the electronic device 100 to display a video picture corresponding to the LUT template 1020. The playback control 1 detects a touch operation of the user. In response to the operation, the electronic device 100 may display a user interface 101 shown in FIG. 9J, and play the video picture corresponding to the LUT template 1020. It should be noted that, each LUT template in the user interface 101 is merely an example for description, and the LUT template may be flexibly set by a person skilled in the art.

Figure 9K:
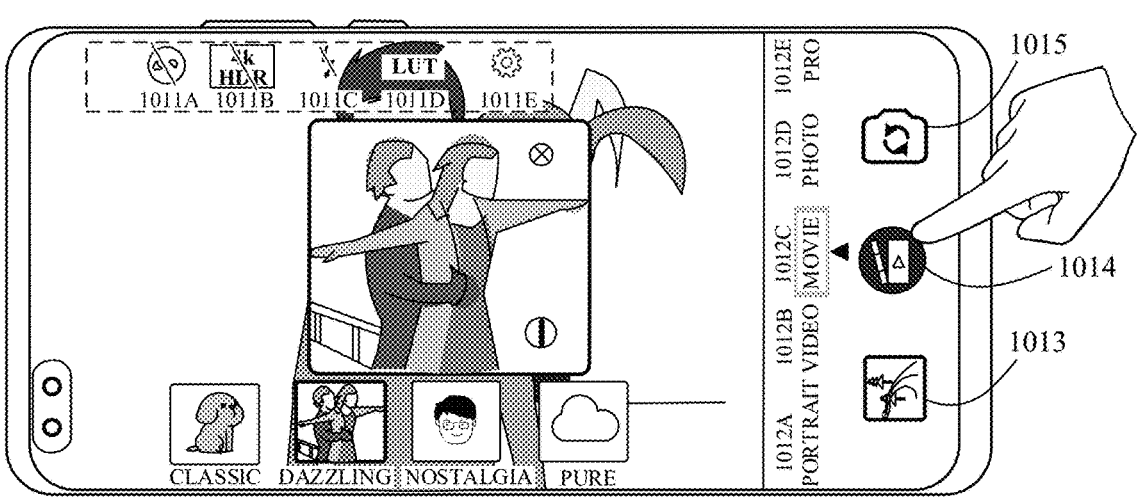
Figure 9L:
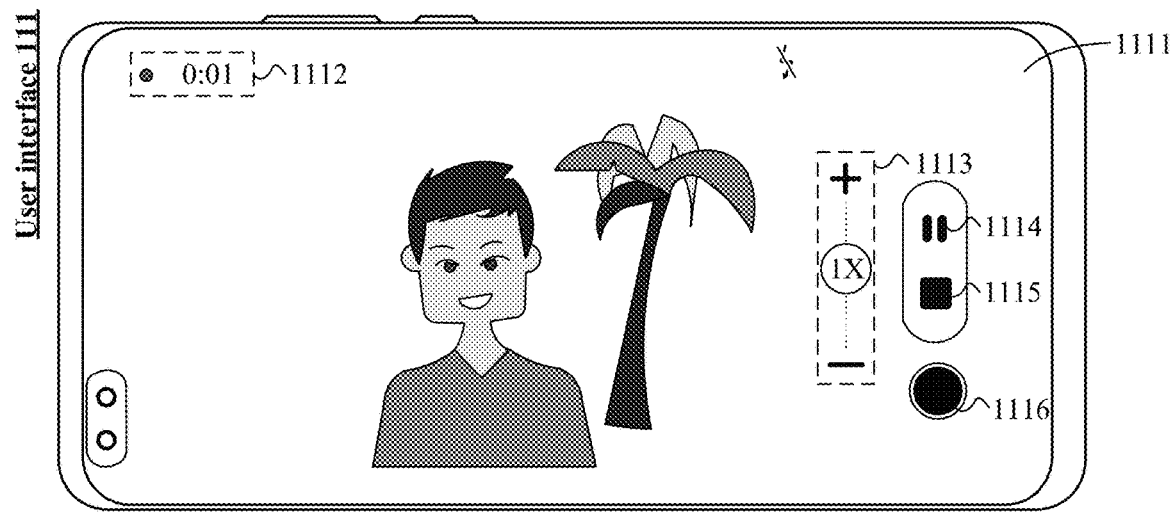

After the user previews the video picture corresponding to the LUT template 1020, if an effect on the video picture is satisfactory, as shown in a user interface in FIG. 9K, the user triggers the electronic device 100 to use the previewed LUT template to perform movie shooting by touching a movie shutter control 1014. The user's touch on the movie shutter control 1014 may be a tap operation. After the user's touch operation on the movie shutter control 1014 is received, a control transition dynamic effect is displayed. As shown in FIG. 9L, after detecting the tap operation on the movie shutter control 1014, the electronic device 100 renders the photographed movie picture by using the LUT template, that is, starts to shoot a video by using a movie filter.

For example, FIG. 9L is a user interface provided when the electronic device 100 records a movie. The user interface 111 includes a recording box 1111, a recording time 1112, a zoom control 1113, a pause recording control 1114, an end recording control 1115, and a photographing control 1116. For a function of each control in the user interface 111, refer to related description of FIG. 3M.

After the electronic device 100 displays a plurality of LUT templates on the user interface, as shown in FIG. 10A to FIG. 10D which are schematic diagrams of user interfaces of previewing an LUT template by a user, the user may also manually switch the LUT template, and preview video pictures corresponding to different LUT templates.

Figure 10A:
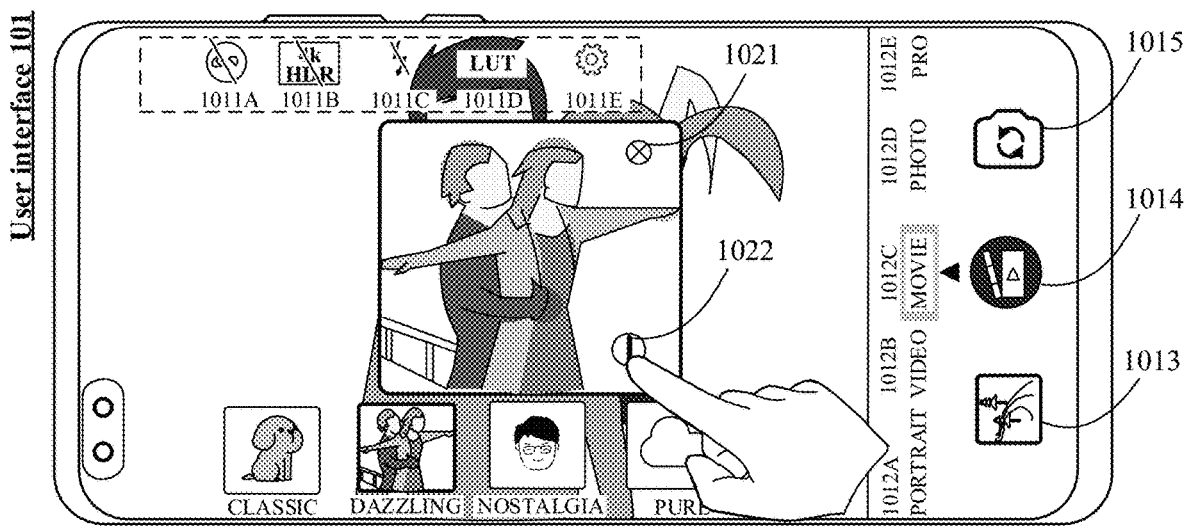
FIG. 10A to FIG. 10D are schematic diagrams of user interfaces of previewing an LUT template according to an embodiment of this application.
Figure 10B:
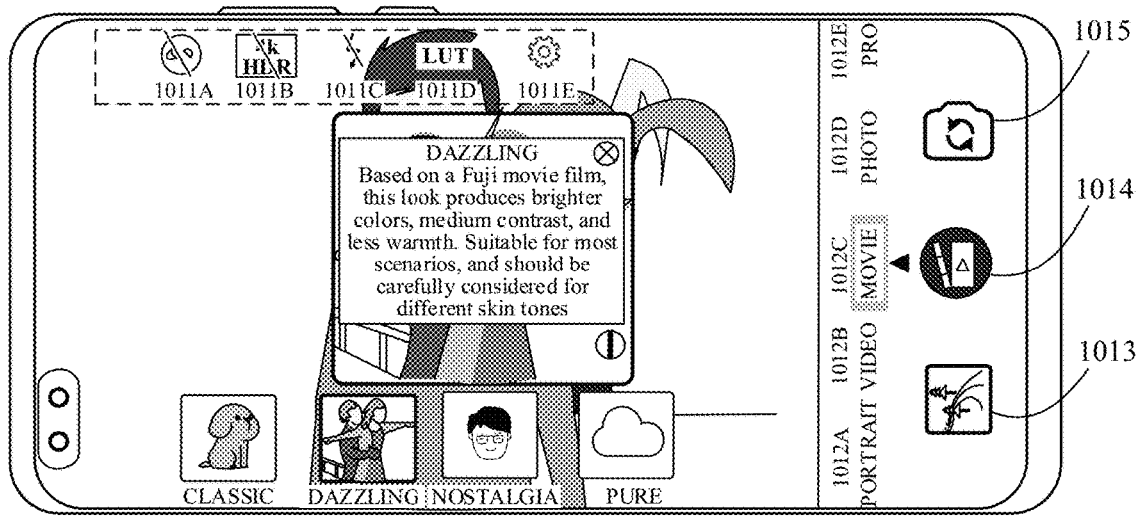

As shown in FIG. 10A, in a playback window of the video picture corresponding to the LUT template, in addition to the played video picture, the playback window further includes a first control 1022 and a close control 1021. The user may close the played video picture by touching the close control 1021, or the user may trigger, by touching the first control 1022, the electronic device to display a user interface 101 shown in FIG. 10B. In the playback window in FIG. 10, a sample movie introduction of an LUT template corresponding to a currently previewed video picture is displayed, which facilitates the user to understand an effect of the LUT template. For example, as shown in FIG. 10B, in the case of a "DAZZLING" LUT template, after a tap operation on the first control 1022 is received, a sample movie about "DAZZLING" is displayed, which describes "Based on a Fuji movie film, this look produces brighter colors, medium contrast, and less warmth. Suitable for most scenarios, and should be carefully considered for different skin tones".

Figure 10C:
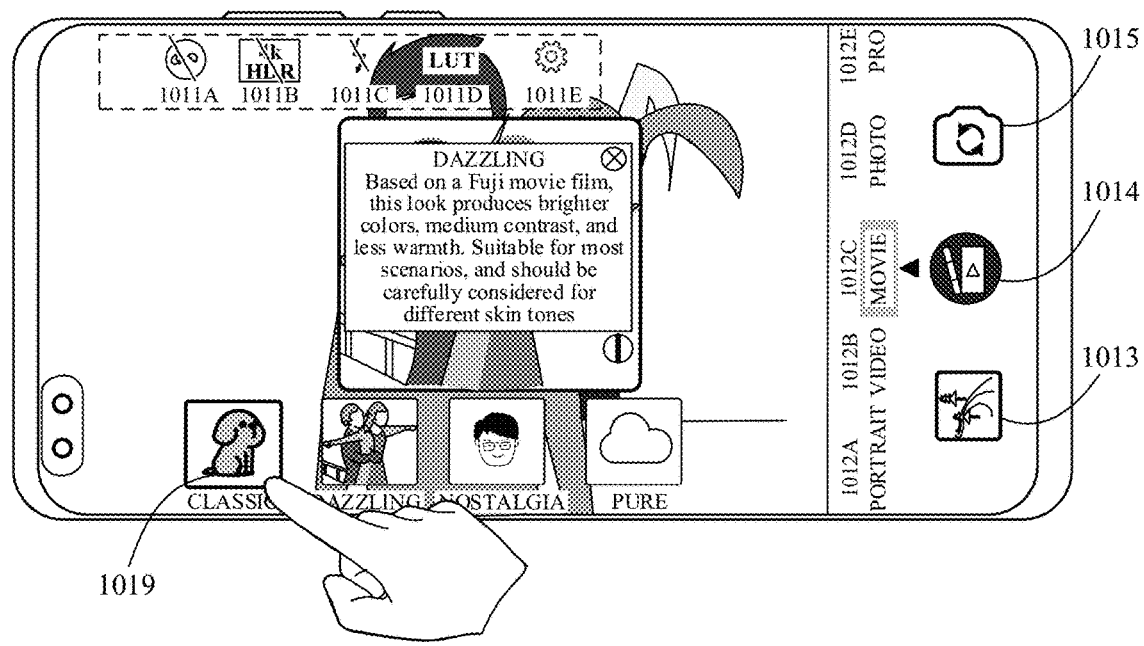
Figure 10D:
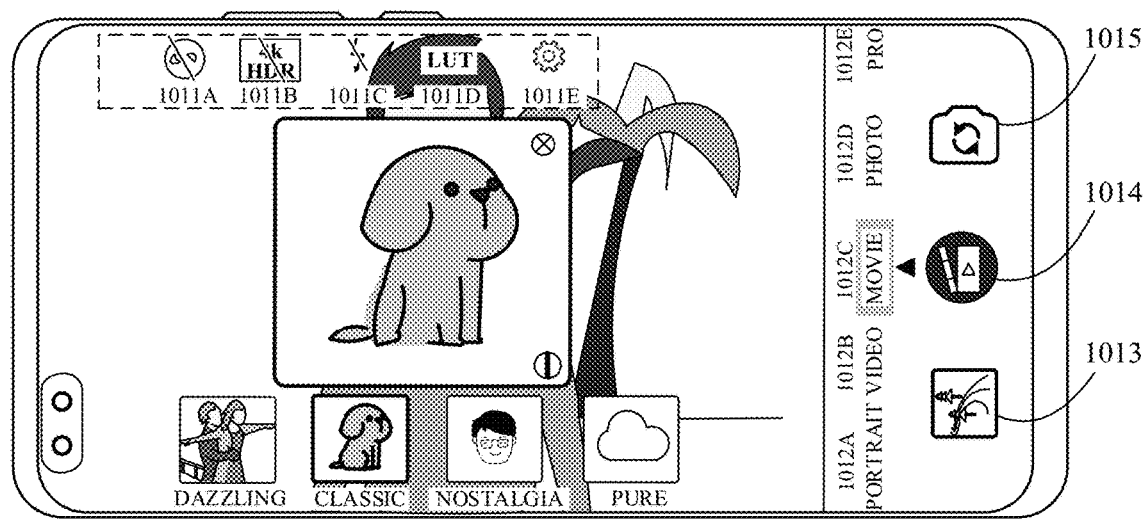

As shown in FIG. 10C and FIG. 10D, in addition to viewing the video picture corresponding to the LUT template recommended by the electronic device and the sample movie description of the LUT template, the user may further switch to preview another LUT template provided by the electronic device. For example, the user may manually tap a pre-switch LUT template 1019. After detecting that the user performs the touch operation of switching the LUT template 1019, the electronic device 100 plays a video picture corresponding to the switched LUT template 1019 in the playback window. The user may view the sample movie description of the LUT template 1019 by using the first control 1022 included in the video picture corresponding to the LUT template 1019.

In some embodiments, the electronic device 100 may also select the LUT template based on a slide operation of the user. The user moves a position of each LUT template in the user interface 101 by using a left-right slide operation. When the electronic device 100 no longer detects the slide operation of the user, the electronic device 100 uses the first displayed LUT template as the LUT template selected by the electronic device 100.

The foregoing is an example of the scenario in which the 4K HDR and AI film tone function are not enabled in the movie shooting process, and the LUT function is manually enabled by the user.

FIG. 11A to FIG. 11J are schematic diagrams of user interfaces of switching enabling and disabling of a slow motion mode and a 4K HDR mode in a movie shooting process.

Figure 11A:
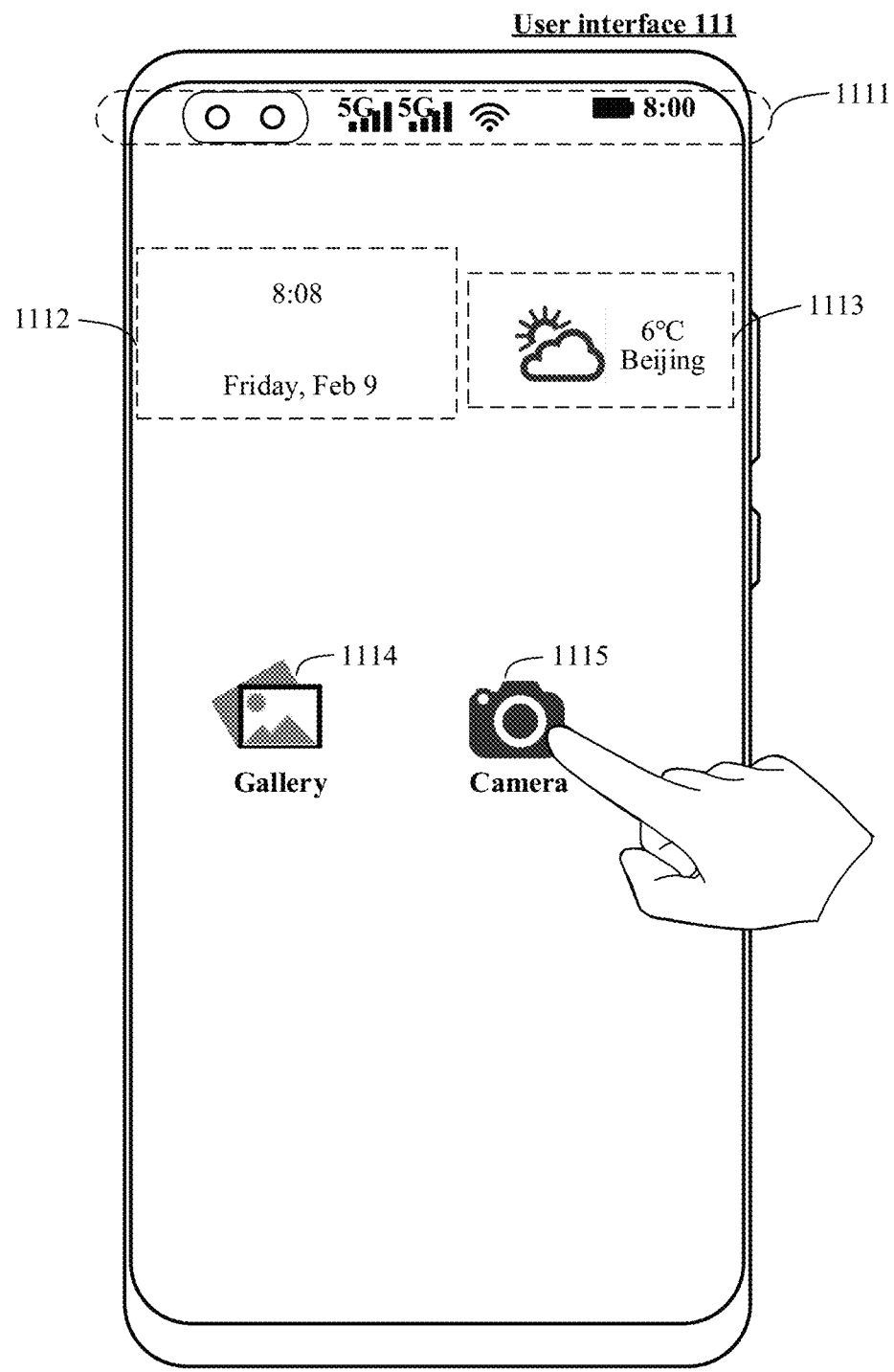
FIG. 11A to FIG. 11J are schematic diagrams of user interfaces of switching enabling and disabling of a slow motion mode and 4K HDR according to an embodiment of this application.

FIG. 11A shows an example user interface 111 that is on the electronic device 100 and that is used for an application menu. The user interface 111 includes: a status bar 1111, a calendar indicator 1112, a weather indicator 1113, a gallery application 1114, and a camera application 1115. For specific description of each interface element included in the user interface 111, refer to related description of FIG. 3A. Details are not described in this embodiment of this application.

In some embodiments, for example, the user interface 111 shown in FIG. 11A may be a home screen (Gome screen).

It may be understood that FIG. 11A merely shows an example of a user interface on the electronic device 100, and should not constitute a limitation on this embodiment of the application.

Figure 11B:
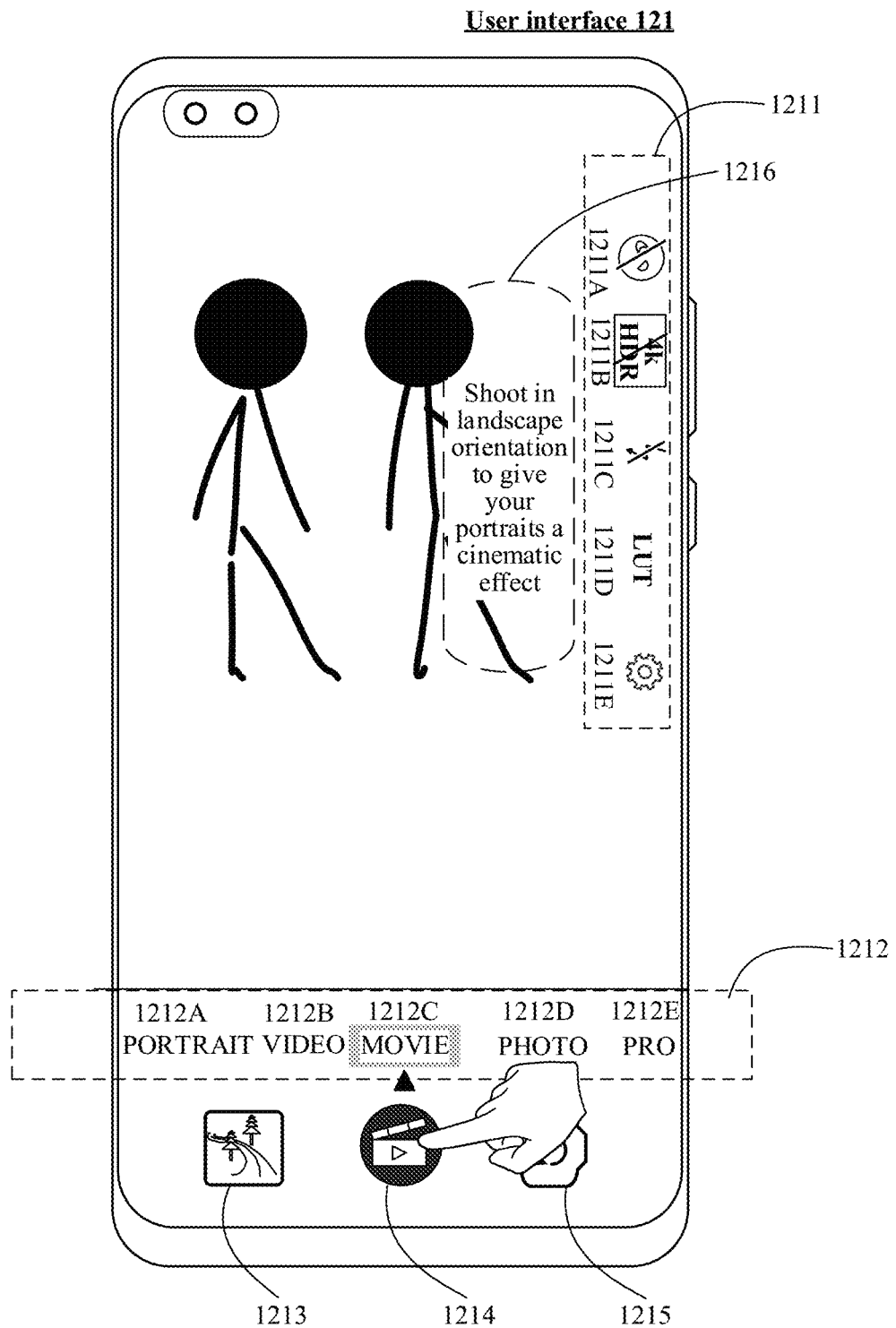

As shown in FIG. 11A, the electronic device 100 may detect a touch operation performed by the user on the camera application 1115, and in response to the operation, the electronic device 100 displays a user interface 101 as shown in FIG. 11B. The user interface 101 may be a default photographing interface provided by the application when the electronic device 100 enables the camera application. It should be noted that, the application may also display the movie shooting interface by default after being enabled.

As shown in FIG. 11B, the user interface 121 may include: a preview box 1211, a photographing mode list 1212, a gallery shortcut key 1213, a movie shutter control 1214, and a camera flip control 1215.

One or more movie shooting mode options may be displayed in the photographing mode list 1212. The one or more photographing mode options may include: a portrait mode option 1212A, a video mode option 1212B, a photographing mode option 1212D, a movie mode option 1212C, and a professional option 1212E. The one or more photographing mode options may be presented on the interface as text information, for example, "portrait", "video", "photo", "movie", and "professional". In addition, the one or more photographing mode options may also be represented as an icon or another form of interactive element (interactive element, IE) on the interface. For specific descriptions of the controls in the user interface 121 shown in FIG. 11B, refer to related descriptions in the user interface 31. Details are not described in this embodiment of this application.

As shown in FIG. 11B, when the movie mode is enabled, the electronic device 100 displays first prompt information 1216 shown in FIG. 11B "Shoot in landscape orientation to give your portraits a cinematic effect". As shown in FIG. 11B, the preview interface includes a function option 1211, and the function option 1211 includes a slow motion option 1211A, a 4K HDR option 1211B, a flash option 1211C, an LUT option 1211D, and a settings option 1211E. Each of the function options may be used to detect a touch operation of the user, and in response to the operation, a corresponding photographing function is enabled or disabled.

Figure 11C:
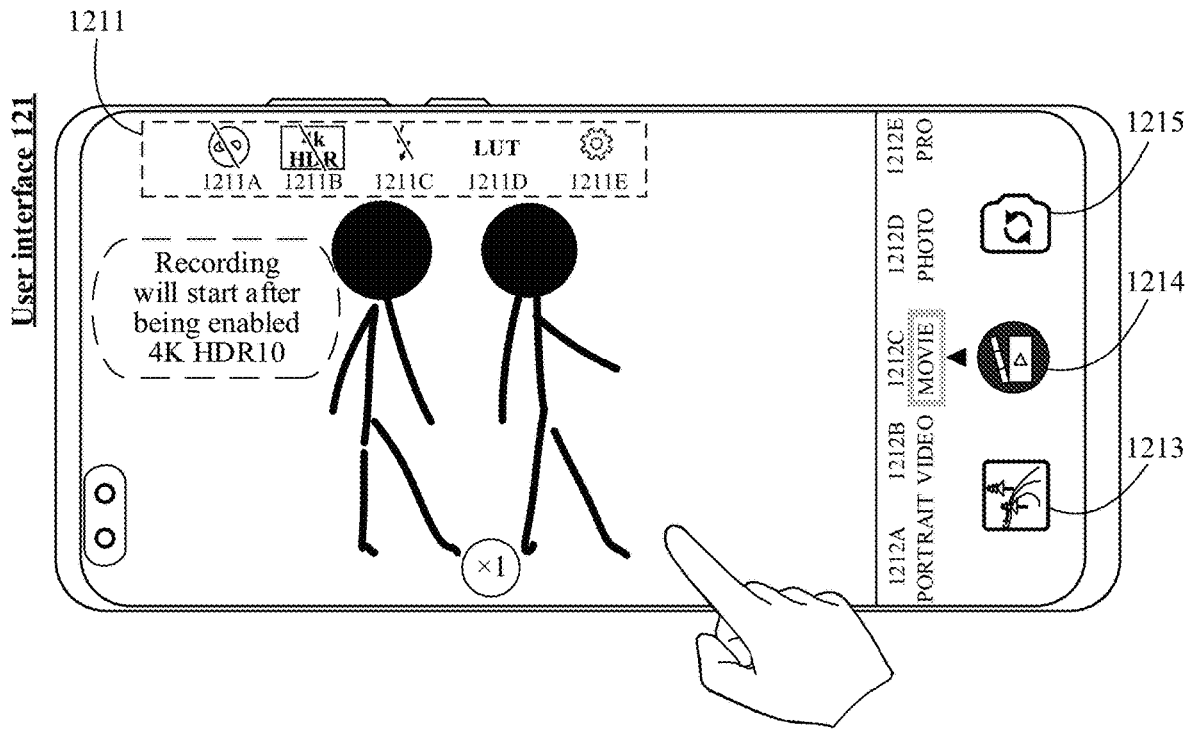
Figure 11D:
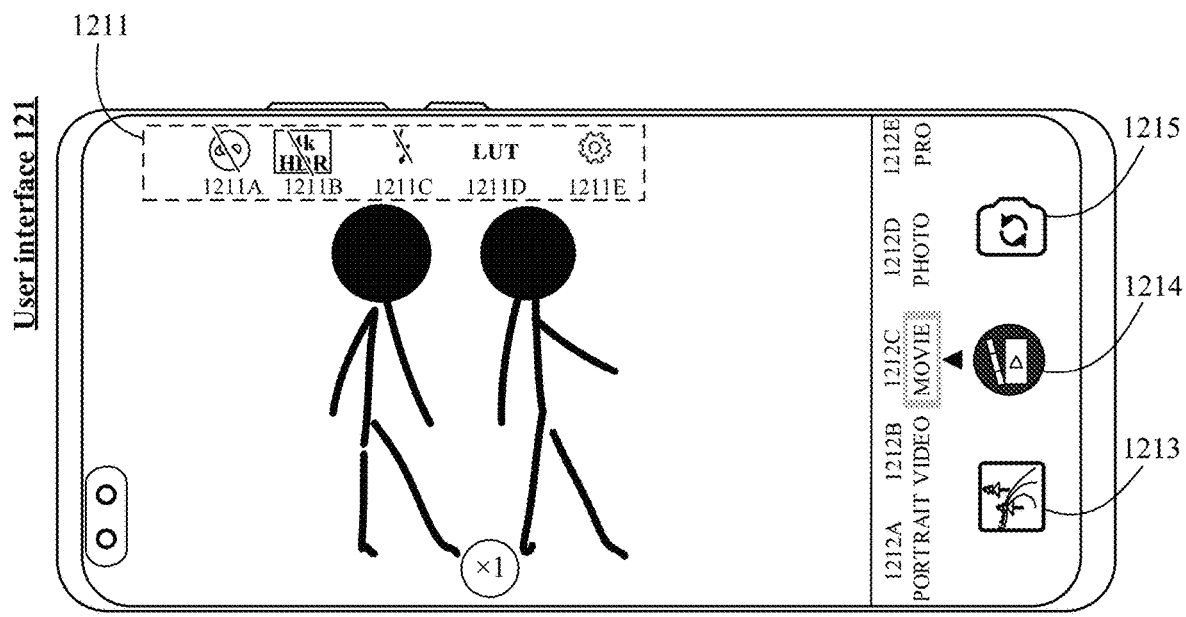
Figure 11E:
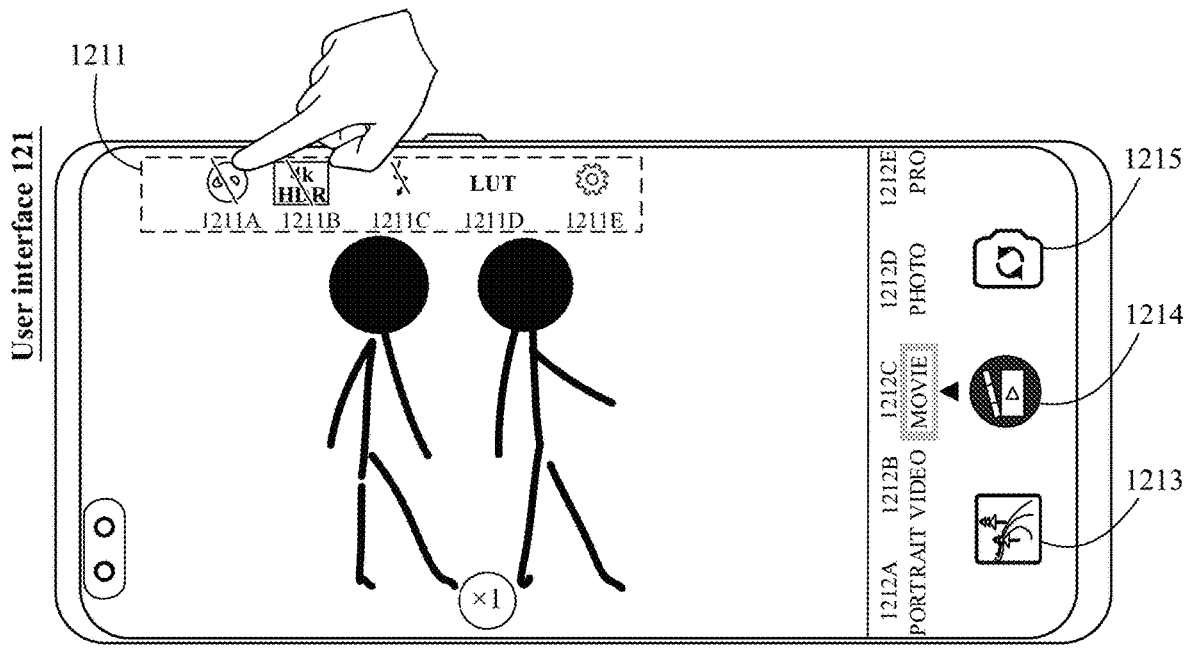
Figure 11F:
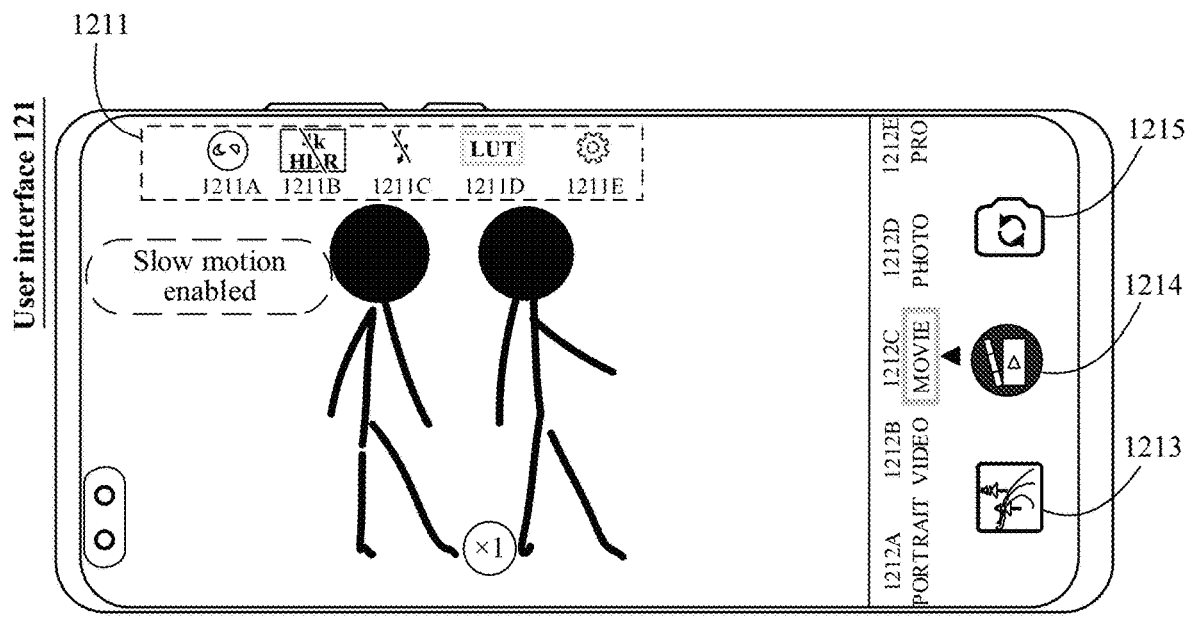
Figure 11G:
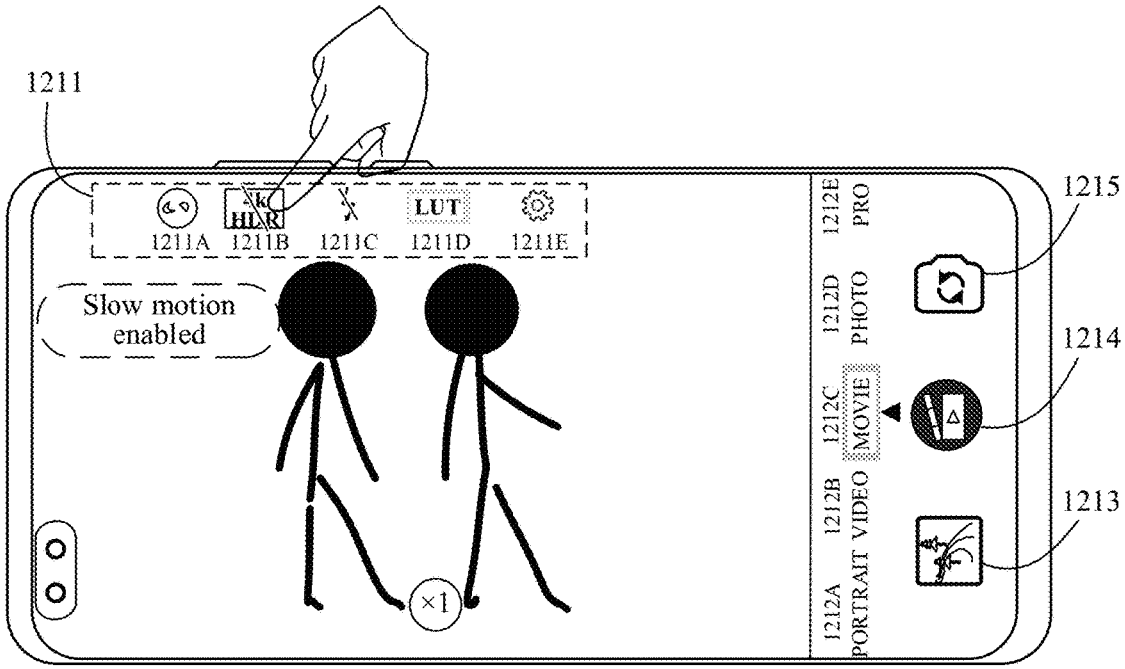
Figure 11H:
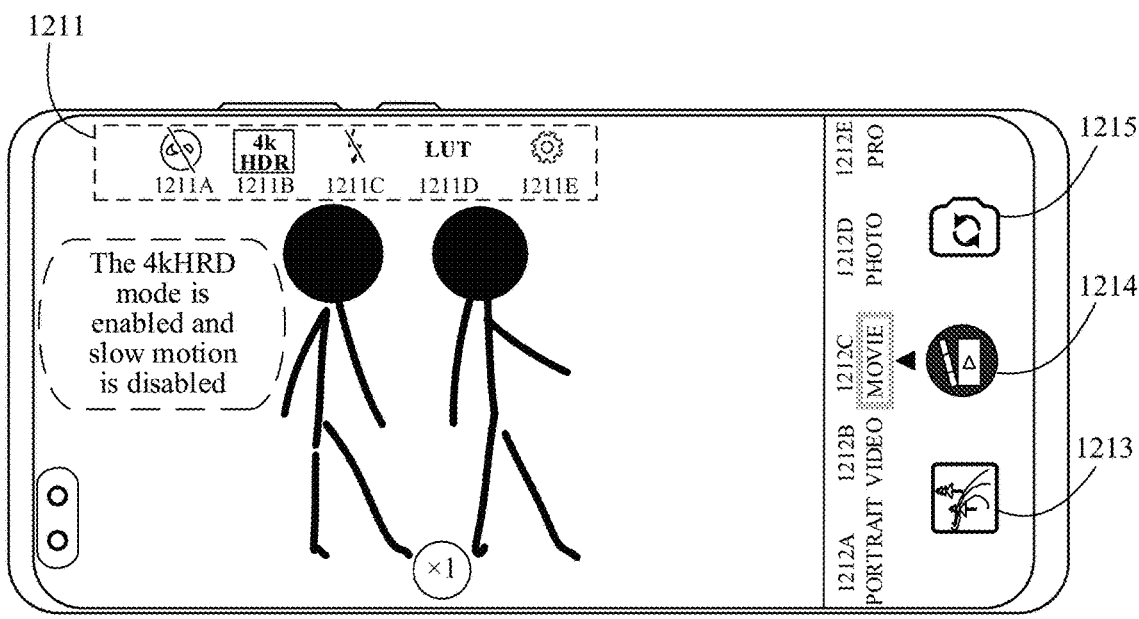
Figure 11I:
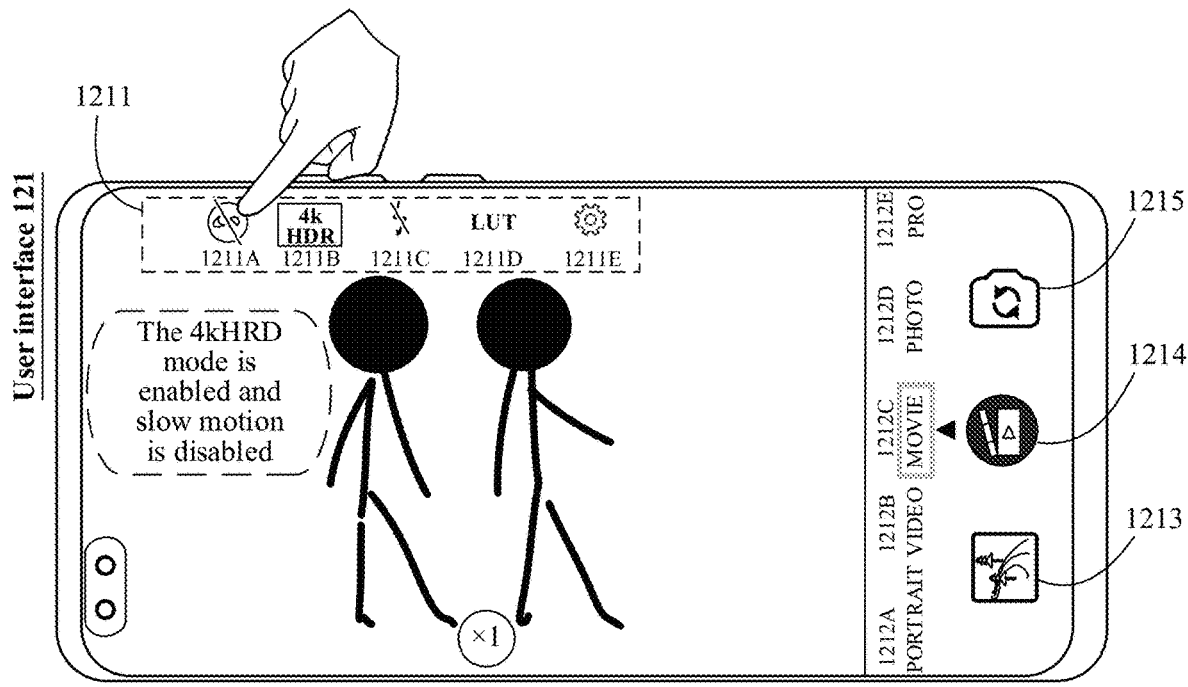
Figure 11J:
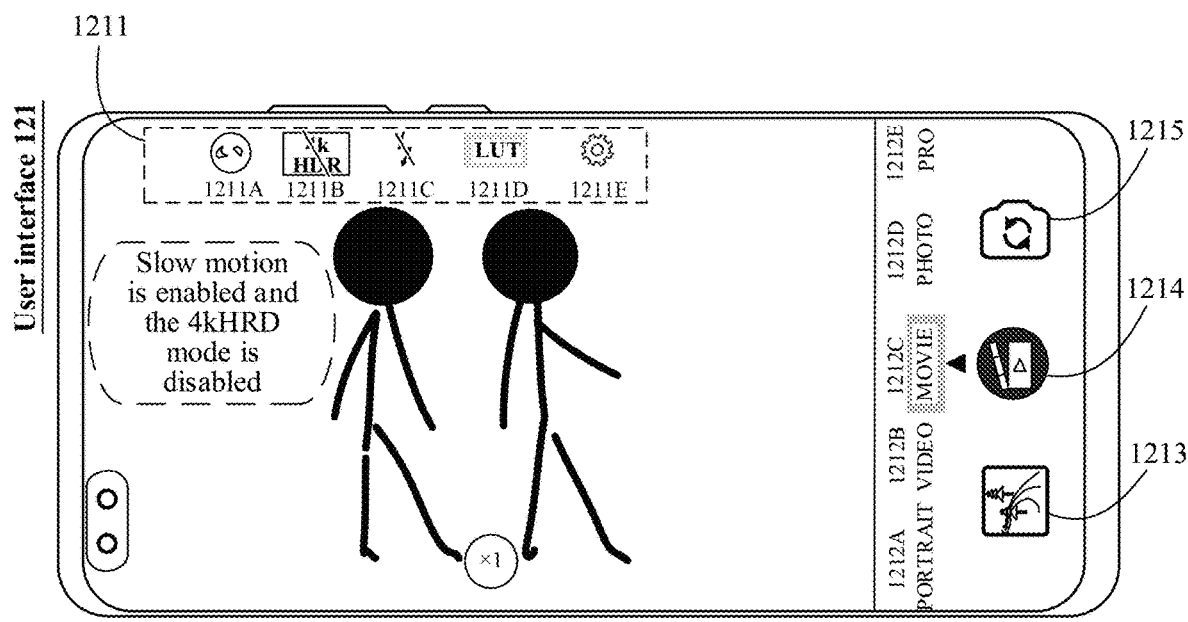

As shown in FIG. 11C, when the movie mode is enabled, second prompt information 1017 may be output when shooting in the landscape orientation is performed for the first time, for example, "a 4K HDR10 video will be recorded after enabled", and the prompt instructs the user to enable the 4K HDR mode. In this case, as shown in FIG. 11C, the user may manually tap a blank space of the user interface to trigger the system to cancel displaying of the second prompt information, so as to keep the 4K HDR option 1011B in a disabled state. After the user closes the second prompt information, the electronic device 100 displays a user interface 121 shown in FIG. 11D. Both the slow motion option 1211A and the 4K HDR option 1211B in the interface are not enabled. As shown in FIG. 11E, the user may manually touch the slow motion option 1211A to enable the slow motion mode in the movie mode. In an optional embodiment, after the slow motion mode is enabled, prompt information "slow motion enabled" shown in FIG. 11F is displayed. In addition, as shown in FIG. 11F, after the slow motion mode is set to enabled in the electronic device, the LUT option 1211D is disabled as gray. As shown in FIG. 11G and FIG. 11H, after the slow motion is enabled, and the user manually enables the 4K HDR option 1211B, the slow motion option 1211A is automatically disabled. As shown in FIG. 11I and FIG. 11J, an optional manner after the 4K HDR option 1211B is enabled is as follows: Prompt information "the 4K HDR mode is enabled and the slow motion is disabled" is displayed on the user interface to prompt the user that the 4K HDR mode is enabled successfully. In this case, the gray color of the LUT option 1211D disappears, and disabling is canceled. When the 4K HDR mode is enabled, as shown in FIG. 11I, after the user manually taps the slow motion option 1211A, the 4K HDR option 1211B is automatically disabled. The movie slow motion mode and the 4K HDR mode are mutually exclusive.

It should be noted that, the foregoing merely describes an example of a relationship between the 4K HDR mode and the slow motion mode. In an actual implementation process, compatibility between the 4K HDR mode and the slow motion mode may be set to enabled at the same time. Alternatively, the slow motion mode is disabled after the 4K HDR mode is enabled, or the 4K HDR mode is disabled after the slow motion mode is enabled. A specific setting rule may be set by a person skilled in the art based on an actual requirement. It should be noted that, after the slow motion mode or the 4K HDR mode for the movie is enabled, sound effects are recorded on only the currently enabled video. After the recording ends, the corresponding switch is automatically disabled.

FIG. 12A to FIG. 12H are schematic diagrams of an HDR video shooting and sharing procedure.

If the user does not enable the 4K HDR switch, a shot video is an SDR video. After the 4K HDR video switch is enabled, HDR10 videos are shot and are all Imax-authenticated HDR videos.

Figure 12A:
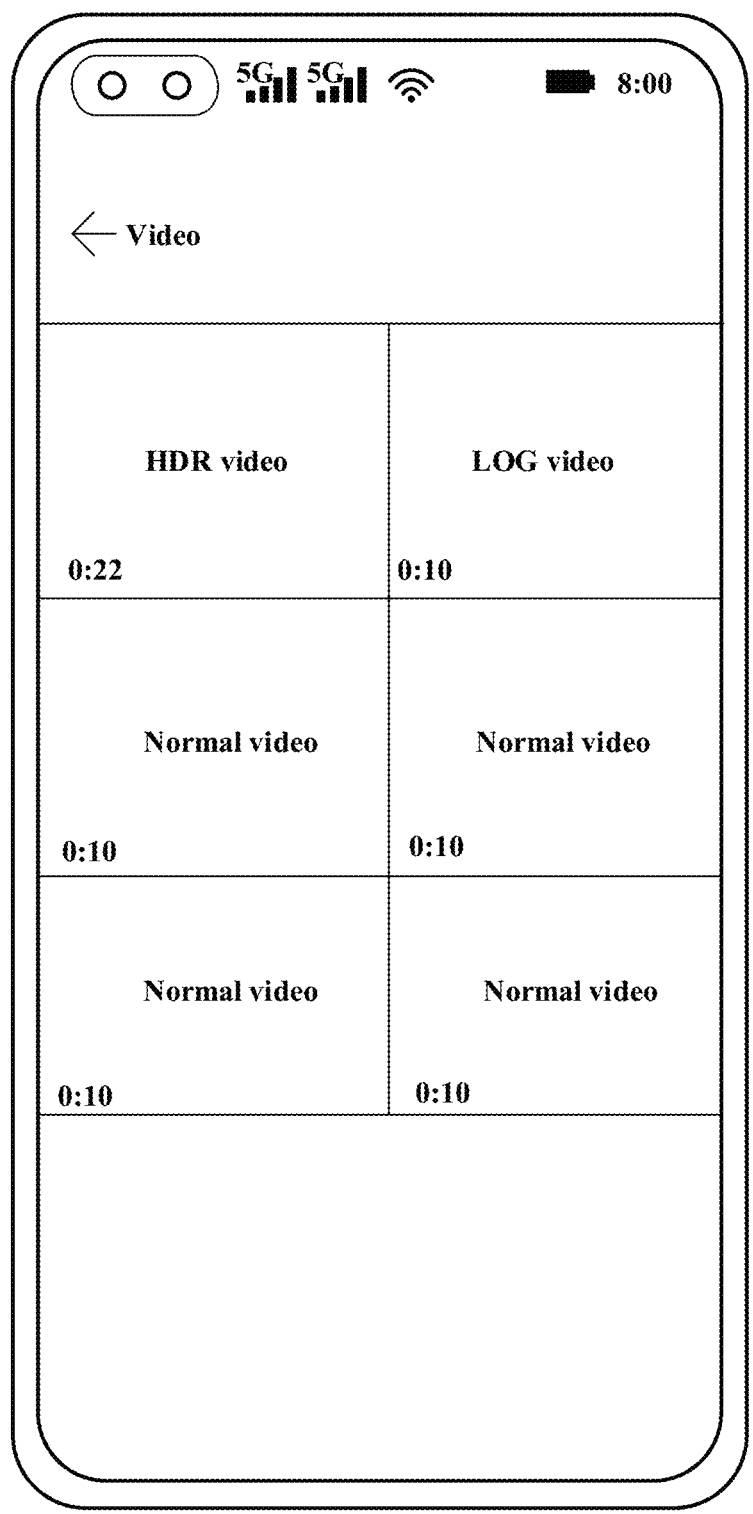
FIG. 12A to FIG. 12H are schematic diagrams of an HDR video shooting and sharing procedure.

As shown in FIG. 12A, a first interface of an interface of videos or the gallery, and a shot video file or video folder is displayed on the first interface. Different types of video files, such as an HDR video or a LOG video and a normal video, may be distinguished by using texts or identifiers.

Figure 12B:
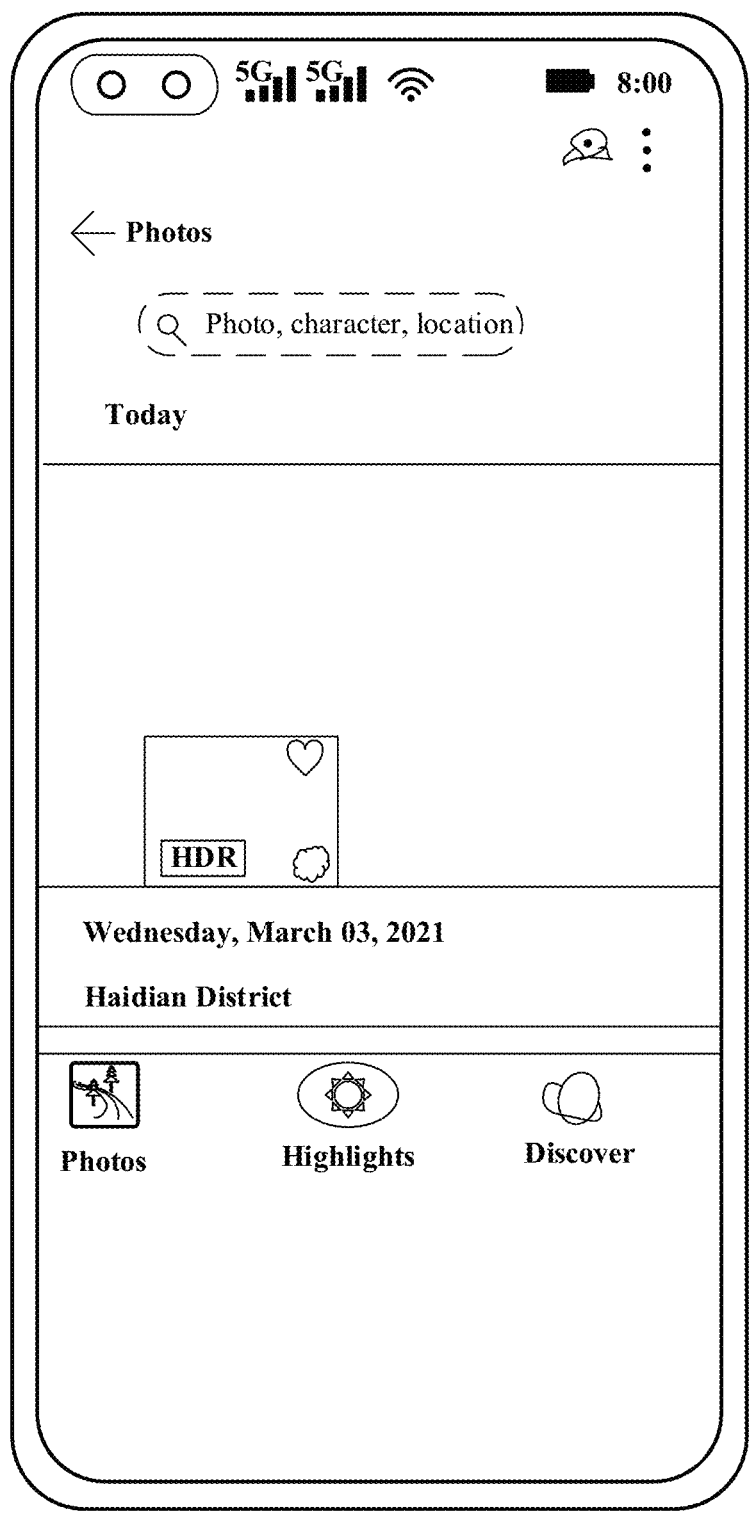

As shown in FIG. 12B, a first interface of a photo or the gallery, where the interface includes a shot picture or video, and the video includes an identifier, a 4K HDR video shot by the user, and is stored in gallery-videos-HDR video folder. An HDR tag is provided for 4K HDR video work for distinguishing from other types of videos.

Figure 12C:
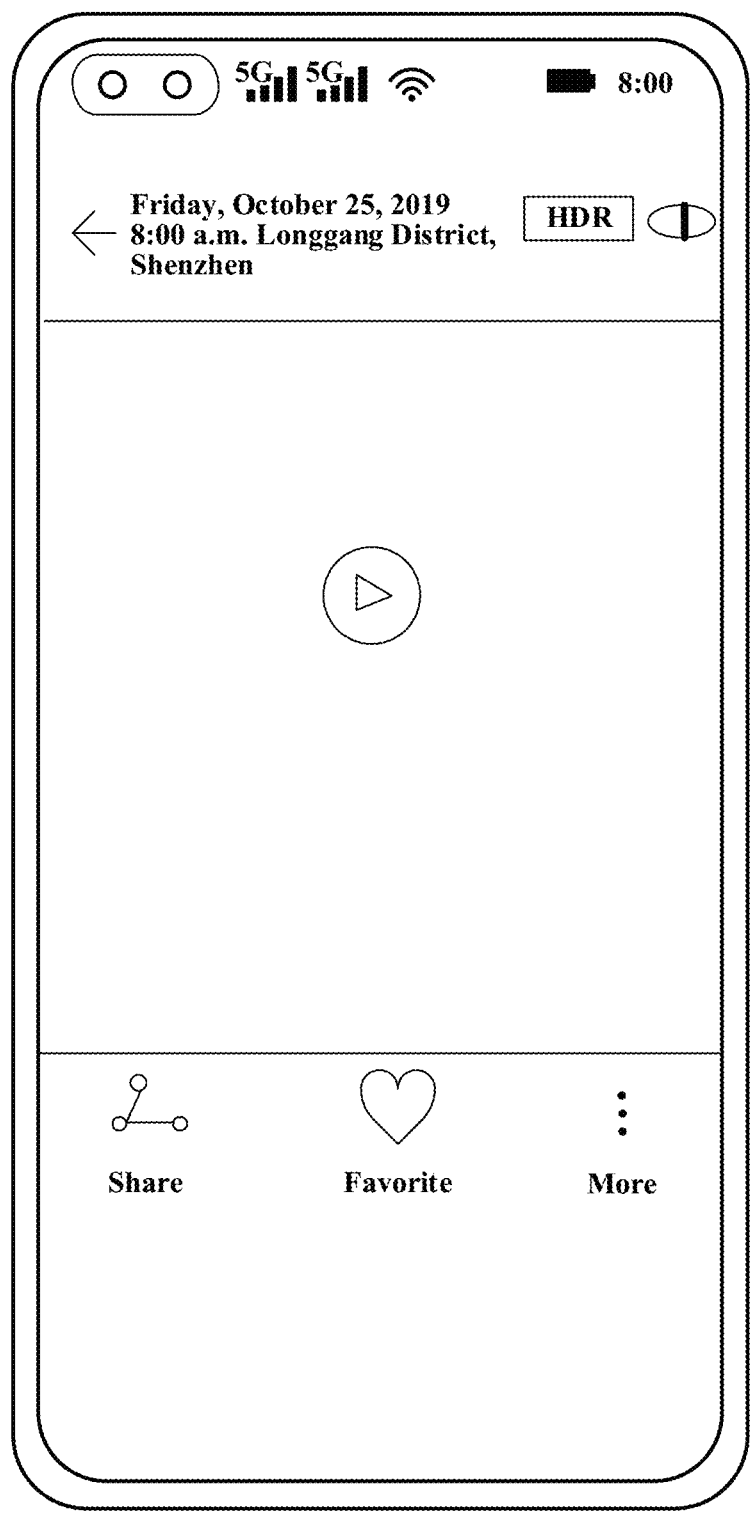
Figure 12D:
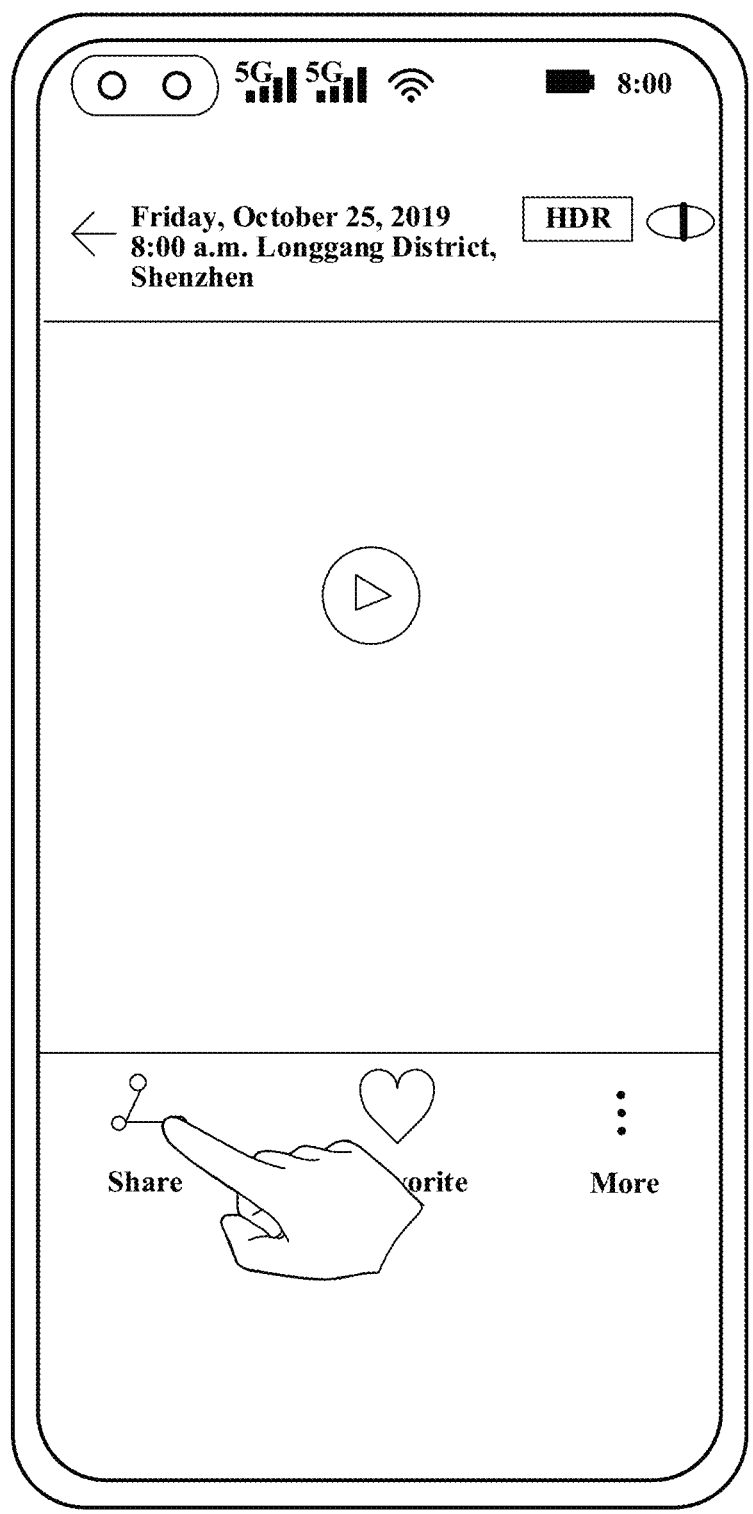
Figure 12E:
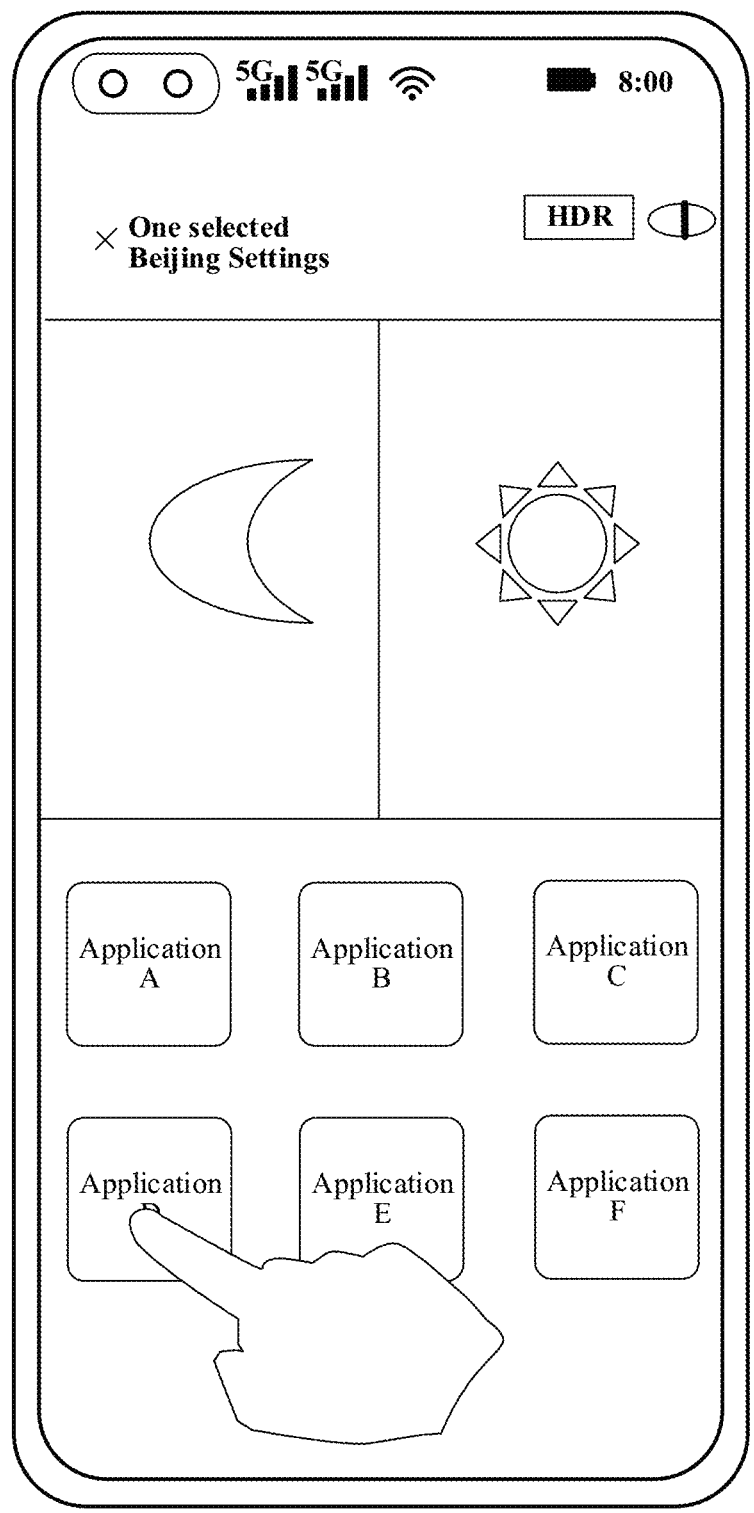
Figure 12F:
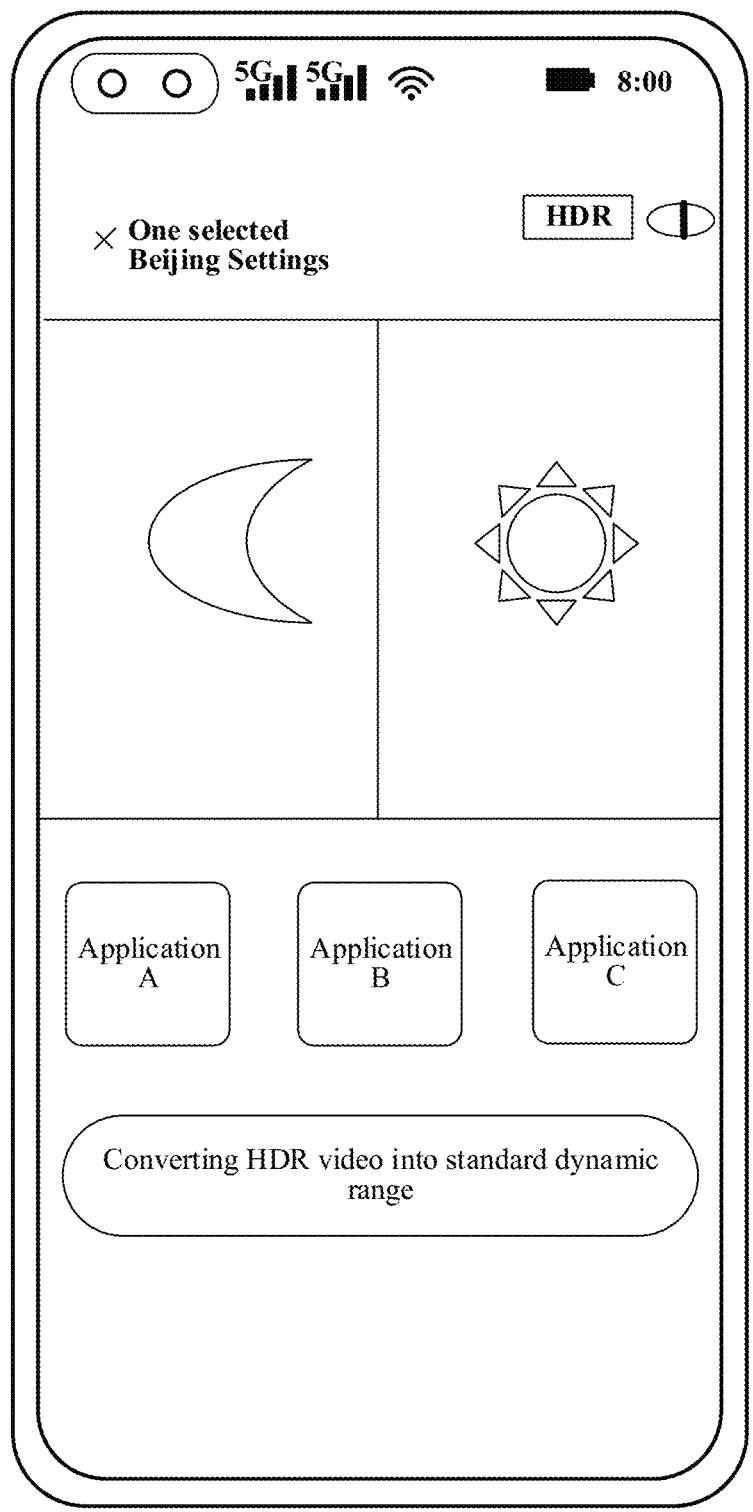

As shown in FIG. 12C, a first video preview or editing interface is displayed, and the interface includes an identifier used to distinguish between an HDR video or a normal video. As shown in FIG. 12D, a preview interface of a first video is displayed. The interface includes a function region, and the function region includes a share button. After receiving a tap operation performed by the user on the share button, the electronic device may display a sharing interface shown in FIG. 12E. The interface includes a first sharing region, the region includes an application icon, the interface further includes a second sharing region, the second sharing region includes a nearby device or a device with a same account. The interface further includes a settings control. After a selection operation performed by the user on any application is received, when the application or the device does not support the HDR video, the interface may display prompt information shown in FIG. 12F, and is used to prompt that the HDR video is being converted into a standard HDR video.

Figure 12G:
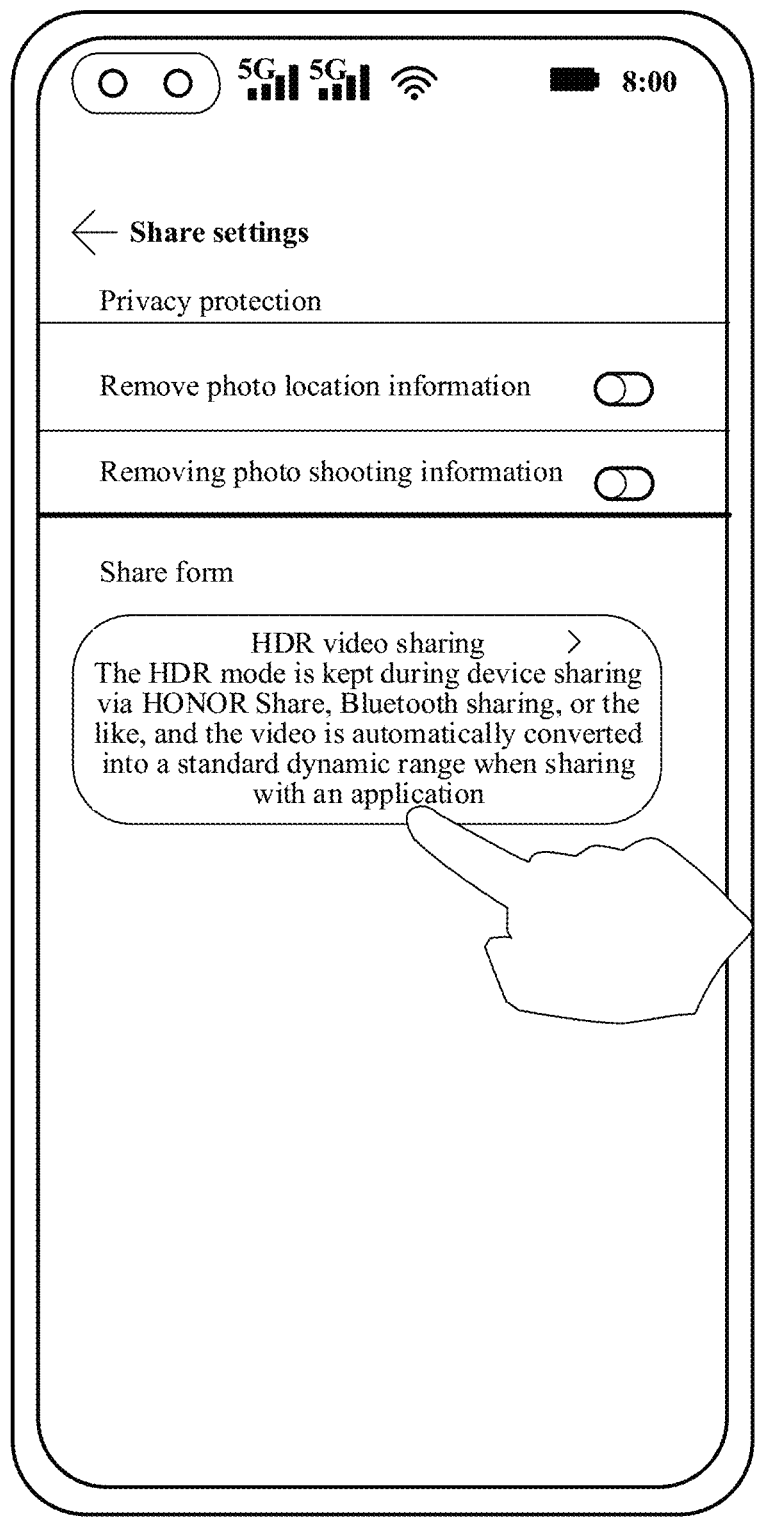
Figure 12H:
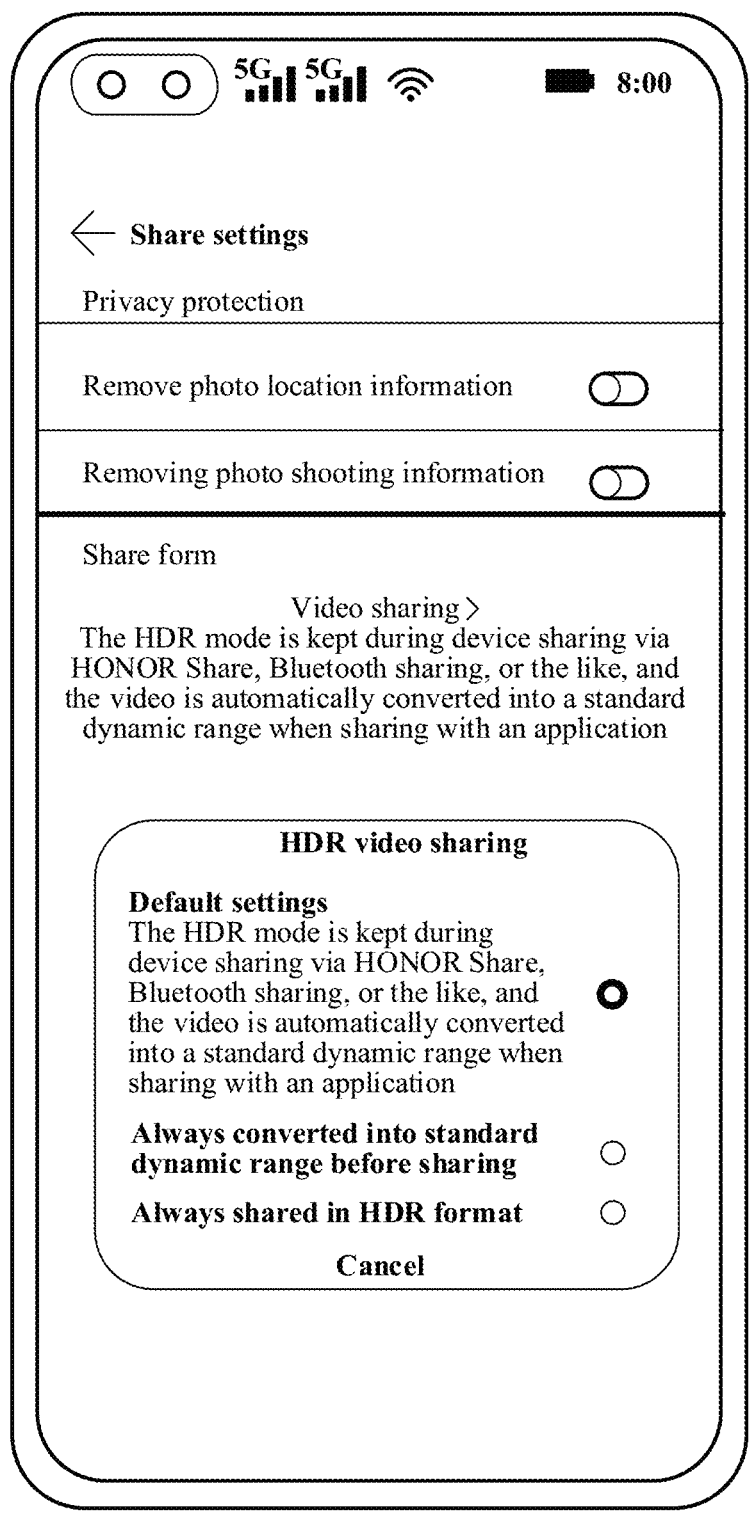

As shown in FIG. 12G, after receiving an operation of triggering the system to display a sharing setting interface by the user, the electronic device may further display the sharing setting interface. The interface includes an HDR video sharing menu. After receiving a sharing operation of the user, an interface shown in FIG. 12H may be displayed, and the interface includes three options. A default setting may be that the HDR mode is kept during device sharing via HONOR Share, Bluetooth sharing, or the like, and the video is automatically converted into a standard dynamic drawing when sharing with an application.

FIG. 13A to FIG. 13G show examples of schematic diagrams of user interfaces of time-lapse movie shooting.

Figure 13A:
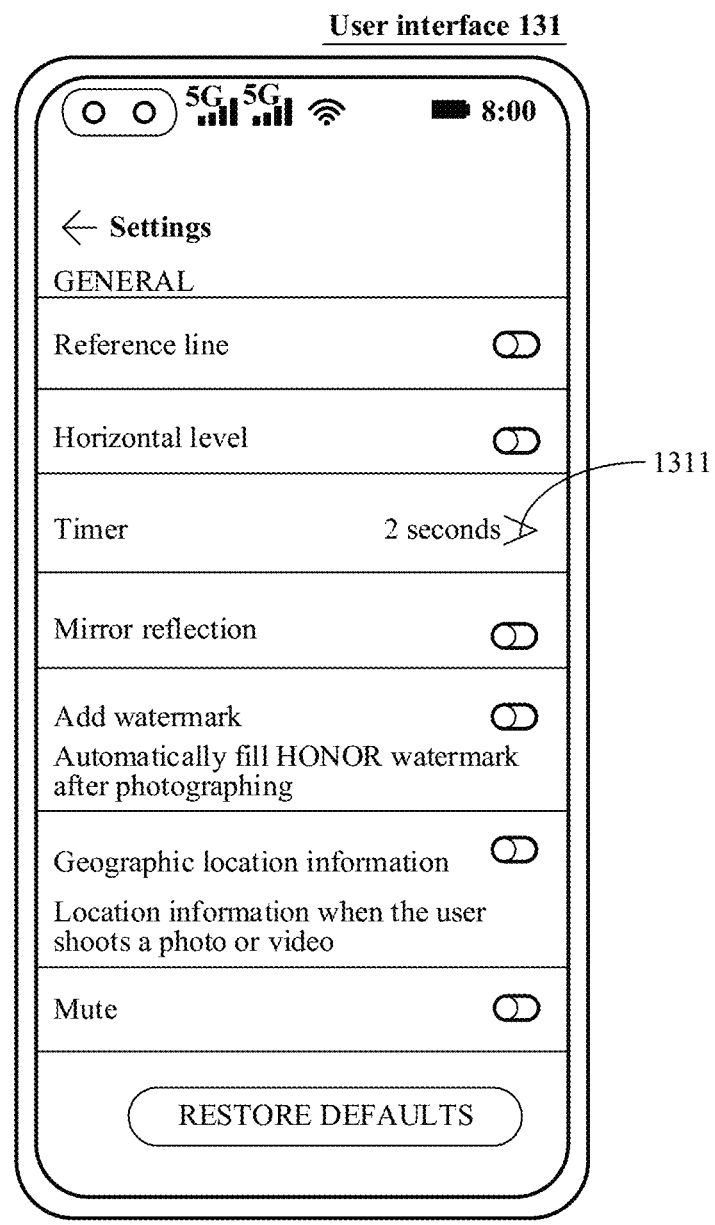
FIG. 13A to FIG. 13G are schematic diagrams of user interfaces of time-lapse movie shooting according to an embodiment of this application.

As shown in FIG. 13A, a user interface 131 may be a photographing setting interface of the electronic device 100. The photographing setting interface includes a reference line switch option, a horizontal level switch option, a mirror reflection switch option, a self-defined watermark adding switch option, and a time-lapse photographing option 1311. The time-lapse photographing option 1311 includes a time adjustment entry, and the entry may be used to set a time-lapse photographing time, for example, 2 seconds. The electronic device 100 may adjust the time-lapse photographing time in response to a received touch operation performed on the time-lapse photographing option 1311.

Figure 13B:
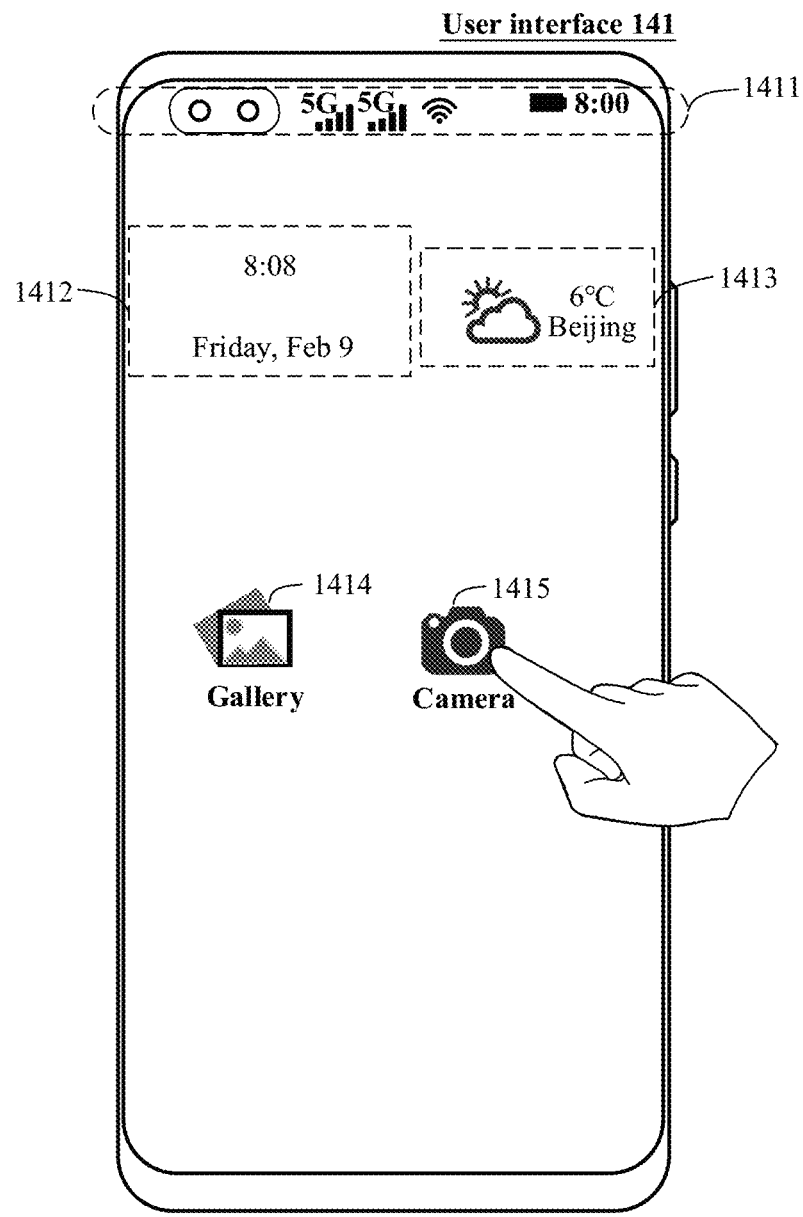

It can be learned from a value in the time-lapse photographing option 1311 shown in FIG. 13A that the time-lapse photographing time set on the electronic device 100 is 2 seconds. As shown in FIG. 13B, the electronic device 100 may display a 2-second countdown movie recording animation special effect after detecting that the user starts to record a movie.

Figure 13C:
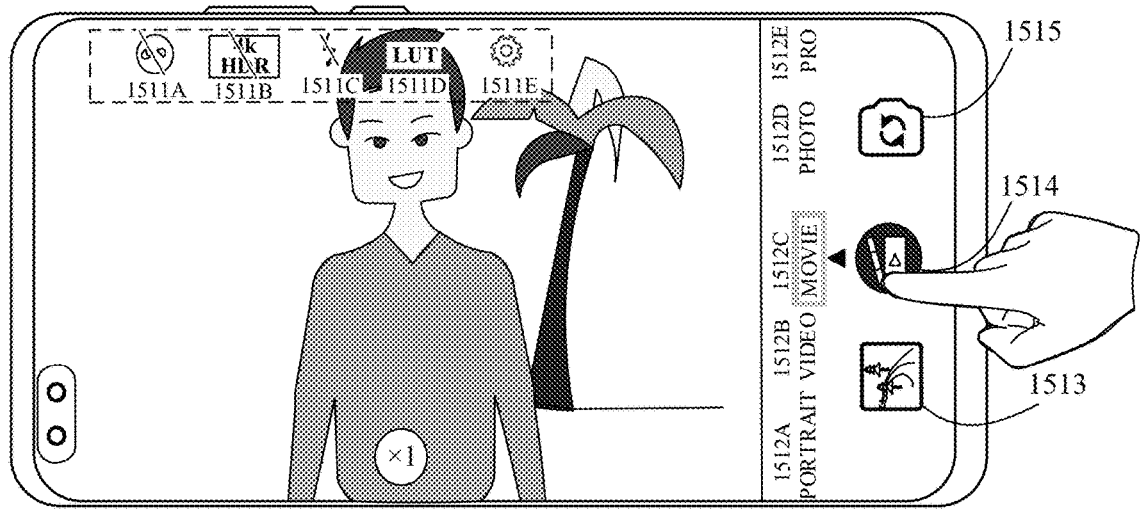
Figure 13D:
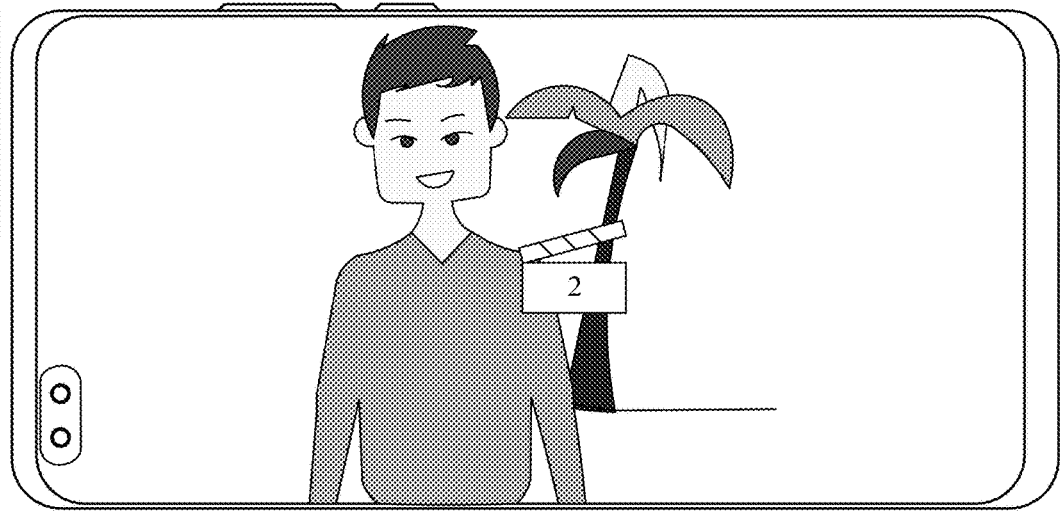
Figure 13E:
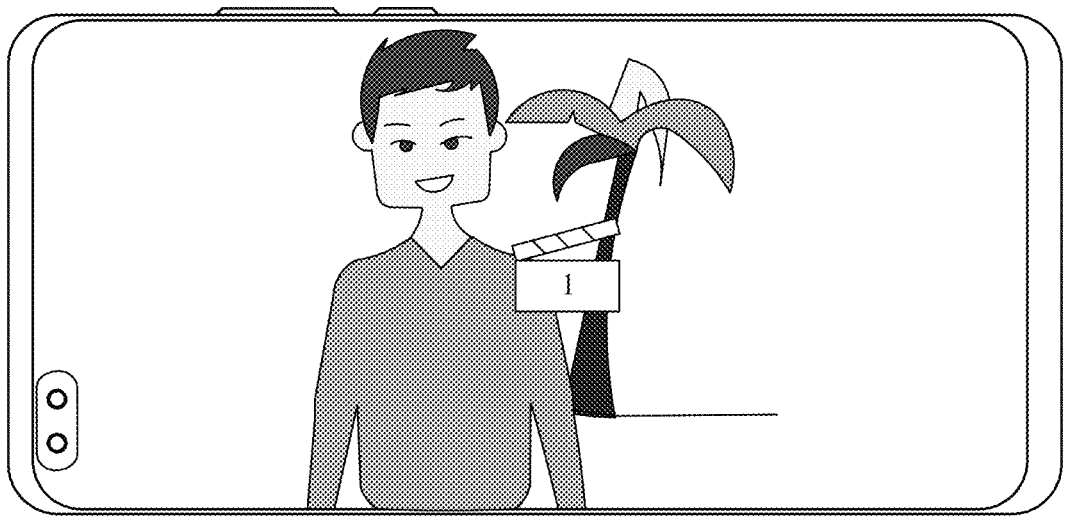
Figure 13F:
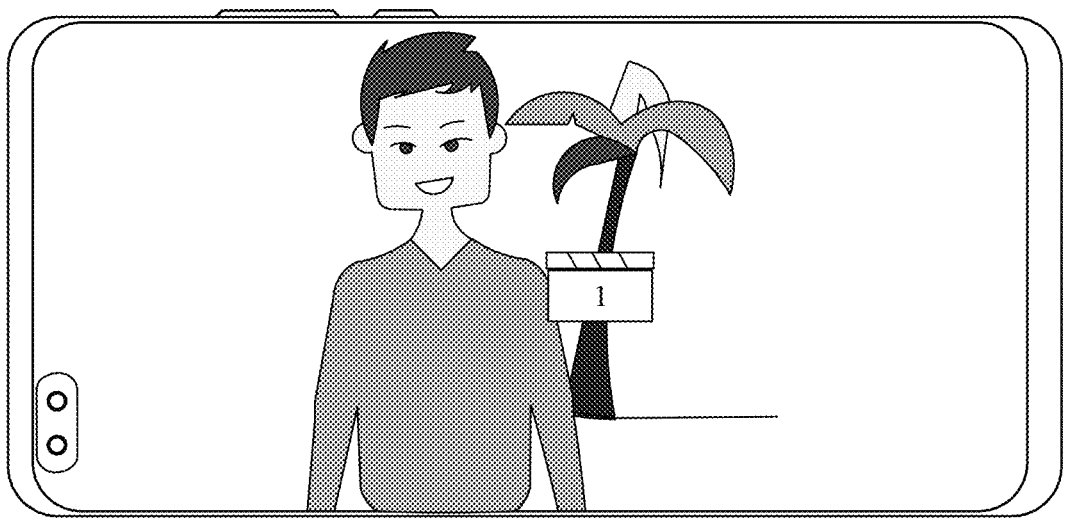

As shown in FIG. 13C, the electronic device 100 may detect a touch operation performed on the movie shutter control 1514, and in response to the operation, the electronic device 100 counts down to record a video and sequentially displays a user interface as shown in FIG. 13D, FIG. 13E, and FIG. 13F, and the user interface is used to display a countdown animation, to prompt the user that the electronic device 100 starts recording the video. In addition, in the last second, the icon displays a conversion dynamic effect as shown in FIG. 13F.

It can be seen from FIG. 13D to FIG. 13F, after the electronic device 100 detects the touch operation performed by the user on the movie shutter control 1514, an image captured by the camera and a slate icon may be displayed on a user interface 151. A difference is that a time displayed in the slate icon varies as time goes on, and when the time-lapse photographing set by the electronic device 100 is 2 seconds, numbers displayed in the slate icon are sequentially display as the numbers 2 and 1 following the countdown. After the icon displays the conversion dynamic effect, the electronic device 100 displays a user interface 161 shown in FIG. 13G.

Figure 13G:
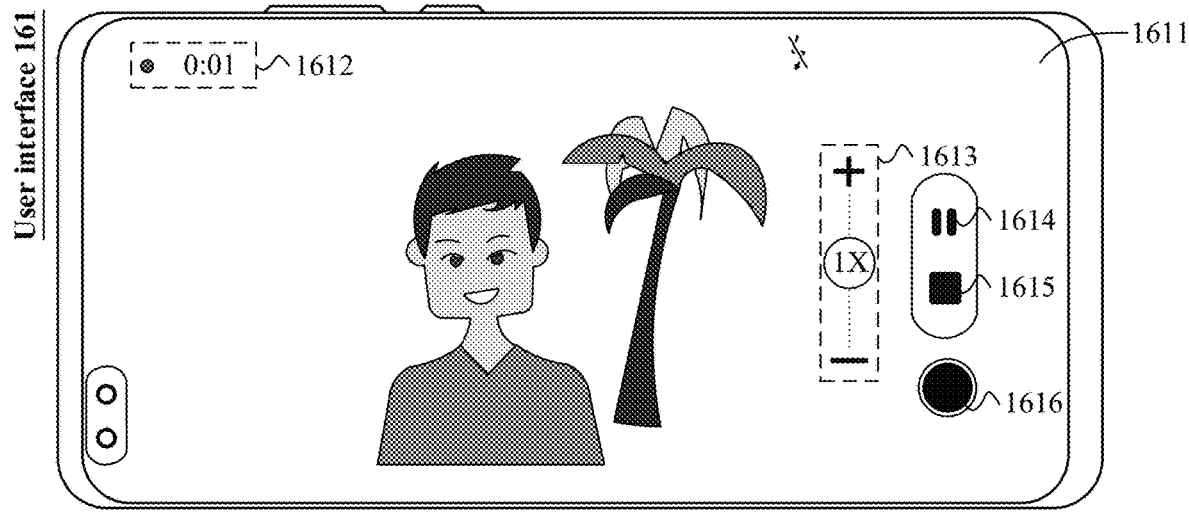

As shown in FIG. 13G, the user interface 161 is a user interface provided when the electronic device 100 records a video. The user interface 161 includes a recording box 1611, a recording time 1612, a zoom control 1613, a pause recording control 1614, an end recording control 1615, and a photographing control 1616. The recording box 1611 displays the image collected by the camera, or further, displays an image adjusted by the electronic device 100 based on a photographing parameter. The recording time 1612 is used to display a time interval from a time at which the electronic device 100 starts recording the video to a current time. For example, when the recording time 1612 is displayed as "00:01", it indicates that the electronic device 100 has recorded a video of 1 second. The zoom control 1613 may be used to adjust and display zoom magnification of the electronic device 100. The pause recording control 1614 may be used to pause recording of a video, the end recording control 1615 may be used to end recording of a video, and save the video recorded by the electronic device 100 in a gallery, and the photographing control 1616 may be used to monitor an operation performed by the user to trigger photographing during video recording. When the electronic device 100 detects.

In other words, in the movie mode, when enabling the time-lapse photographing function, the electronic device 100 can display a slate countdown animation during the countdown photographing, to make the photographing more interesting.

The photographing manner provided in this embodiment of this application further supports photographing in a LOG mode. A corresponding LOG function option is set in the function option included in the preview interface. After it is detected that the user enables the LOG function option, the electronic device enables the LOG mode and enables the preview picture after the LOG mode. Compared with a case in which the LOG mode is not enabled, the video preview and the finished movie in the LOG mode are both original movies with low saturation and low contrast color tones. In an actual implementation process, shooting in the landscape orientation is used by default after the LOG mode is enabled. Certainly, this is not limiting, and the user may alternatively set it to shooting in the portrait orientation based on an actual requirement.

After the user completes shooting a LOG video, the user automatically saves the LOG video in the gallery or the album, and a folder of the LOG video is automatically generated in the gallery or the album. After the folder is opened, a LOG video that has been shot may be displayed. In addition, in the lower left corner of all LOG videos, there is an identifier of the LOG video, which is used to distinguish from other videos. The terminal device receives a first operation of the user, for example, a single tap and a plurality of taps. The first operation may be for a video application or a video editing application, for example, HONOR Video, and a lower part of the interface includes a function region, such as a share button, a favorite button, and a delete button. The upper part of the interface further includes a LOG identifier. In the HONOR Video editing application, the user can freely change the LUT tone for the LOG video. When the user taps an LUT, a color effect of the LUT is presented to the user on a browsing interface. If the user selects another LUT, the color effect is updated accordingly. "Before save", the user can debug different LUTs to select a best tone effect for the video work. After the LOG identifier is tapped, a prompt box may be displayed. The prompt box may include prompt information. The LOG video may record more details and a wider dynamic range. The LOG LUT needs to be edited and debugged before use. More preferably, after the LOG video is shot, a video editing interface may be displayed, where the interface includes a function region, and the function region includes an LUT button. After being tapped, an LUT effect may be enhanced. A second interface of video editing is displayed, where the second interface may be an interface after the LUT effect is enhanced, and the interface includes an LUT template region, and different LUT templates may be selected. The interface includes a progress bar, used to display effects of different time periods or frames. The interface further includes "applied to all buttons". After an operation of the user is received, the effect selected by the user may be applied to the to-be-edited video. In the HONOR Video editing application, the user can freely change the LUT tone for the LOG video. The user taps an LUT tone, and a color effect of the tapped LUT is presented to the user on the browsing interface. If the user selects another LUT, the color effect is updated accordingly. "Before save", the user can debug different LUTs to select a best tone effect for the video work.

After photographing processing of the LOG video is completed, a video sharing interface may further be displayed. The interface sharing interface includes a first sharing region, such as a device of an attachment and a device of a same account, and further includes a second region. The second region includes a third-party application, and the interface further includes a prompt box, where the prompt box indicates that the current video is a LOG video. The user may select one or more third-party applications from the second region for video sharing. Because the LOG work is an original movie with low saturation and low contrast color tones, the video is not suitable for sharing before the LUT is applied. The user shares the video work. In the sharing interface, the LOG video work has a clear LOG tag, which is used to distinguish the video work from video work in other formats.

It should be noted that, the shot LOG video may be rendered by using the LUT template mentioned in the foregoing embodiment, to obtain a color-saturated video.

Various implementations of this application may be combined randomly to implement different technical effects.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person of skill in the art may use different methods to implement the described functions with reference to embodiments for each particular application, but it should not be considered that the implementation goes beyond the scope of this application.

Figure 14:
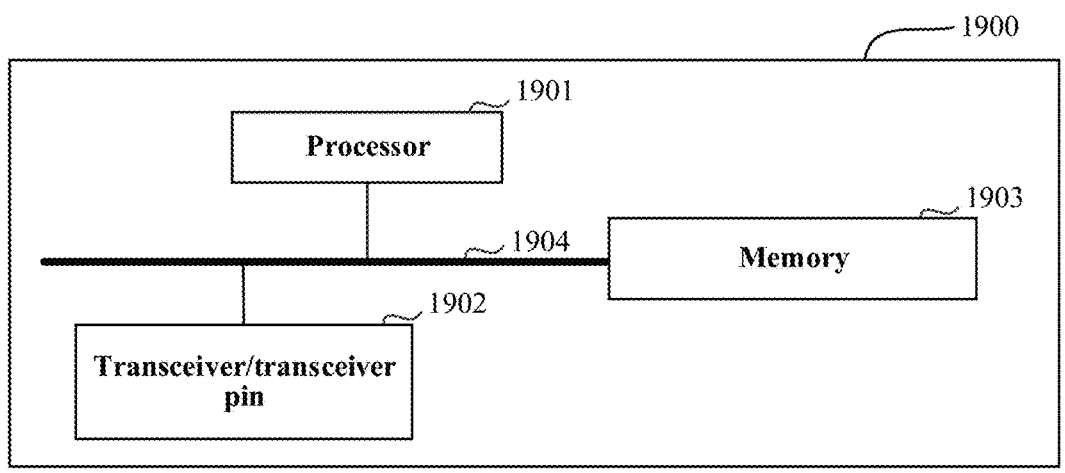
FIG. 14 is a schematic diagram of an example structure of an apparatus.

In an example, FIG. 14 is a schematic block diagram of an apparatus 1900 according to an embodiment of this application. The apparatus 1900 may include: a processor 1901 and a transceiver/transceiver pin 1902, and optionally, further includes a memory 1903.

Components in the apparatus 1900 are coupled together by using a bus 1904. In addition to a data bus, the bus 1904 further includes a power bus, a control bus, and a status signal bus. However, for the purpose of clear description, various buses are all referred to as the bus 1904 in the figure.

Optionally, the memory 1903 may be used for instructions in the foregoing method embodiments. The processor 1901 may be configured to: execute the instructions in the memory 1903, control a receive pin to receive a signal, and control a transmit pin to send a signal.

The apparatus 1900 may be the electronic device or a chip in the electronic device in the foregoing method embodiments.

All related content of each step involved in the foregoing method embodiments may be referred to a function description of a corresponding functional module, and details are not described herein.

An embodiment further provides a computer storage medium. The computer storage medium stores computer instructions. When the computer instructions are run on an electronic device, the electronic device is enabled to perform the foregoing related method steps to implement the photographing method in the foregoing embodiment.

The embodiments further provide a computer program product. When the computer program product is run on a computer, the computer is enabled to perform the foregoing related steps to implement the photographing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the method for detecting accidental touch of a power button in the foregoing method embodiments.

The electronic device, the computer storage medium, the computer program product, or the chip provided in the embodiments is configured to perform the corresponding method provided above. Therefore, for beneficial effects that can be achieved by the electronic device, the computer storage medium, the computer program product, or the chip, refer to the beneficial effects in the corresponding method provided above. Details are not described herein.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into the modules or units is merely a logical function division, and there may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

Any content in embodiments of this application and any content in a same embodiment may be freely combined. Any combination of the foregoing content is within the scope of this application.

When the integrated unit is implemented in a form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a CD-ROM (CD-ROM), or any other form of storage medium familiar with the art. An example storage medium is coupled to a processor, to enable the processor to read information from and write information to the storage medium. Certainly, the storage medium may also be an integral part of the processor. The processor and the storage medium may be located in the ASIC.

A person skilled in the art may identify that in the foregoing one or more examples, functions described in the embodiments of this application may be implemented by hardware, software, firmware, or any combination thereof. When implemented by using software, these functions may be stored in a computer readable medium or transmitted as one or more instructions or codes on the computer readable medium. The computer readable medium includes a computer storage medium and a communication medium, where the communication medium includes any medium that facilitates the transfer of a computer program from one place to another. The storage medium may be any available medium accessible to a general-purpose or dedicated computer.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

What is claimed is:

1. An electronic device, comprising:
a memory and a processor;
wherein the processor is coupled to the memory; and
the memory stores program instructions, and when executed by the processor, the program instructions cause the electronic device to perform the following steps:
receiving a first operation performed by a user on a camera application icon;
displaying a first user interface in response to the first operation, wherein the first user interface comprises: a preview box, a photographing mode list, and a movie shutter control, wherein the photographing mode list comprises: a movie mode option;
receiving a second operation performed by the user on the movie mode option;
identifying a photographing scenario based on a collected preview image in response to the second operation;
searching a plurality of look up table (LUT) templates preset in a system for a target LUT template that matches the photographing scenario;
displaying third prompt information, wherein the third prompt information comprises identification information of an identified target LUT template and a close button, and the close button is usable to trigger closing of the third prompt information;
receiving a fifth operation on the identification information of the identified target LUT template;
displaying a plurality of LUT templates in response to the fifth operation, wherein the target LUT template corresponding to the identification information of the identified target LUT template is highlighted while displaying the plurality of LUT templates; and
shooting and generating a target video based on the identified target LUT template when a third operation performed by the user on the movie shutter control is received.

2. The electronic device according to claim 1, wherein when executed by the processor, the program instructions cause the electronic device to perform the following steps:
identifying a photographing object type for the collected preview image in response to the second operation; and
identifying the photographing scenario based on at least one of the photographing object type, image brightness, or image saturation.

3. The electronic device according to claim 1, wherein when executed by the processor, the program instructions cause the electronic device to perform the following steps:
identifying each photographing object in the collected preview image in response to the second operation; and
identifying the photographing scenario based on an image proportion of each photographing object.

4. The electronic device according to claim 1, wherein when executed by the processor, the program instructions cause the electronic device to perform the following steps:
outputting first prompt information in response to the second operation to prompt the user to shoot in a landscape orientation;
receiving a fourth operation performed by the user on a function option comprised in a preview interface, wherein the function option comprises: at least one of a slow motion option, a 4K HDR option, a flash option, or an LUT option;

when the fourth operation performed by the user on the 4K HDR option is received, detecting whether the slow motion option is enabled; and when the slow motion option is enabled, disabling the slow motion option; and when the fourth operation performed by the user on the slow motion option is received, detecting whether the 4K HDR option is enabled; and when the 4K HDR option is enabled, disabling the 4K HDR option to display a 4K HDR video picture.

5. The electronic device according to claim 4, wherein when executed by the processor, the program instructions cause the electronic device to perform the following step:
outputting second prompt information to prompt the user to enable the 4K HDR option when it is detected that the electronic device shoots in the landscape orientation.

6. The electronic device according to claim 5, wherein when executed by the processor, the program instructions cause the electronic device to perform the following steps:
receiving a fifth operation performed by the user on a preset region in the preview box; and
canceling displaying the second prompt information in response to the fifth operation.

7. The electronic device according to claim 1, wherein when executed by the processor, the program instructions cause the electronic device to perform the following step:
displaying a preset dynamic effect in the preview box in a process of identifying the photographing scenario based on the collected preview image in response to the second operation.

8. The electronic device according to claim 1, wherein when executed by the processor, the program instructions cause the electronic device to perform the following steps:
when an eighth operation performed by the user on a close button is received, detecting a total quantity of times of operating the close control within preset duration; and
when the total quantity of times is greater than a preset quantity of times, disabling an automatic scenario identification function.

9. The electronic device according to claim 1, wherein when executed by the processor, the program instructions cause the electronic device to perform the following steps:
receiving a sixth operation on a playback control of the target LUT template;
previewing, in response to the sixth operation, a video picture corresponding to the target LUT template, wherein the video picture comprises a first control and a close control, and the close control is used to close the video picture;
receiving a seventh operation performed by the user on the first control; and
displaying sample movie introduction information of the target LUT template in response to the seventh operation.

10. The electronic device according to claim 4, wherein when executed by the processor, the program instructions cause the electronic device to perform the following step:
when the fourth operation performed by the user on the slow motion option is received, enabling a slow motion mode and setting the LUT option to a disabled state.

11. A photographing method, comprising:
receiving a first operation performed by a user on a camera application icon;
displaying a first user interface in response to the first operation, wherein the first user interface comprises: a preview box, a photographing mode list, and a movie shutter control, wherein the photographing mode list comprises: a movie mode option;
receiving a second operation performed by the user on the movie mode option;
identifying a photographing scenario based on a collected preview image in response to the second operation;
searching a plurality of look up table (LUT) templates preset in a system for a target LUT template that matches the photographing scenario;
displaying third prompt information, wherein the third prompt information comprises identification information of an identified target LUT template and a close button, and the close button is usable to trigger closing of the third prompt information;
receiving a fifth operation on the identification information of the identified target LUT template;
displaying a plurality of LUT templates in response to the fifth operation, wherein the target LUT template corresponding to the identification information of the identified target LUT template is highlighted while the plurality of LUT templates are displayed; and
shooting and generating a target video based on the identified target LUT template when a third operation performed by the user on the movie shutter control is received.

12. The method according to claim 11, wherein the identifying a photographing scenario based on a collected preview image in response to the second operation comprises:
identifying a photographing object type for the collected preview image in response to the second operation; and
identifying the photographing scenario based on at least one of the photographing object type, image brightness, or image saturation.

13. The method according to claim 11, wherein the identifying a photographing scenario based on a collected preview image in response to the second operation comprises:
identifying each photographing object in the collected preview image in response to the second operation; and
identifying the photographing scenario based on an image proportion of each photographing object.

14. The method according to claim 11, wherein after the receiving a second operation performed by the user on the movie mode option, the method further comprises:
outputting first prompt information in response to the second operation to prompt the user to shoot in a landscape orientation;
receiving a fourth operation performed by the user on a function option comprised in a preview interface, wherein the function option comprises: at least one of a slow motion option, a 4K HDR option, a flash option, or an LUT option;
when the fourth operation performed by the user on the 4K HDR option is received, detecting whether the slow motion option is enabled; and when the slow motion option is enabled, disabling the slow motion option;
when the fourth operation performed by the user on the slow motion option is received, detecting whether the 4K HDR option is enabled; and when the 4K HDR option is enabled, disabling the 4K HDR option to display a 4K HDR video picture; and
when the fourth operation performed by the user on the slow motion option is received, enabling a slow motion mode and setting the LUT option to a disabled state.

15. The method according to claim 14, wherein after the outputting first prompt information in response to the second operation to prompt the user to shoot in a landscape orientation, the method further comprises:

outputting second prompt information to prompt the user to enable the 4K HDR option when it is detected that the electronic device shoots in the landscape orientation.

16. The method according to claim 15, wherein after the outputting second prompt information when it is detected that the electronic device shoots in the landscape orientation, the method further comprises:

receiving a fifth operation performed by the user on a preset region in the preview box; and canceling displaying the second prompt information in response to the fifth operation.

17. The method according to claim 14, wherein the identifying a photographing scenario based on a collected preview image in response to the second operation comprises:

displaying a preset dynamic effect in the preview box in a process of identifying the photographing scenario based on the collected preview image in response to the second operation.

18. The method according to claim 14, wherein after the displaying third prompt information, the method further comprises:

when an eighth operation performed by the user on the close control is received, detecting a total quantity of times of operating the close control within preset duration; and when the total quantity of times is greater than a preset quantity of times, disabling an automatic scenario identification function.

19. The method according to claim 14, wherein the target LUT template comprises a playback control; and after the displaying a plurality of LUT templates in response to the fifth operation, the method further comprises:

receiving a sixth operation on the playback control;

previewing, in response to the sixth operation, a video picture corresponding to the target LUT template, wherein the video picture comprises a first control and a close control, and the close control is used to close the video picture;

receiving a seventh operation performed by the user on the first control; and displaying sample movie introduction information of the target LUT template in response to the seventh operation.

20. A non-transitory computer readable storage medium, comprising a computer program, wherein when the computer program runs on an electronic device, the electronic device is enabled to perform the following steps:

receiving a first operation performed by a user on a camera application icon;

displaying a first user interface in response to the first operation, wherein the first user interface comprises: a preview box, a photographing mode list, and a movie shutter control, wherein the photographing mode list comprises: a movie mode option;

receiving a second operation performed by the user on the movie mode option;

identifying a photographing scenario based on a collected preview image in response to the second operation;

searching a plurality of look up table (LUT) templates preset in a system for a target LUT template that matches the photographing scenario;

displaying third prompt information, wherein the third prompt information comprises identification information of an identified target LUT template and a close button, and the close button is usable to trigger closing of the third prompt information;

receiving a fifth operation on the identification information of the identified target LUT template;

displaying a plurality of LUT templates in response to the fifth operation, wherein the target LUT template corresponding to the identification information of the identified target LUT template is highlighted; and shooting and generating a target video based on the target LUT template when a third operation performed by the user on the movie shutter control is received.

* * * * *